United States Patent
Mande et al.

(10) Patent No.: US 10,365,805 B2
(45) Date of Patent: Jul. 30, 2019

(54) AUTOMATED DEVICE ASSISTANCE

(71) Applicant: Bank of America Corporation, Charlotte, NC (US)

(72) Inventors: Christian Mande, Charlotte, NC (US); Mark Williamson, Charlotte, NC (US); Brendan Watkins, Newport News, VA (US); Ryan Furey, Charlotte, NC (US); Anne Price, Newport, TN (US); Alison Pearce, Fort Mill, SC (US); Michelle Bentubo, Orlando, FL (US)

(73) Assignee: Bank of America Corporation, Charlotte, NC (US)

( * ) Notice: Subject to any disclaimer, the term of this patent is extended or adjusted under 35 U.S.C. 154(b) by 467 days.

(21) Appl. No.: 14/788,065

(22) Filed: Jun. 30, 2015

(65) Prior Publication Data
US 2017/0003857 A1  Jan. 5, 2017

(51) Int. Cl.
*G06Q 30/02* (2012.01)
*G06F 3/0484* (2013.01)
(Continued)

(52) U.S. Cl.
CPC ........ *G06F 3/04842* (2013.01); *G06F 3/0482* (2013.01); *G06F 11/328* (2013.01);
(Continued)

(58) Field of Classification Search
CPC .... H04L 67/025; H04L 67/36; G06F 11/3006; G06F 11/328; G06Q 30/0269; G06Q 30/0281; G06Q 20/18
See application file for complete search history.

(56) References Cited

U.S. PATENT DOCUMENTS 585,458 A   6/1897 Mori
5,382,777 A   1/1995 Yuhara et al.
(Continued)

FOREIGN PATENT DOCUMENTS

CA   2029476 A1   1/1992

OTHER PUBLICATIONS

MeltingPoint, "Using MeltingPoint," May 30, 1997, Docuwork, Inc., pp. 1-74, downloaded from http://web.archive.org/web/19970530235850/http://www.docuwork.com/download/mpManual.zip.*

(Continued)

*Primary Examiner* — Alvin H Tan
(74) *Attorney, Agent, or Firm* — Banner & Witcoff, Ltd.; Michael A. Springs

(57) ABSTRACT

A user may perform activities at an automated device having various technical features, such as a display, a printer, a camera, a microphone, a speaker, and other features used to perform activities at the automated device. During performance of an activity, the user may run into an issue and request assistance from an agent having a computing device (e.g., a portable computing device). Additionally or alternatively, the automated device may detect the issue and send a request for assistance to a computing device managing a transaction assistance portal or directly to the agent's computing device. The request may identify the user, the activity, and/or the issue, and the agent and his or her computing device may be used to resolve the issue. The agent's computing device may also be used to facilitate customer relationship management with the user.

19 Claims, 57 Drawing Sheets

(51) Int. Cl.
*G06F 3/0482* (2013.01)
*H04L 29/08* (2006.01)
*G06F 11/32* (2006.01)

(52) U.S. Cl.
CPC ..... *G06Q 30/0269* (2013.01); *G06Q 30/0281* (2013.01); *H04L 67/025* (2013.01); *H04L 67/306* (2013.01); *H04L 67/36* (2013.01)

(56) References Cited

U.S. PATENT DOCUMENTS

| | | | |
|---|---|---|---|
| 5,774,663 A | 6/1998 | Randle et al. | |
| 5,984,178 A * | 11/1999 | Gill | G06Q 20/1085 235/376 |
| 6,357,657 B1 | 3/2002 | May | |
| 6,816,608 B2 | 11/2004 | Cato | |
| 7,051,096 B1 | 5/2006 | Krawiec et al. | |
| 7,346,846 B2 | 3/2008 | Rossi, Jr. et al. | |
| 7,353,182 B1 * | 4/2008 | Missinhoun | G06Q 10/0631 705/7.12 |
| 8,170,952 B2 | 5/2012 | White et al. | |
| 8,463,670 B2 | 6/2013 | Chaar et al. | |
| 8,632,000 B2 | 1/2014 | Laracey | |
| 8,644,893 B2 | 2/2014 | Liang | |
| 8,842,156 B1 | 9/2014 | Alekhin | |
| 9,167,095 B1 | 10/2015 | Selvin et al. | |
| 9,219,660 B2 * | 12/2015 | Sanches | H04L 41/026 |
| 9,544,143 B2 | 1/2017 | Oberheide et al. | |
| 2002/0133378 A1 * | 9/2002 | Mault | A61B 5/0002 705/3 |
| 2002/0143592 A1 | 10/2002 | Nishikawa et al. | |
| 2004/0024640 A1 * | 2/2004 | Engle | G06Q 30/02 705/14.69 |
| 2004/0169722 A1 | 9/2004 | Pena | |
| 2005/0080693 A1 | 4/2005 | Foss et al. | |
| 2005/0165684 A1 | 7/2005 | Jensen et al. | |
| 2006/0004660 A1 | 1/2006 | Pranger | |
| 2006/0085250 A1 | 4/2006 | Kantarjiev et al. | |
| 2007/0145121 A1 * | 6/2007 | Dallal | G06Q 20/341 235/380 |
| 2007/0288572 A1 | 12/2007 | Busa | |
| 2007/0294368 A1 | 12/2007 | Bomgaars et al. | |
| 2008/0004748 A1 | 1/2008 | Butler et al. | |
| 2008/0235629 A1 * | 9/2008 | Porter | G06F 3/0481 715/849 |
| 2008/0301175 A1 * | 12/2008 | Applebaum | G06F 17/3051 |
| 2009/0006267 A1 | 1/2009 | Fergusson et al. | |
| 2009/0144188 A1 | 6/2009 | Colabucci | |
| 2009/0166375 A1 | 7/2009 | Butler et al. | |
| 2011/0173549 A1 | 7/2011 | Hipskind | |
| 2011/0203955 A1 | 8/2011 | Fasula | |
| 2012/0123942 A1 | 5/2012 | Song et al. | |
| 2012/0221361 A1 | 8/2012 | Park et al. | |
| 2012/0221470 A1 | 8/2012 | Lyon | |
| 2012/0271717 A1 | 10/2012 | Postrel | |
| 2012/0285061 A1 | 11/2012 | Angon | |
| 2013/0046697 A1 | 2/2013 | Schibuk | |
| 2013/0283194 A1 * | 10/2013 | Kopp | G06F 3/0481 715/764 |
| 2013/0339247 A1 | 12/2013 | Lam et al. | |
| 2014/0081858 A1 | 3/2014 | Block et al. | |
| 2014/0089178 A1 | 3/2014 | Lee et al. | |
| 2014/0279244 A1 | 9/2014 | Robinson et al. | |
| 2014/0307863 A1 | 10/2014 | Snyder et al. | |
| 2014/0373114 A1 | 12/2014 | Franca-Neto et al. | |
| 2015/0058216 A1 | 2/2015 | Luciani | |
| 2015/0149345 A1 * | 5/2015 | Nayler | G07F 19/209 705/39 |
| 2015/0278895 A1 * | 10/2015 | Joy | G06Q 30/0613 705/21 |
| 2016/0019545 A1 | 1/2016 | Vastenavondt et al. | |
| 2016/0078528 A1 | 3/2016 | Pradeep et al. | |
| 2016/0132847 A1 | 5/2016 | Sarris | |
| 2016/0182721 A1 | 6/2016 | Khalatian et al. | |
| 2016/0225071 A1 | 8/2016 | Breen et al. | |
| 2016/0255505 A1 | 9/2016 | Oberheide et al. | |
| 2017/0068958 A1 | 3/2017 | Oberheide et al. | |

OTHER PUBLICATIONS

Gerritsen et al, "Press Release," May 30, 1997, Docuwork, Inc., downloaded from http://web.archive.org/web/19970530235850/http://www.docuwork.com/download/ushoriz.zip.*

Ron White, "How Computers Work" 7th Ed, Oct. 15, 2003.

* cited by examiner

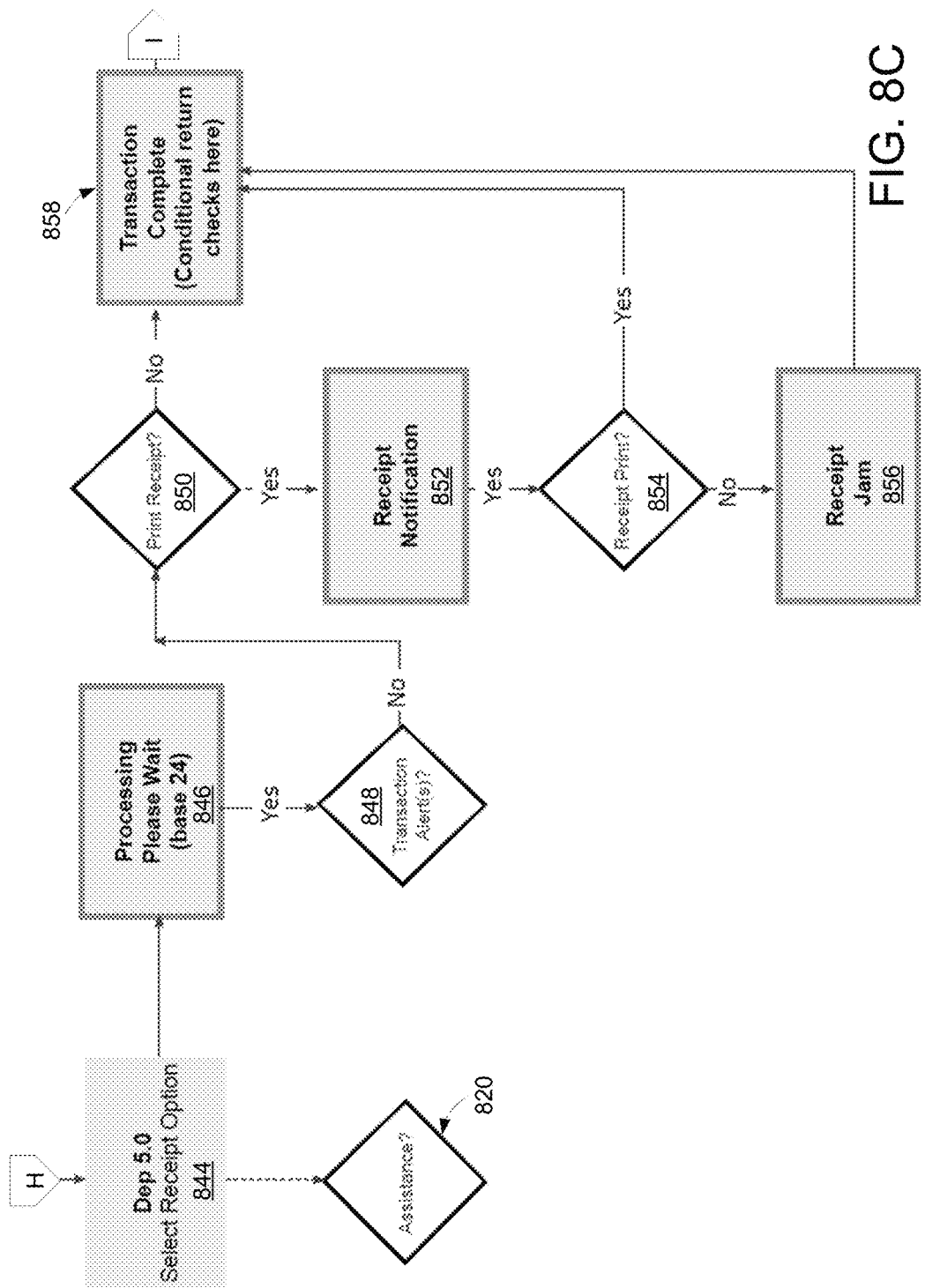

3305
Customer Profile Search

Type*

SSN/TIN*

Search

3310
Customer Profile Search

Type*

Account Number*  ###########

Search

3315
Customer Profile Search

Type*           Name

Last Name*  XXXXXXXX   First Name  XXXXX   MI

State       XXXXX XXXXXXXX   Zip Code

Search

3320
Search results (3) for: *--****  Unmask

Customer A    ### XXXXX Avenue
              Apt #####
              City, State, Zip Customer B    ###### XXX Street
              City, State, Zip

AUTOMATED DEVICE ASSISTANCE

TECHNICAL FIELD

One or more aspects of the disclosure generally relate to computing devices, computing systems, and computer software. In particular, one or more aspects of the disclosure generally relate to computing devices, computing systems, and computer software that may be used to monitor activities at and provide assistance for automated devices.

BACKGROUND

A customer may desire to perform an activity on an automated device. The automated device may provide various technical features that the customer may use to perform the activity. For example, the automated device may have a display, a printer, a camera, a microphone, a speaker, and other input/output devices that the customer may use to interact with the automated device. While performing the activity, an issue may arise. The issue may be a technical issue, such as a jammed printer, or any other type of issue. The issue may prevent the customer from continuing with or completing his or her activity at the automated device.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system, apparatus, non-transitory computer readable medium and/or method of accessing, by a computing device, an activity assistance portal comprising status information for a plurality of automated devices. The computing device may generate for concurrent display on a display of the computing device first status information for a first automated device at a location, and second status information for a second automated device at the location. The first status information may comprise a first user identifier for a first user interacting with the first automated device and a first activity identifier identifying a first activity being performed by the first user. The second status information may comprise a second user identifier for a second user interacting with the second automated device and a second activity identifier identifying a second activity being performed by the second user. The computing device may generate for display on the display of the computing device an option to assist the first user interacting with the first automated device. Responsive to a selection of the option to assist the first user, a network connection between the computing device and the first automated device may be generated. The network connection may be configured to facilitate exchanging data between the computing device and the first automated device for assisting the first user.

The computing device may send a request to access the activity assistance portal to a central computing device configured to manage the activity assistance portal. The computing device may receive, from the central computing device, permission to access the activity assistance portal. Accessing the activity assistance portal may be performed responsive to receiving the permission from the central computing device.

The computing device may generate for display on the display of the computing device an indicator indicating that the computing device is assisting the first user. The computing device may send, to a central computing device configured to manage the activity assistance portal, a message indicating that the computing device is assisting the first user. The central computing device may be configured to update the activity assistance portal to indicate that the computing device is assisting the first user.

In some aspects, responsive to a selection of an option to complete assisting the first user, the network connection between the computing device and the first automated device may be disconnected. The activity assistance portal may be updated to indicate that the computing device is no longer assisting the first user after the network connection is disconnected.

The first activity may comprise an authentication of the first user. The method may further comprise receiving, by the computing device, a scanned image of an ID for the first user. Responsive to receiving the scanned image of the ID, the computing device may generate for display on the display of the computing device the scanned image of the ID for the first user. The computing device may generate for display on the display of the computing device a selectable option to authenticate the first user.

The first activity may comprise a check deposit transaction or a cash check transaction. The method may further comprise receiving, by the computing device, a scanned image of a check scanned by a scanner of the automated device. Responsive to receiving the scanned image of the check, the computing device may generate for display on the display of the computing device the scanned image of the check. The computing device may generate for display on the display of the computing device a selectable option to verify the check. In some aspects, generating for display on the display of the computing device the option to assist the first user may be performed responsive to an alert at the first automated device or responsive to a request by the first user for assistance.

Some aspects as disclosed herein are directed to, for example, a system, apparatus, non-transitory computer readable medium and/or method of generating, by a computing device, a first network connection between an automated device and a first assistance device. The first assistance device may be configured to assist with an activity being performed by a user at the automated device. The computing device may receive a request to transfer service to a second assistance device. Responsive to receiving the request to transfer service, the computing device may remove the first network connection between the automated device and the first assistance device and generate a second network connection between the automated device and the second assistance device. The second assistance device may be configured to assist with the activity being performed by the user at the automated device.

The method may comprise receiving, from the first assistance device, a request for the first assistance device to assist the automated device with the activity being performed by the user at the automated device. Generating the first network connection between the automated device and the first assistance device may be performed responsive to receiving the request for the first assistance device to assist the automated device.
}

The computing device may update an activity assistance portal to indicate that the first assistance device is assisting the user with the activity being performed by the user at the automated device responsive to generating the first network connection between the automated device and the first assistance device. The computing device may update the activity assistance portal to indicate that the second assistance device is assisting the user with the activity being performed by the user at the automated device responsive to generating the second network connection between the automated device and the second assistance device.

In some aspects, the automated device, the first assistance device, and the second assistance device may be located at a same location. Alternatively, the automated device and the first assistance device may be located at a first location, and the second assistance device may be located at a second location different from the first location. Alternatively, the first assistance device and the automated device may be located in a first room in a building, and the second assistance device may be located in a second room in the building. Alternatively, the first assistance device and the automated device may be located in a first building, and the second assistance device may be located in a second building different from the first building.

Generating the second network connection between the automated device and the second assistance device may be performed responsive to receiving, by the computing device and from the second assistance device, an acceptance of the request to transfer service to the second assistance device. The computing device may send, to the second assistance device, data identifying the activity being performed by the user at the automated device.

Some aspects as disclosed herein are directed to, for example, a system, apparatus, non-transitory computer readable medium and/or method of receiving, by a computing device and from a server managing an activity assistance portal, status information for each of a plurality of automated devices. The status information for an automated device of the plurality of automated devices may indicate whether the automated device is available, is functioning in a self-service mode, is being assisted by the computing device, is being assisted by another computing device, or has requested to be assisted. The computing device may generate for display on a display of the computing device the status information for each of the plurality of automated devices, including first status information for a first automated device of the plurality of automated devices. The computing device may generate for display on the display of the computing device an option to switch the display from displaying the first status information for the first automated device to displaying a product or service available to a user at the first automated device. Responsive to receiving a selection of the option to switch the display, the computing device may generate for display on the display of the computing device the product or service available to the user.

The first status information may comprise an activity being performed by the user at the first automated device, and a selectable option for the computing device to assist the user to perform the activity. The product or service available to the user may comprise an opportunity flagged by the computing device or another computing device during a prior activity being performed by the user.

The computing device may generate for display on the display of the computing device a second option to switch the display from displaying the product or service available to the user to displaying the first status information for the first automated device. Responsive to receiving a selection of the second option to switch the display, the computing device may generate for display on the display of the computing device the first status information for the first automated device.

The product or service available to the user may comprise an opportunity flagged for the user during a prior interaction between the user and one of the plurality of automated devices, and the method may comprise storing, in a database and in association with a profile of the user, the opportunity flagged for the user during the prior interaction.

The first status information for the first automated device may indicate that the first automated device is being assisted by the computing device or is being assisted by another computing device. The display of the product or service available to the user may be read-only until the first status information for the first automated device indicates that assistance of the first automated device is completed.

The method may comprise receiving a selection of the product or service by the user at the first automated device. A database comprising a profile for the user may be accessed. An application for the product or service may be pre-populated using information from the profile for the user. In some aspects, the display of the product or service available to the user may comprise a selectable option to display one or more appointment for the user and a selectable option to display information from a profile for the user.

Some aspects as disclosed herein are directed to, for example, a system, apparatus, non-transitory computer readable medium and/or method of determining, by a computing device managing an activity assistance portal, status information for each of a plurality of automated devices at a same location. The status information for an automated device of the plurality of automated devices may indicate an activity being performed by a corresponding user at the automated device. The computing device may determine, for each of the plurality of automated devices, an amount of time associated with the activity being performed by the corresponding user at the automated device. The computing device may determine an order for assisting the plurality of automated devices based on the amount of time associated with the activity being performed by the corresponding user at the automated device. The computing device may generate for display on one or more activity assistance devices an interface comprising the status information for each of the plurality of automated devices according to the determined order.

The amount of time associated with the activity may comprise an amount of time the corresponding user spent at the automated device. Additionally or alternatively, the amount of time associated with the activity may comprise an amount of time the corresponding user spent waiting for assistance from the one or more activity assistance devices.

In some aspects, responsive to determining that a first activity assistance device of the one or more activity assistance devices is assisting a first automated device of the plurality of automated devices, the interface may be generated by positioning the status information for the first automated device above the status information for the remaining automated devices of the plurality of automated devices. The computing device may send the interface to the first assistance device. Responsive to determining that a second activity assistance device of the one or more assistance devices is assisting a second automated device of the plurality of automated devices, the method may comprise generating for display on the second activity assistance device a second interface by positioning the status information for the second automated device above the status information for the remaining automated devices of the plurality of automated devices. The computing device may send the second interface to the second assistance device. In some aspects, responsive to determining that a second activity assistance device of the one or more activity assistance devices is assisting a second automated device of the plurality of automated devices, the method may comprise generating the interface by positioning the status information for the second automated device below the status information for the remaining automated devices of the plurality of automated devices.

The method may comprise determining that an activity time at an automated device of the plurality of automated devices exceeds an expected activity time by more than a threshold. Generating the interface may comprise including a notification on the interface requesting the one or more assistance devices to assist the automated device.

Some aspects as disclosed herein are directed to, for example, a system, apparatus, non-transitory computer readable medium and/or method of authenticating a customer at an automated device based on a card and a PIN, or based on an identifying document. Based on the authenticating, the method may comprise determining a profile for the customer stored in a database. Information identifying a plurality of accounts of the customer may be retrieved from the profile. A transaction assistance computing device may be granted access to information from the plurality of accounts based on the information identifying the plurality of accounts. The method may comprise generating for display on a display of the transaction assistance computing device the information from the plurality of accounts.

The authenticating may be based on the card and the PIN, and the card may be associated with a single account of the plurality of accounts of the customer. In some aspects, responsive to authenticating the customer at the automated device, the customer may be granted access to the plurality of accounts at the automated device.

The authenticating may be based on the identifying document, and the authenticating may comprise generating for display on the display of the transaction assistance computing device an image of the identifying document scanned at the automated device and the profile for the customer determined based on the authenticating. Alternatively, the authenticating may comprise generating for display on the display of the transaction assistance computing device an option to search for the customer in the database.

The method may comprise performing a second authentication of the customer at the automated device based on information retrieved from the profile for the customer. In some aspects, information identifying flagged opportunities for the customer may be retrieved from the profile. The method may comprise generating for display on the display of the transaction assistance computing device the flagged opportunities for the customer.

Some aspects as disclosed herein are directed to, for example, a system, apparatus, non-transitory computer readable medium and/or method of authenticating a user at an automated device based on a first form of authentication. During performance of an activity by the user at the automated device, it may be determined that an alert occurred and the activity at the automated device may be paused. Responsive to a computing device receiving an indication of the alert, the method may comprise generating for display on a display of the computing device a request for the computing device to authenticate the user based on a second form of authentication. Responsive to receiving a selection of an option to authenticate the user based on the second form of authentication, the computing device may send a message indicating that the user is authenticated based on the second form of authentication. The activity at the automated device may be resumed based on the second form of authentication.

The first form of authentication may comprise a card and a PIN, and the second form of authentication may comprise a driver's license. The request for the computing device to authenticate the user based on the second form of authentication may comprise an image of the driver's license scanned at the automated device. The request for the computing device to authenticate the user based on the second form of authentication may comprise a prompt for an agent using the computing device to input information from the driver's license.

The second form of authentication may comprise an ID of the user, and the request for the computing device to authenticate the user based on the second form of authentication may comprise a prompt for an agent using the computing device to input an ID type of the ID, a jurisdiction issuing the ID, a unique identifier of the ID, and an expiration date of the ID. The second form of authentication may comprise an agent override of the alert. Sending the message indicating that the user is authenticated based on the second form of authentication may comprise sending the message to a server managing an activity assistance portal for a location of the automated device.

BRIEF DESCRIPTION OF THE DRAWINGS

The present disclosure is illustrated by way of example and not limited in the accompanying figures in which like reference numerals indicate similar elements and in which:

FIGS. 8A-8D illustrate an example of at least a portion of a flow diagram for a check deposit at an automated device in which various aspects of the disclosure may be implemented.

FIG. 33 illustrates example user interfaces for authenticating a customer in which various aspects of the disclosure may be implemented.

FIG. 43 illustrates an example user interface for a supervisor override in which various aspects of the disclosure may be implemented.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
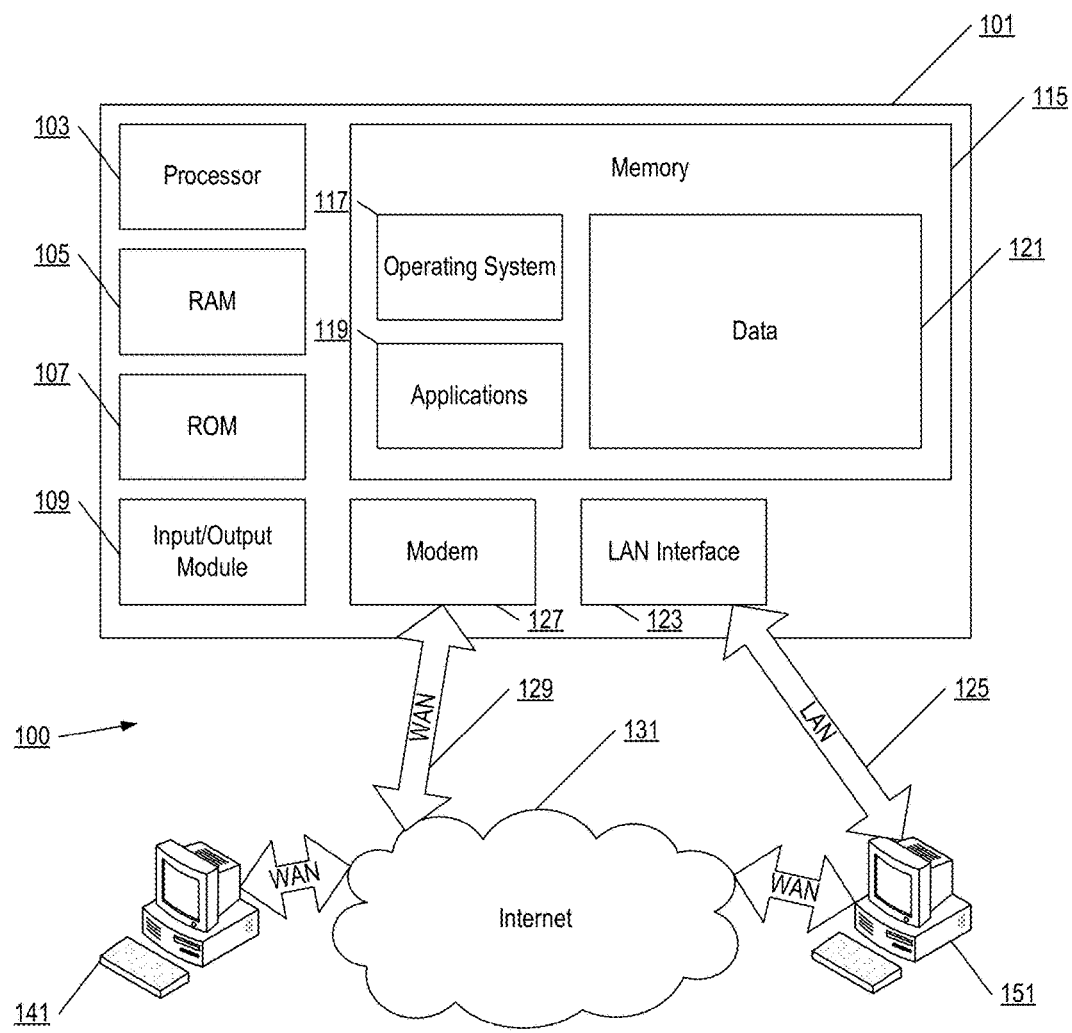
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure (including the system of FIG. 1) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
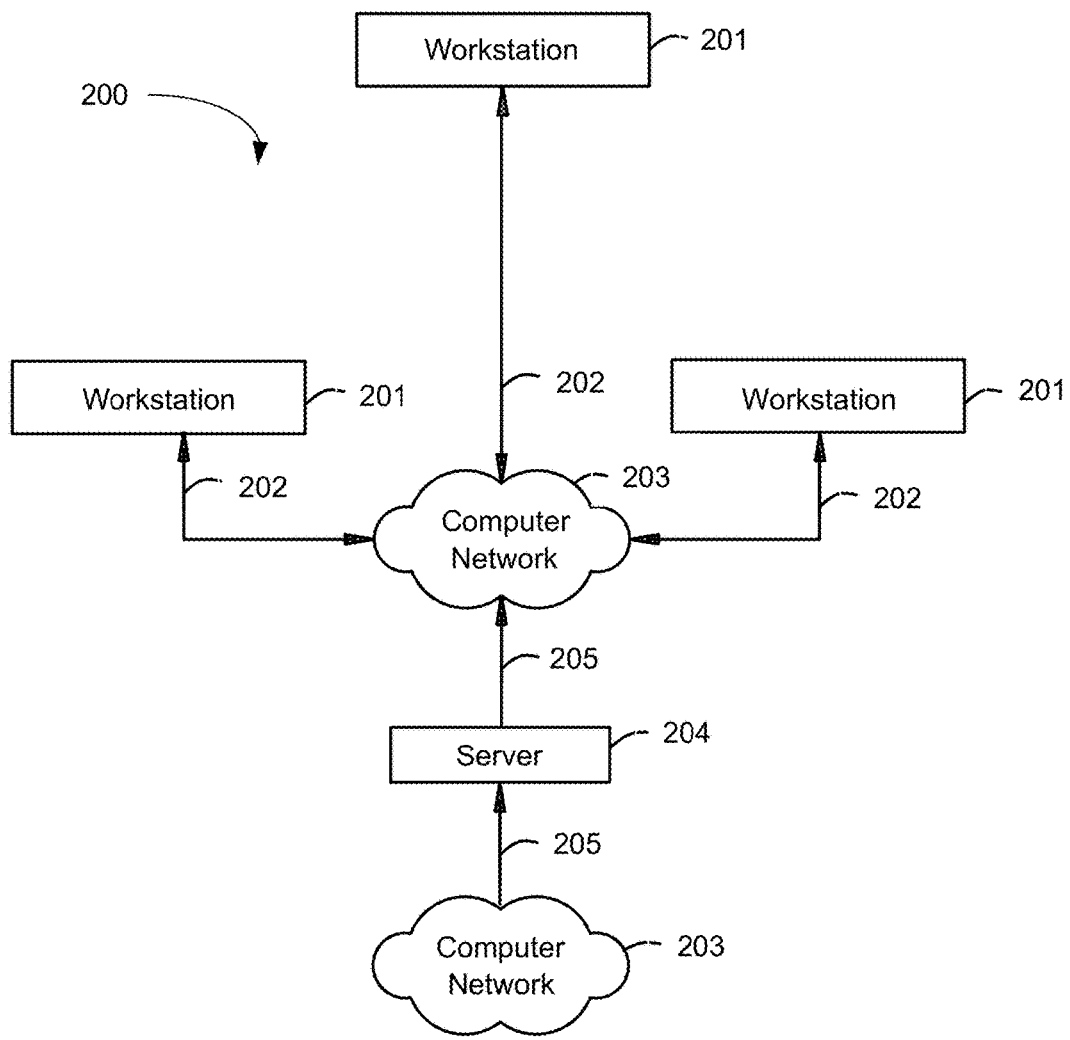
FIG. 2 illustrates an example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
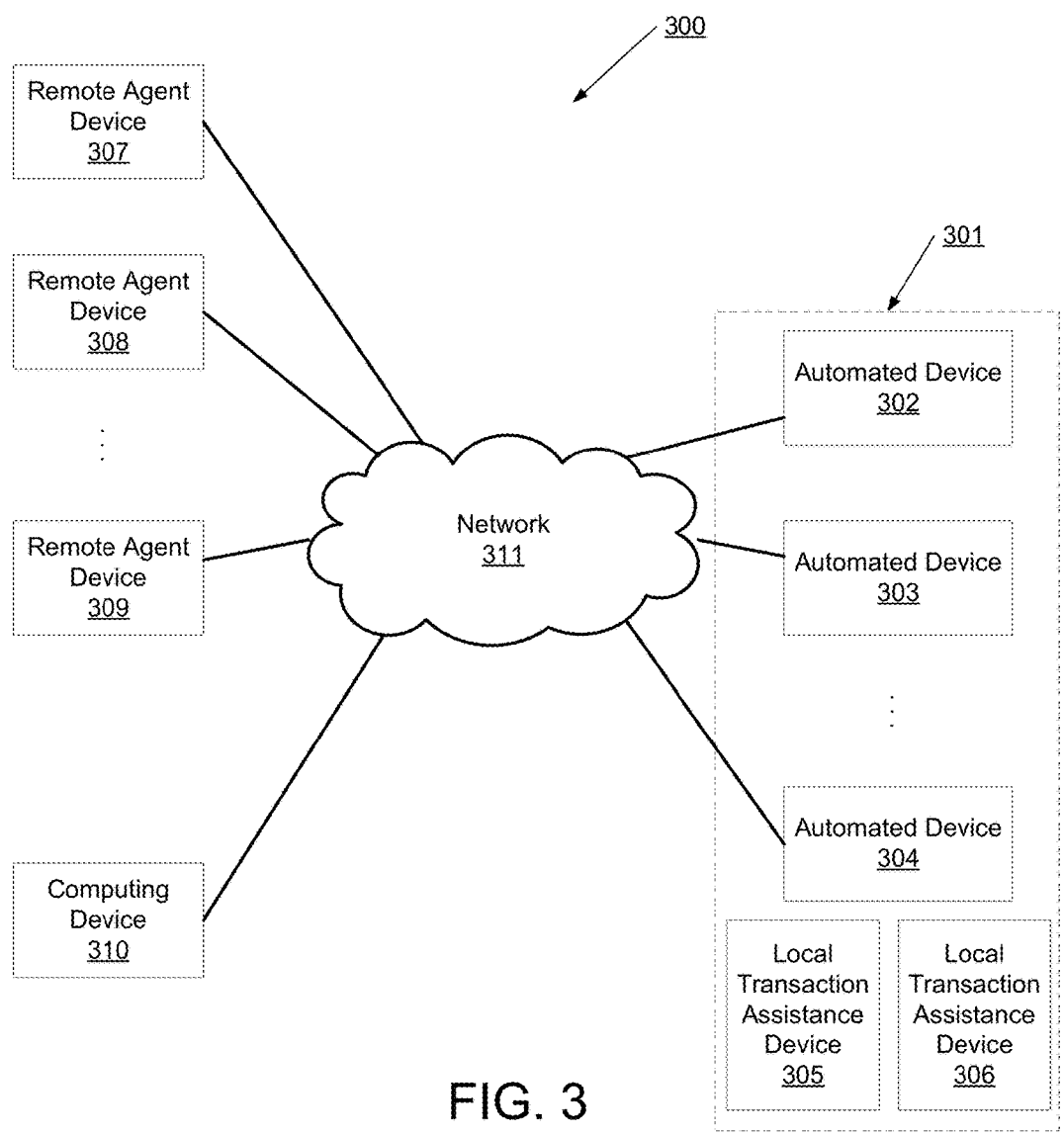
FIG. 3 illustrates an example operating environment in which various aspects of the disclosure may be implemented.

FIG. 3 illustrates an example operating environment 300 in which various aspects of the disclosure may be implemented. The operating environment 300 may comprise one or more locations, such as the location 301. The location 301 may comprise the location of one or more automated devices (e.g., automated device 302, automated device 303, automated device 304, and the like), such as a transaction center (e.g., a banking center) comprising automated device(s) or another building or outdoor location comprising automated device(s) (e.g., a grocery store, a commercial building location, a lobby, a retail location, and the like). The location 301 may also comprise the location of one or more local transaction assistance (LTA) devices (e.g., LTA device 305, LTA device 306, and the like). For example, one or more LTA devices may be located within the same building and/or outdoor location as one or more automated devices.

The automated device 302 (and automated device 303, 304, and the like) may facilitate self-service, assisted service, and/or full service activities (e.g., transactions) between users and entities, such as a financial institution. The users may be, but are not necessarily, customers of the entity. In some aspects, the automated device may comprise an automated teller machine (ATM), a video transaction machine (VTM), or any other self-service device.

The automated device 302 may comprise one or more input and/or output devices that facilitate interaction between the user and the automated device, the financial institution, a local agent, a remote agent, and the like. For example, the automated device may comprise a display screen, which may be a touchscreen or non-touchscreen display. The automated device may comprise keypad, a keyboard, a mouse, or any other input devices. For example, the user may be able to provide his or her PIN or other identifier during authentication. The automated device may comprise audio devices, such as a microphone for listening to the user and a speaker for providing audio instructions to the user. The automated device may also comprise optical devices, such as a scanner for scanning user identification (e.g., a driver's license, a passport, a student ID, or any other identification), for scanning checks for cashing or deposit, and the like. In some aspects, the user identification may be used to authenticate the user. The automated device may comprise a video camera, which may also be used to scan user identification or to facilitate interaction between the user and a local agent or a remote agent.

The automated device 302 may comprise additional devices usable to facilitate a self-service, assisted service, or full service transaction. The automated device may authenticate a user, such as a customer or a non-customer. For example, the automated device may comprise a card scanner that may be used to scan a card, such as a bank card, a credit card, a debit card, and the like to authenticate the user. In addition to scanning the card, the user may provide credentials, such as a PIN. The user may also authenticate using other identification, such as a driver's license, passport, and the like, as previously explained.

The automated device 302 may be used to perform transactions, such as financial transactions. For example, the automated device may comprise a dispensing device for dispensing cash, money orders, checks, or any other financial instruments for withdrawal. The automated device may also comprise an instrument accepting device for accepting cash, money order, checks, or any other financial instruments for deposit. Other exemplary transactions that may be performed at the automated device 302 include, but are not limited to, credit card advances, inquiries, and payments, balance inquiries, payments and transfers, and the like. If the user is a customer, the user may also be able to set preferences for the user's account(s) using the automated device 302, such as changing a PIN or password to his or her account(s) or a language preference. The user may also be able to access his or her profile on the automated device 302.

The automated device 302 may comprise a printer for printing, for example, a receipt for the transaction. Additionally or alternatively, a transaction receipt may be emailed to the user. The automated device 302 may also provide advertisements, promotions, offers, and the like to the user, as will be described in further detail below.

The LTA device 305 (and/or LTA device 306) may be used by a local agent to assist or otherwise interact with a user at the location 301. For example the LTA device 305 may comprise a tablet device, a smartphone, a laptop computer, a desktop computer, and the like. The LTA device may have a display screen, which may comprise a touchscreen or non-touchscreen display. The LTA device may comprise input and/or output devices that may be used by the local agent to receive alerts, access customer accounts with the financial institution, assist users at automated devices, interact with other local agents, and interact with remote agents, among other capabilities, as will be described in further detail below. Exemplary input and/or output devices of the LTA device include, but are not limited to, the touchscreen display, a front facing video camera, a rear facing video camera, a speaker, a microphone, a biometric reader for scanning a fingerprint, a keyboard, a mouse, a keypad, other buttons, and the like.

The operating environment 300 may also comprise one or more remote agent device 307, 308, 309, and the like. Like the LTA device, the remote device may be used by an agent, such as a remote agent, to assist or otherwise interact with a user at an automated device. The remote device may comprise any one or more of the input and/or output devices described above with respect to the LTA device. The remote agent device may comprise a tablet device, a smartphone, a laptop computer, a desktop computer, and the like. In some aspects, the remote agent and the remote agent's device may be at a location different from the location of the automated device. For example, the automated device 302 may be located at a transaction center, such as a banking center, and the remote agent device 307 may be located at a different transaction center, in a different building, and the like. The remote agent device 307 may be located in a different city, state, and/or country from one or more of the automated devices.

The remote agent device 307 may be within the same building as the automated device 302, but in a different room in the building. For example, the automated device 302 may be located in the lobby of a transaction center, whereas the remote agent device 307 and remote agent device may be located in a conference room or office of the same transaction center. In some aspects, the remote agent device 307 may be at the same location as another remote agent device, such as the remote agent device 308 or the remote agent device 309. In other aspects, remote agent devices may be at different locations.

The operating environment 300 may comprise a computing device 310, which may comprise any of the computing devices described herein. For example, the computing device 310 may comprise the computing device 101 illustrated in FIG. 1 or the server 204 illustrated in FIG. 2. The computing device 310 may facilitate communications between the automated devices, the LTA devices, and/or the remote agent devices. The computing device 310 may also manage an activity (e.g., transaction) assistance portal for LTA devices and/or remote agent devices to assist automated devices. Various methods performed by the computing device 310 will be described in further detail in the examples below. Any of the devices illustrated in FIG. 3, such as the automated devices, the LTA devices, the remote agent devices, or the computing device 310 may communicate via a network 311, which may comprise any of the networks previously described, such as the Internet, a LAN, a WAN, and the like. The network 311 may comprise a plurality of network connections between any of the automated devices, the LTA devices, the remote agent devices, or the computing device 310.

Figure 4:
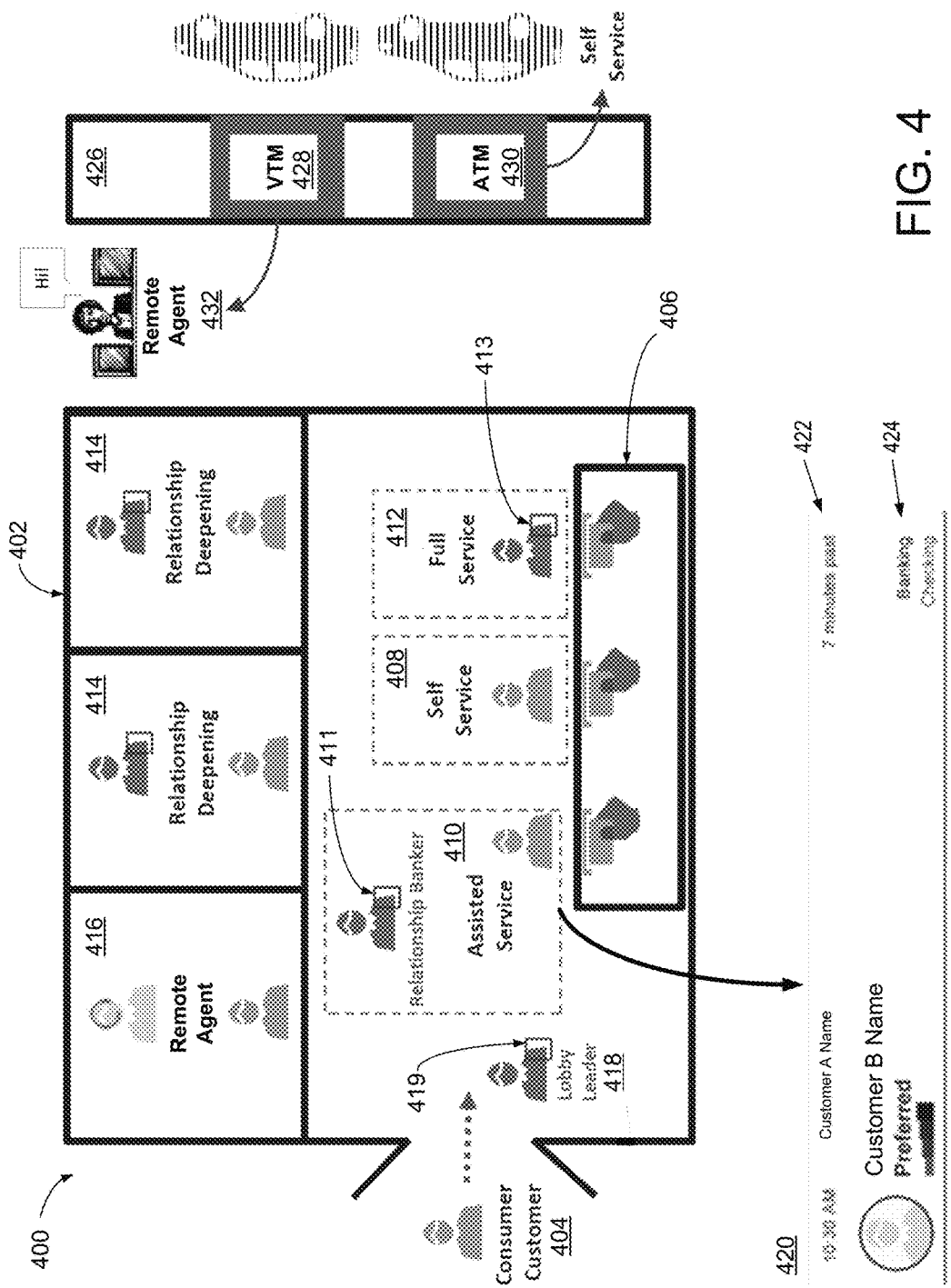
FIG. 4 illustrates an example operating environment in which various aspects of the disclosure may be implemented.

FIG. 4 illustrates an example operating environment 400 in which various aspects of the disclosure may be implemented. The operating environment 400 may comprise a building 402 (e.g., a transaction center), which may comprise the location 301 illustrated in FIG. 3 (or a portion thereof). The building 402 may comprise a transaction center for users 404 (e.g., customers or non-customers) to perform transactions, such as financial transactions. When the user 404 enters the building 402, the user 404 may access resources provided by one or more automated devices 406.

Each automated device 406 may operate in a self-service mode 408, an assisted service mode 410, or a full service mode 412. When an automated device 406 operates in the self-service mode 408, the user 404 may be able to complete a transaction without assistance from a local agent or a remote agent. In some aspects, the automated device 406 may operate in the self-service mode unless the user 404 requests assistance from an agent or an operational alert event occurs at the automated device. When the automated device 406 operates in the assisted service mode 410, a local agent, such as a relationship banker, having an LTA device 411 may assist the user 404 with part of his or her transaction (e.g., authentication, ID verification, check verification, and the like). The local agent may optionally be positioned proximate to the user 404 at the automated device 406.

In response to the user 404 requesting assistance or in response to an operational alert event occurring at the automated device 406, one or more local agents and/or remote agents may be notified of the request or alert on their devices, such as the LTA device 411, LTA device 413, and the like. An exemplary notification 420 may identify the user or customer requesting assistance, indicate the status or relationship of the user, indicate the amount of time since the request or alert 422 (e.g., 7 minutes), and/or indicate the type of account or transaction 424. Additional exemplary notifications will be described in further detail in the examples below.

The automated device 406 may alternatively be connected to a device of a remote agent, such as remote agent 416 or remote agent 432, to provide assistance to the user 404 in the assisted service mode 410. A network connection may be established between the device of the remote agent 416, 432 and the automated device 406 in response to the user 404 requesting assistance or in response to an operational alert event occurring at the automated device 406. The video and/or audio capabilities of the automated device 406 may be used to facilitate communication between the user 404 and the remote agent 416, 432. The automated device 406 may also hand over control of part of the transaction (or the entire transaction) to the device of the remote agent 416, 432 during the assisted service mode 410. During this hand over or session, the remote agent 416, 432 may be able to provide input to the automated device 406, much like the user 404 would be able to do.

When the automated device 406 operates in the full service mode 412, a local agent having an LTA device 413 may complete the transaction for the user 404 without requiring the user 404 to further interface with the automated device 406. In response to the user 404 requesting assistance or in response to an operational alert event occurring at the automated device 406, the local agent may approach the automated device 406 and complete the transaction for the user 404. The LTA device 413 of the local agent may display information different from the information displayed on the automated device 406, as will be described in further detail below. Alternatively, the automated device 406 may be connected to a device of a remote agent 416, 432 to provide assistance to the user 404 in the full service mode 412. The device of the remote agent 416, 432 may display the information (e.g., prompts, messages, and the like) being displayed on the automated device 406 such that the remote agent is able to see what the customer sees. During the full service mode 412, the remote agent 416, 432 may instruct the user to perform an action, such as entering a check, entering cash, selecting a withdrawal amount, providing authentication credentials, and the like. Each of the self-service mode 408, assisted service mode 410, and full service mode 412 will be described in further detail in the examples below.

The building 402 may also comprise a lobby leader 418 with an LTA device 419. In some aspects, the lobby leader 418 may comprise one of the local agents and may assist customers at the automated devices 406 when requested or alerted to do so. In some aspects, the information displayed on the device 419 of the lobby leader 418 may comprise the same information displayed on the devices 411 or 413 of the local agents. The lobby leader 418 may be able to coordinate the local agents at the building 402. The location 402 may comprise various rooms 414 and 416 used by local and remote agents to assist users 404 at the automated devices 406. For example, the remote agent in the room 416 may be providing video assistance to a user at an automated device 406 or an automated device at a different building location. The remote agent in the room 416 may also be physically assisting a user in the room 416. The rooms 414, 416 may be used to deepen relationships between the users and the financial institution. For example, local agents in the rooms 414 may provide the user with promotions, offers, marketing, and the like.

The operating environment 400 may also comprise a location 426 (e.g., a structure) having automated devices that users may use to perform transactions. The example location 426 includes a video transaction machine (VTM) 428 and an ATM 430. Similar to the automated devices 406 in the building 402, the VTM 428 and ATM 430 may operate in a self-service mode, an assisted service mode, or a full service mode. In some aspects, the location 426 might not have any local agents, such as if the location 426 is an outdoor location. Instead, the VTM 428 or ATM 430 may be connected to a device of a remote agent (e.g., via video, audio, and the like), such as remote agent device 432 or 416, if the user requests assistance and/or a transaction alert occurs. In some aspects, the location 426 may comprise a drive through location, such that users may perform transactions without stepping out of their vehicles.

Figure 6A:
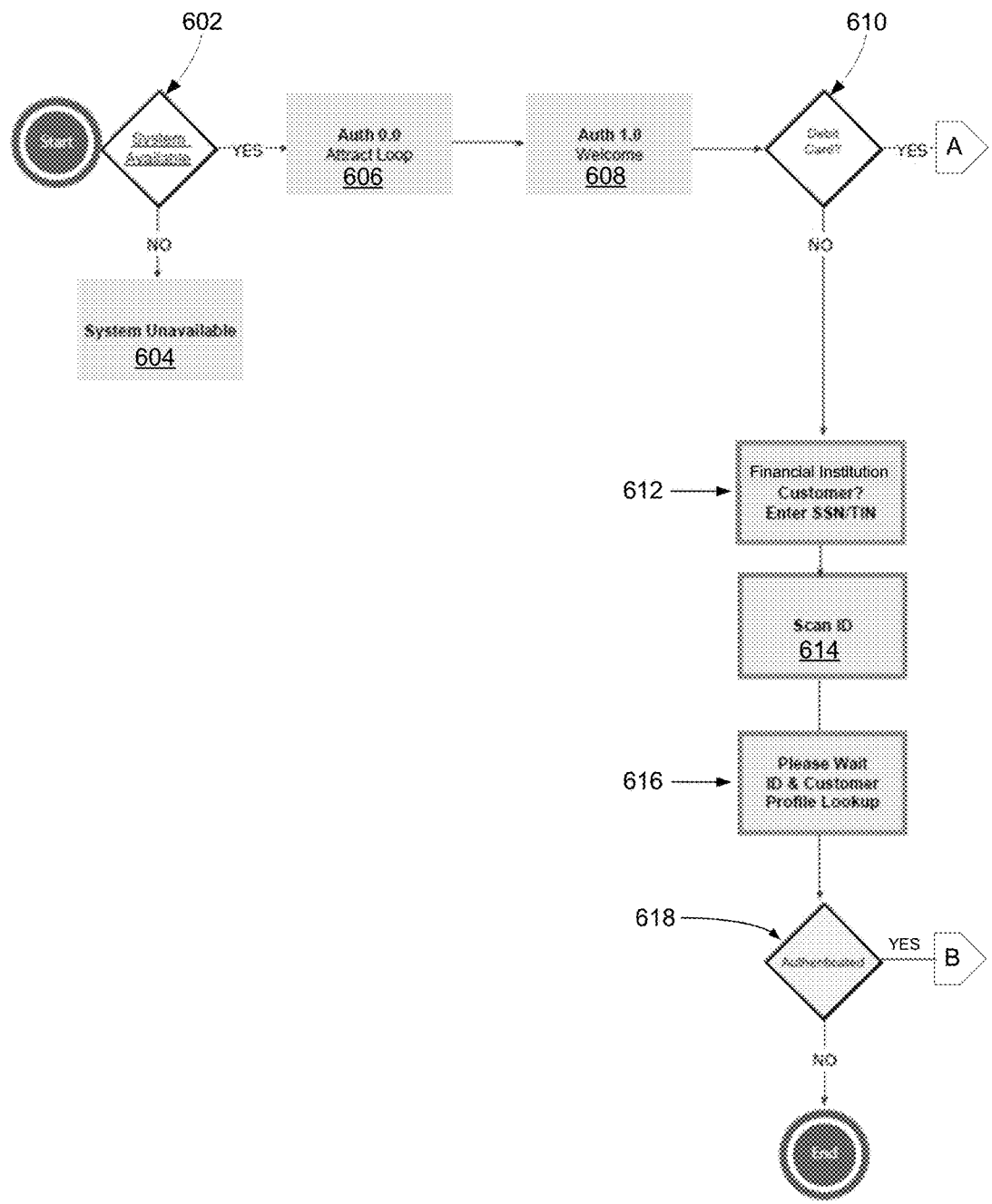
FIGS. 6A and 6B illustrate an example of at least a portion of a flow diagram for authentication at an automated device in which various aspects of the disclosure may be implemented.
Figure 6B:
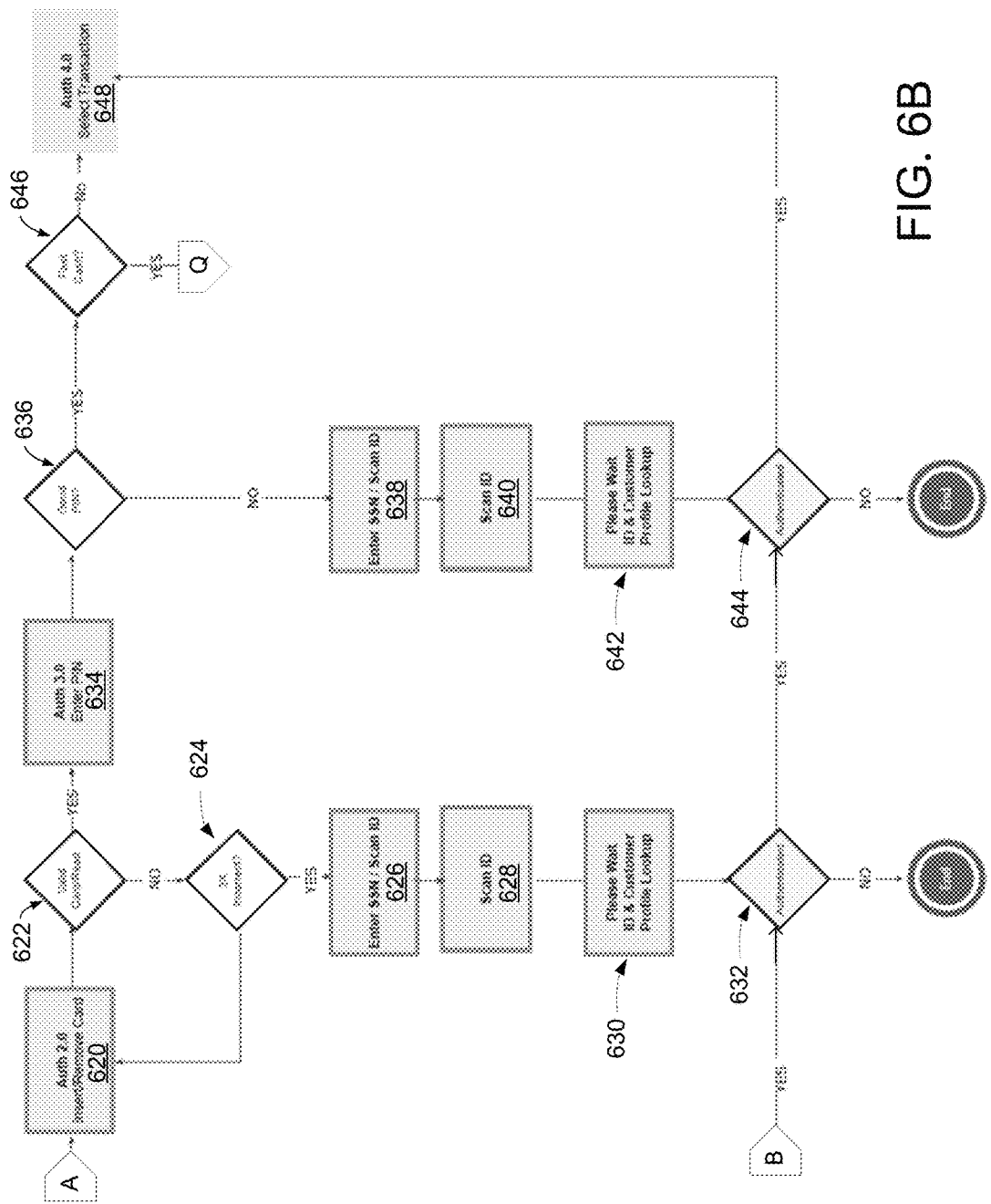

FIGS. 6A and 6B illustrate an example of at least a portion of a flow diagram for authentication at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In step 602, a computing device may determine whether the system is available to perform authentication of a user at an automated device. If not (step 602: N), the computing device may determine that the system is unavailable in step 604 and optionally display a message on the automated device indicating to the user that the system is unavailable. The system may be unavailable if the automated device is malfunctioning, service is being performed on the system, or the user otherwise cannot be authenticated via the automated device. If the system is available to authenticate the user at the automated device (step 602: Y), the method may proceed to step 606.

Figure 14:
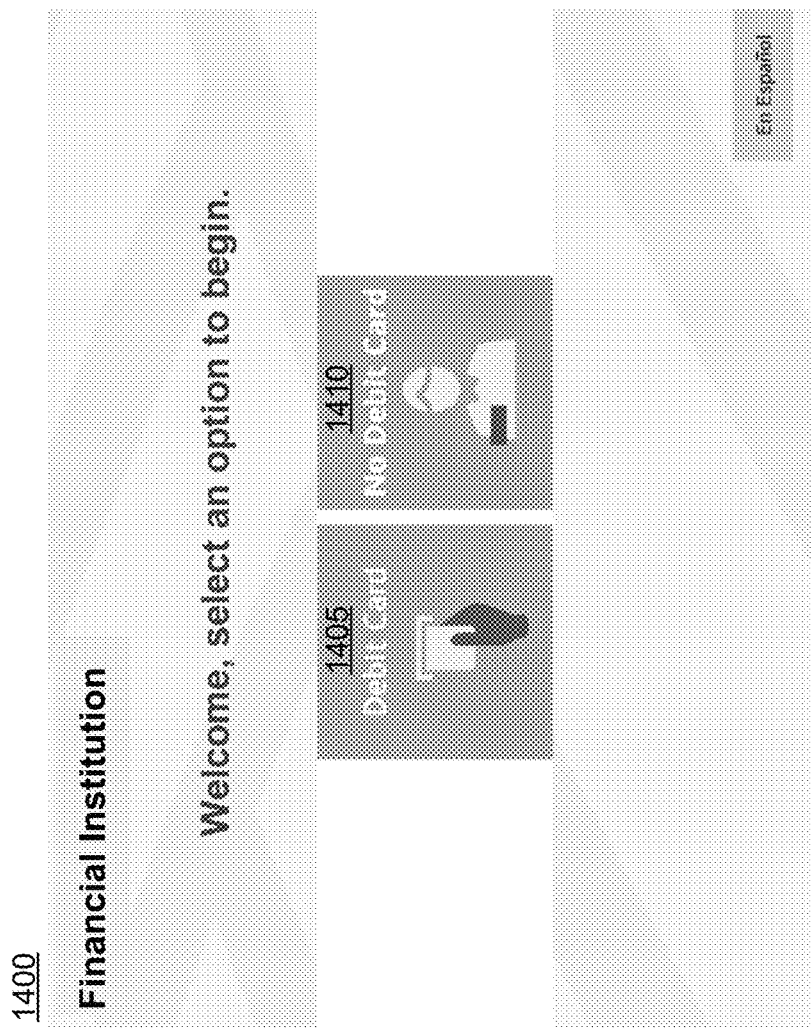
FIG. 14 illustrates an example user interface for a welcome screen at an automated device in which various aspects of the disclosure may be implemented.

In step 606, the automated device may initiate an attraction loop. For example, the automated device may display one or more still images or videos while waiting for a user. After the attraction loop, the automated device, in step 608, may display a welcome screen to the user. FIG. 14 illustrates an example user interface 1400 for the welcome screen at the automated device in which various aspects of the disclosure may be implemented. The welcome screen 1400 may display an option 1405 for the user to authenticate with a card (e.g., a debit card, bank card, credit card, and the like) and/or an option 1410 for the user to authenticate using another means. The automated device may wait for a user selection of the option 1405 or the option 1410.

Returning to FIG. 6A, in step 610, the computing device may determine whether the user selected the option 1405 to authenticate using a card or the option 1410 to authenticate using other means. If the user selects the latter (step 610: N), in step 612, the automated device may determine whether the user is a customer of the financial institution that owns, operates, and/or manages the automated device or the location of the automated device. If so, in step 612, the automated device may prompt the user for his or her social security number (SSN), tax identification number (TIN), or any other government-issued identifier.

In step 614, the automated device may display a prompt for the user to scan his or her ID, such as a driver's license, a passport, and the like. Once the automated device scans and obtains an image from the ID, the automated device, in step 616, may display a message to the user that the user is being authenticated by, for example, a local agent or a remote agent based on the user's ID.

Figure 31:
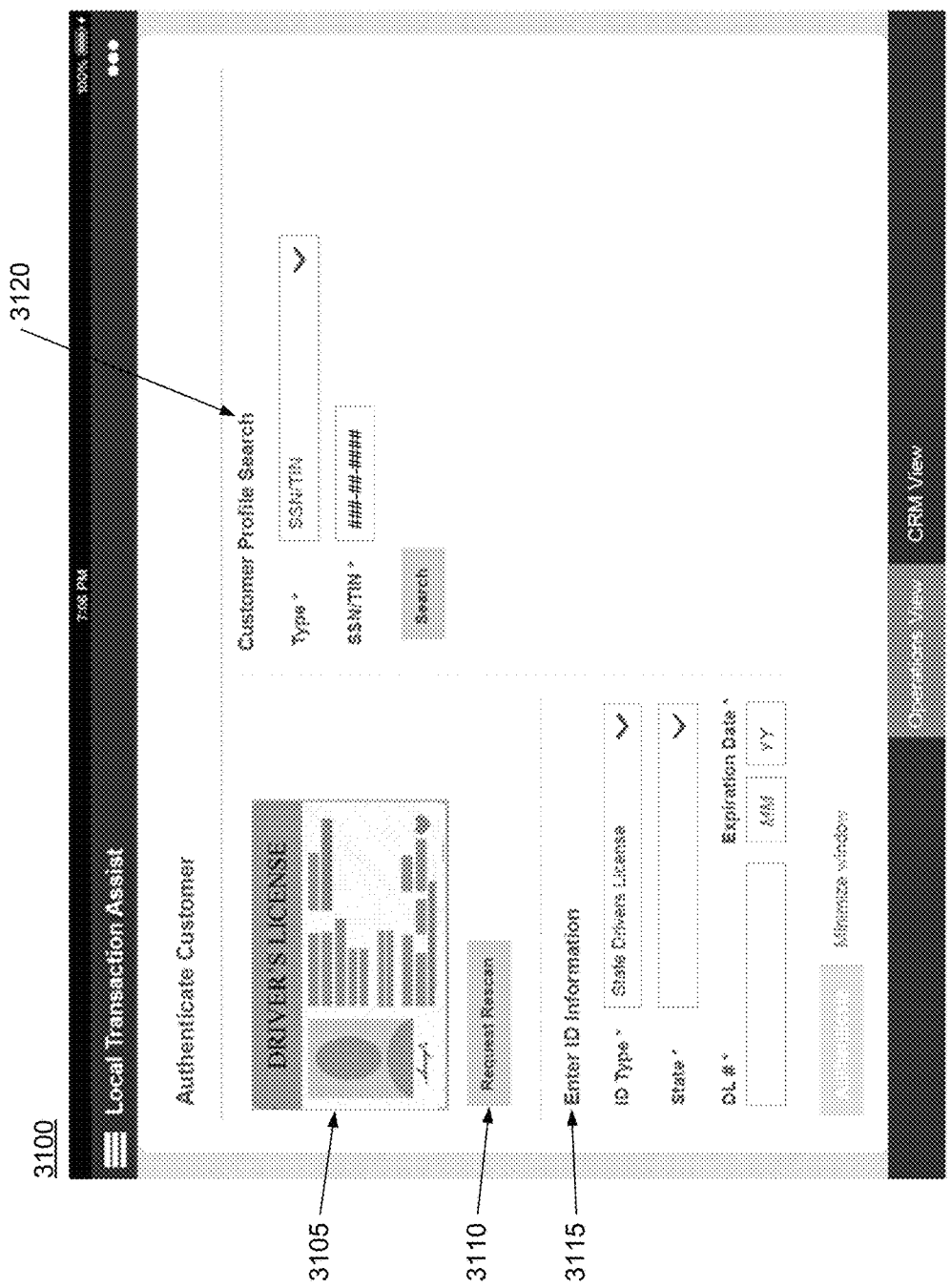
FIG. 31 illustrates an example user interface for authenticating a customer in which various aspects of the disclosure may be implemented.

FIG. 31 illustrates an example user interface 3100 for authenticating a customer in which various aspects of the disclosure may be implemented. The interface 3100 may be displayed on an LTA device of a local agent or a remote agent in response to the user scanning his or her ID. In some aspects, the user scanning his or her ID may cause an authentication alert to be displayed on one or more LTA devices via an activity assistance portal (e.g., a transaction assistance portal). The interface 3100 illustrated in FIG. 31 may be displayed on an LTA device of an agent selecting an option to service the authentication alert from the transaction assistance portal, as will be described in further detail below.

The interface 3100 may display a scanned image 3105 of the user's driver's license (or other ID). The interface 3100 may include a selectable option 3110 to request the user to rescan the driver's license, such as if the scanned image is blurry or the information on the scanned image is otherwise unreadable. If the agent selects the option 3110, the agent's device may send a request to the automated device to prompt the user to rescan the driver's license. The interface 3100 may comprise a field 3115 for the agent to enter information from the user's ID. For example, the agent may enter the ID type (e.g., state driver's license, international driver's license, passport, and the like), the state or country that issued the ID, the unique identifier for the ID (e.g., the driver's license number), and/or an expiration date for the ID. In some aspects, the fields 3115 may be pre-populated by the agent's device. For example, the agent's device (or any other computing device illustrated in FIGS. 3 and 4) may perform an optical character recognition (OCR) algorithm on the ID scanned by the user to identify the ID type, the issuing state or country, the unique identifier, and/or the expiration date of the ID.

Figure 32:
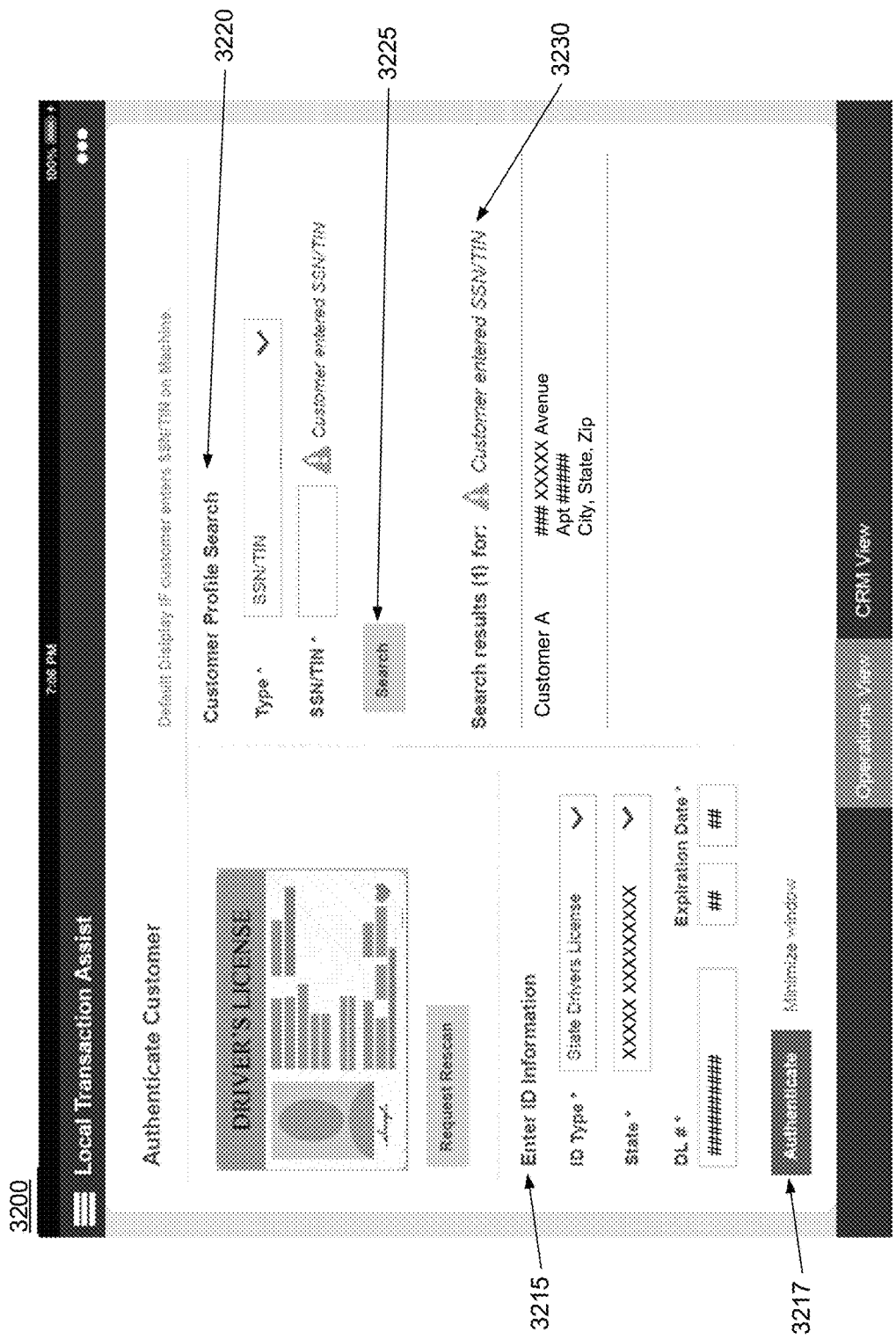
FIG. 32 illustrates an example user interface for authenticating a customer in which various aspects of the disclosure may be implemented.

FIG. 32 illustrates an example user interface 3200 for authenticating a customer in which various aspects of the disclosure may be implemented. The ID fields 3215 have been populated with the ID type (state driver's license), the issuing state, the driver's license number, and the expiration date. The agent may select the authenticate option 3217 to authenticate the user based on his or her scanned ID. In some aspects, the agent may physically approach the user in a banking center to compare the scanned ID image with the user or the physical copy of the user's ID. If the agent determines that the scanned ID image corresponds to the user, the agent may select the authenticate option 3217 to authenticate the user. Once the user is authenticated, the user may perform one or more transactions using the automated device, as will be described in further detail below.

Figure 34:
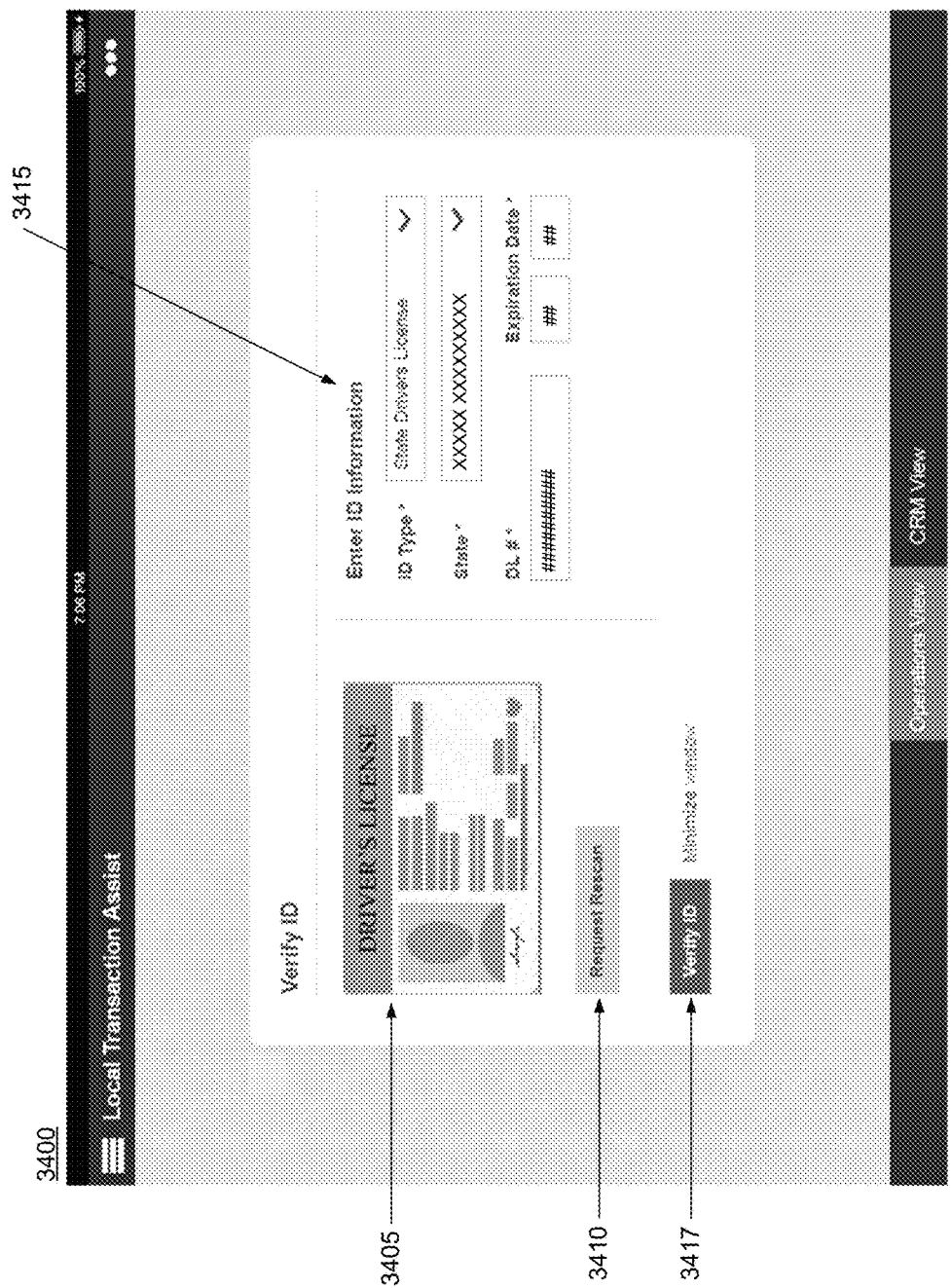
FIG. 34 illustrates an example user interface for authenticating a customer in which various aspects of the disclosure may be implemented.

FIG. 34 illustrates an example user interface 3400 for authenticating a customer in which various aspects of the disclosure may be implemented. In particular, the interface 3400 may display a scanned image of the user's driver's license 3405. The interface 3400 may also include an option 3410 to request the user to rescan the ID. The interface 3400 may include a verify ID option 3417 that, when selected by the agent, authenticates the user. The interface 3400 may comprise a field 3415 for the agent to enter information from the user's ID or for the device to pre-populate the fields with information from the scanned ID.

Returning to FIG. 31, if the user provided alternative identification, such as an SSN or TIN, the interface 3100 may optionally display the SSN or TIN in the customer profile search field 3120. The alternative identification may be used to search for the customer's profile with the financial institution based on the provided identification. With reference to FIG. 32, the interface 3200 similarly displays the customer's alternative identification in the customer profile search field 3220. The agent may select the search option 3225 to search for the customer's profile with the financial institution based on the SSN or TIN provided by the user. The interface 3200 may display search results 3230 for the SSN or TIN. For example, the search results may return the name of a single customer (Customer A) and optionally provide information for the customer, such as the customer's address.

FIG. 33 illustrates example user interfaces for authenticating a customer in which various aspects of the disclosure may be implemented. In particular, the interfaces illustrated in FIG. 33 illustrate various ways of searching for a customer. For example, the interface 3305 may be used to search for a customer by SSN or TIN, as previously described. The interface 3310 may be used to search for a customer by account number. The interface 3315 may be used to search for a customer by name and/or address information. The interface 3320 displays search results having two customer profiles (Customer A and Customer B), such as if a customer is in the system twice.

Returning to FIG. 6A, the user may be authenticated in step 618 using the ID if the agent selects any of the authenticate options previously described. Returning to step 610, if the user selects to authenticate using a card (e.g., a debit card), the method may proceed to step 620 illustrated in FIG. 6B.

With reference to FIG. 6B, in step 620, the automated device may display a prompt requesting the user to insert and/or remove the card and wait for the user to insert the card. In step 622, the automated device may determine whether the card could be properly read. If not (step 622: N), the automated device, in step 624, may request the user to reinsert the card up to a predetermined number of times, such as 3. If the user's card still cannot be used for authentication, the automated device may proceed to step 626.

Figure 20:
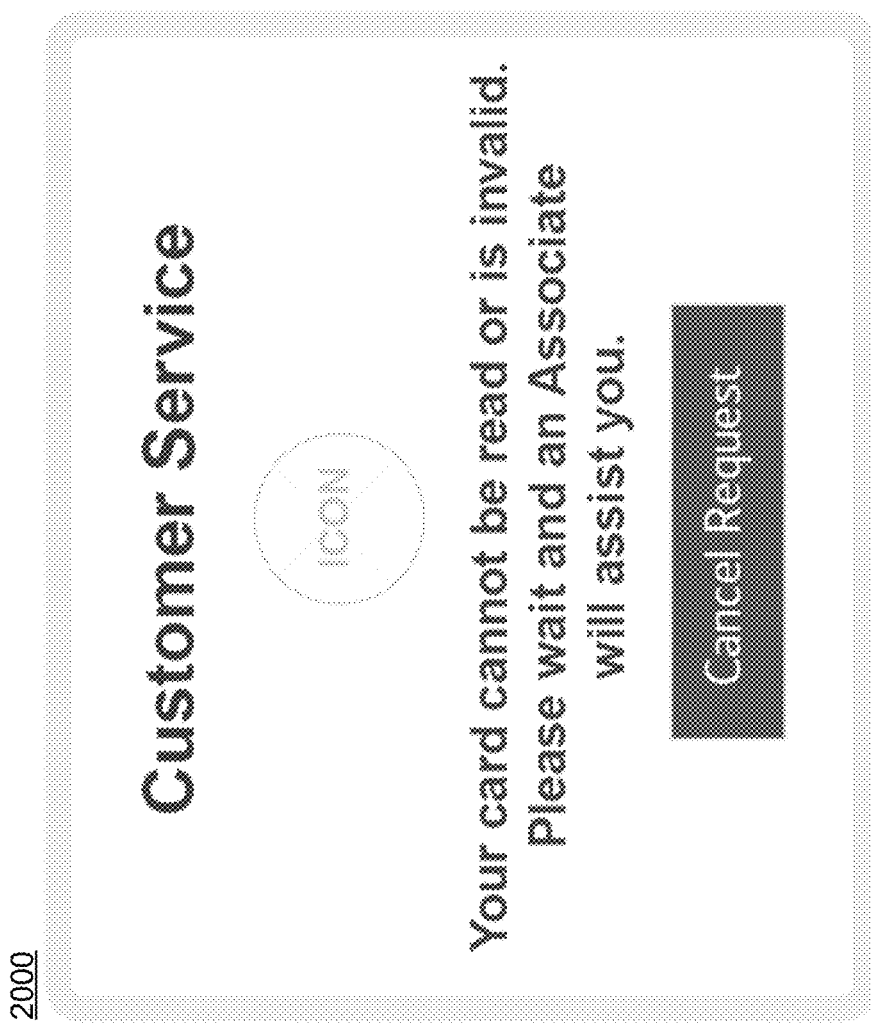
FIG. 20 illustrates an example user interface for waiting for assistance with a user card in which various aspects of the disclosure may be implemented.

Additionally or alternatively, a message may be displayed to the user if the card cannot be read or is invalid. FIG. 20 illustrates an example user interface 2000 for waiting for assistance with a user card in which various aspects of the disclosure may be implemented. In particular, the interface 2000 may indicate to the user that the user's card cannot be read or is invalid and that an agent will assist the user.

Returning to FIG. 6B, in step 626, the automated device may display a prompt for the customer to scan his or her ID and/or enter an identifier, such as an SSN or TIN. In step 628, the user may scan the ID and/or provide a SSN, as previously described with reference to step 614. In step 630, the automated device may display a message that the user is being authenticated by a local or remote agent based on the user's ID, as previously described with reference to step 616. Any of the interfaces illustrated in FIGS. 31, 32, 33, and 34 may be displayed at the agent's device, and the agent may use the interfaces to authenticate the user, as previously described. In step 632, the user may be authenticated using the ID or the SSN if the agent selects any of the authenticate options previously described.

Returning to step 622, if the card is validly read, the automated device may proceed to step 634 and display a prompt for the user to enter a PIN or other passcode corresponding to the card. In step 636, the automated device may determine whether the entered PIN is correct. If not (step 636: N), the automated device may provide the user a predetermined number of attempts to enter the correct PIN (e.g., 3 times). If the user does not provide the correct PIN within the predetermined number, the automated device may prompt the user for scan his or her ID and/or enter an SSN in step 638 (similar to step 626), receive a scanned image of the ID or the SSN in step 640 (similar to step 628), and display a message that the user is being authenticated by an agent in step 642 (similar to step 630). In step 644 (similar to step 632), the user may be authenticated using the ID or the SSN if the agent selects any of the authenticate options previously described.

Figure 19:
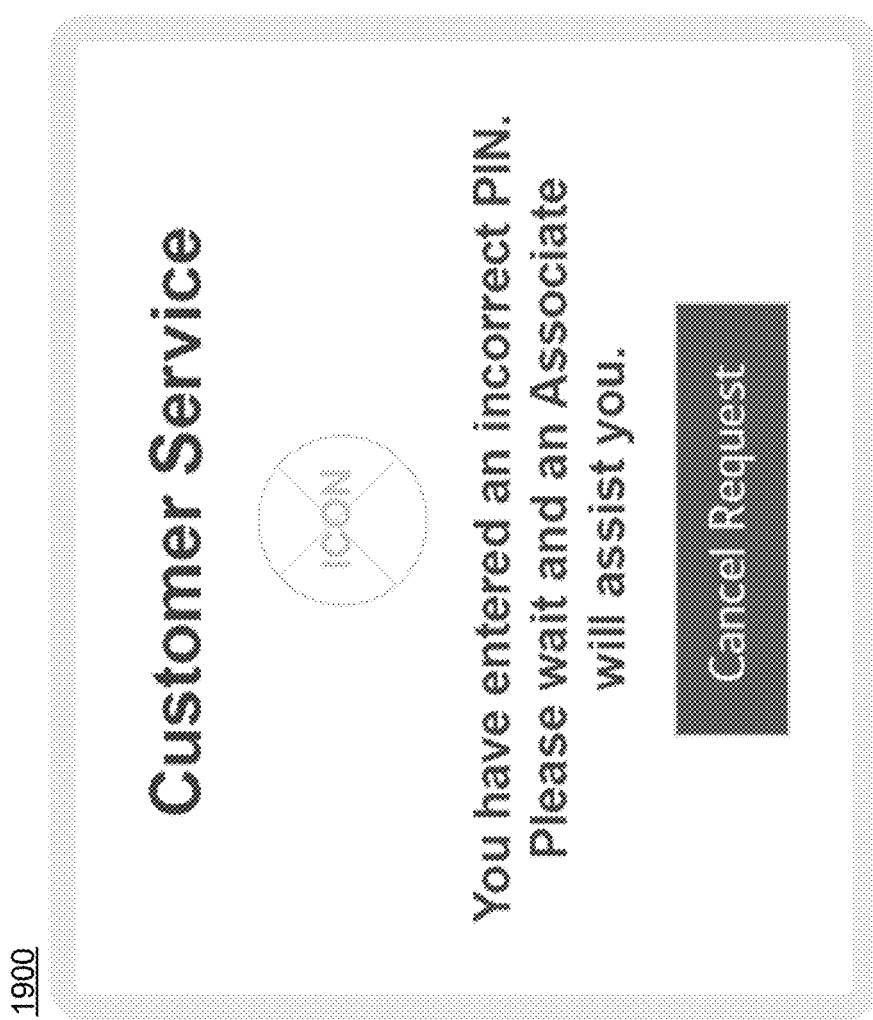
FIG. 19 illustrates an example user interface for waiting for assistance with user credentials in which various aspects of the disclosure may be implemented.

A message may be displayed to the user if the user enters an incorrect PIN. FIG. 19 illustrates an example user interface 1900 for waiting for assistance with user credentials in which various aspects of the disclosure may be implemented. In particular, the interface 1900 may indicate to the user that the user entered an incorrect PIN and that an agent will assist the user.

Returning to FIG. 6B, in step 646, the automated device may display an option for the customer to receive a designated amount of cash (e.g., fast cash), which the customer may set via his or her account(s) or profile. If the customer selects the option to receive the designated amount of cash, the automated device may dispense the designated amount and proceed to step 1118 of FIG. 11B, which will be described in further detail below. The fast cash option may allow the user to quickly withdraw cash after authenticating with the automated device. If the customer has not selected the option, the method may proceed to step 648.

Figure 15:
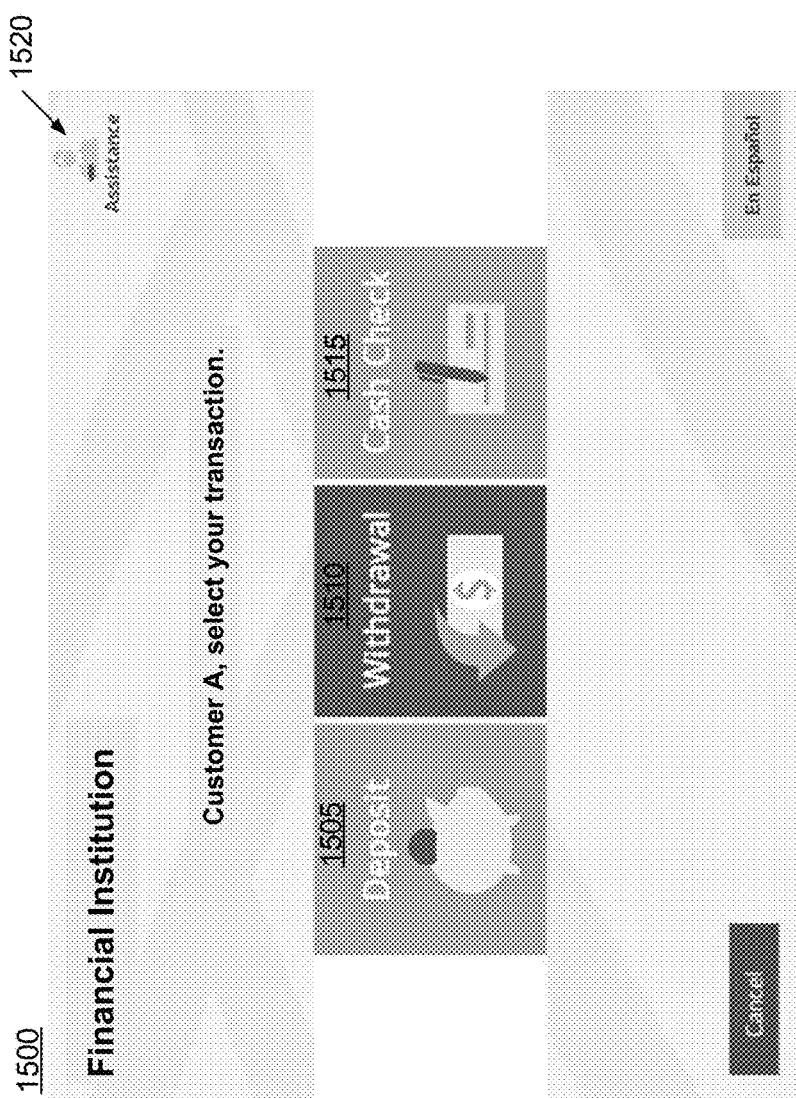
FIG. 15 illustrates an example user interface for selecting a transaction at an automated device in which various aspects of the disclosure may be implemented.

In step 648, the automated device may display an interface prompting the authenticated user to select a transaction. FIG. 15 illustrates an example user interface 1500 for selecting a transaction at an automated device in which various aspects of the disclosure may be implemented. The interface 1500 displays an option 1505 for a deposit, an option 1510 for a withdrawal, and an option 1515 to cash a check. The interface 1500 may also display an option 1520 for the user to request assistance from an agent that when selected, causes a request or alert to be displayed on local and/or remote agents' devices via a transaction assistance portal.

Figure 7A:
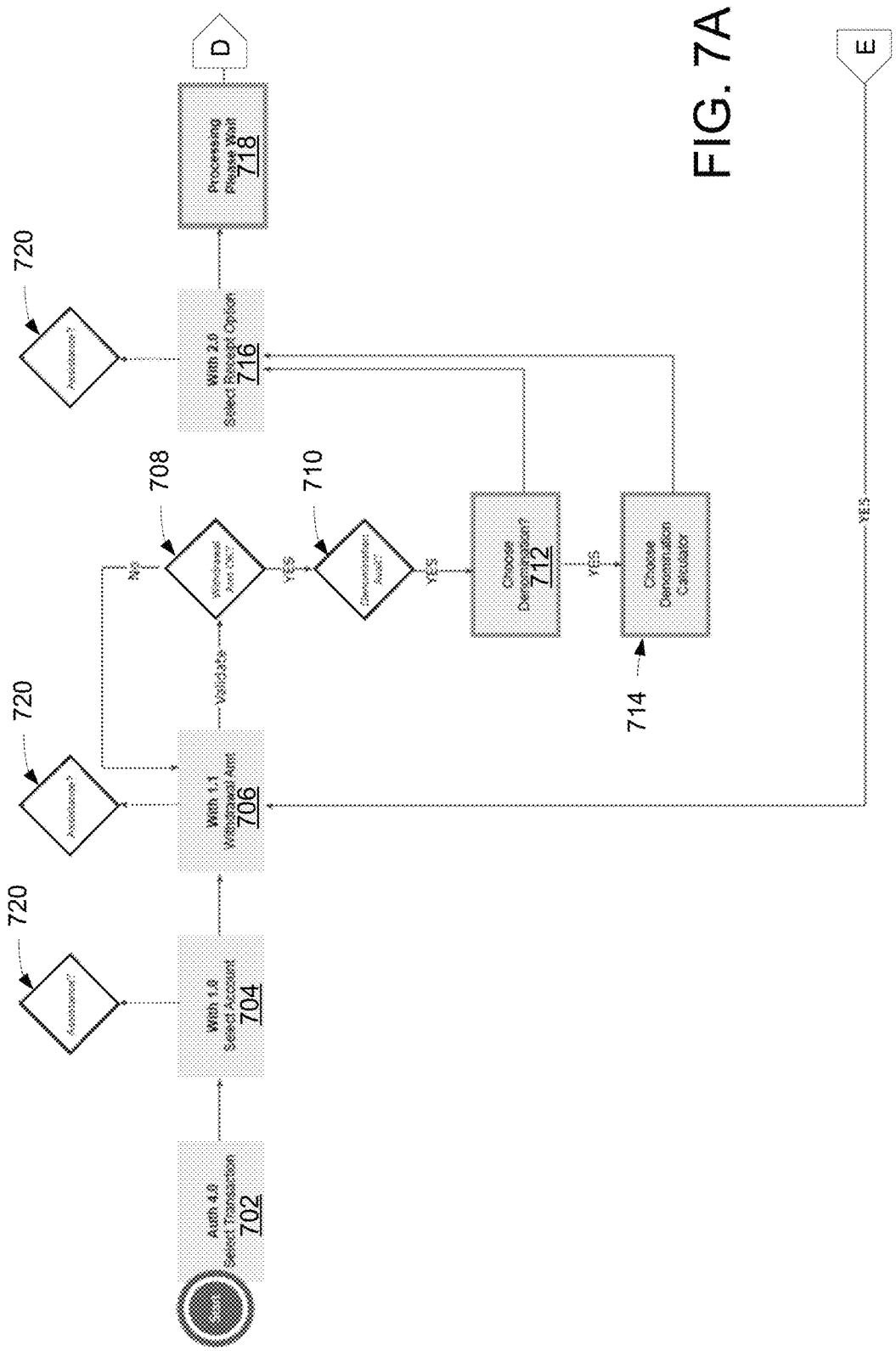
FIGS. 7A and 7B illustrate an example of at least a portion of a flow diagram for a withdrawal at an automated device in which various aspects of the disclosure may be implemented.
Figure 7B:
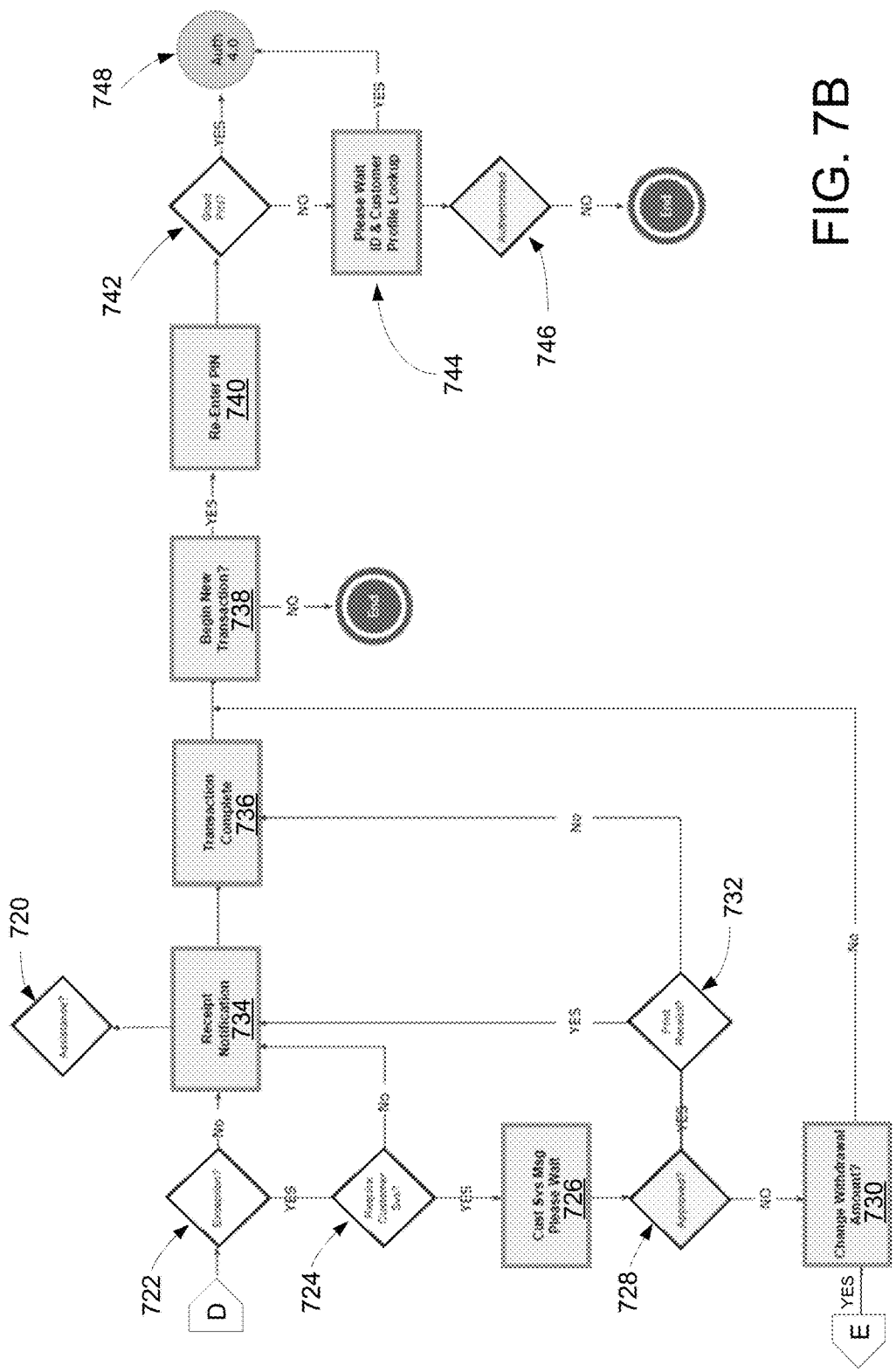

FIGS. 7A and 7B illustrate an example of at least a portion of a flow diagram for a withdrawal at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In step 702, the automated device may display an interface prompting an authenticated user to select a transaction. For example, the interface illustrated in FIG. 15 may be displayed at the automated device. If the user selects the withdrawal option 1510, the automated device may optionally highlight the withdrawal option 1510 for a predetermined amount of time (e.g., 1 second).

Figure 16:
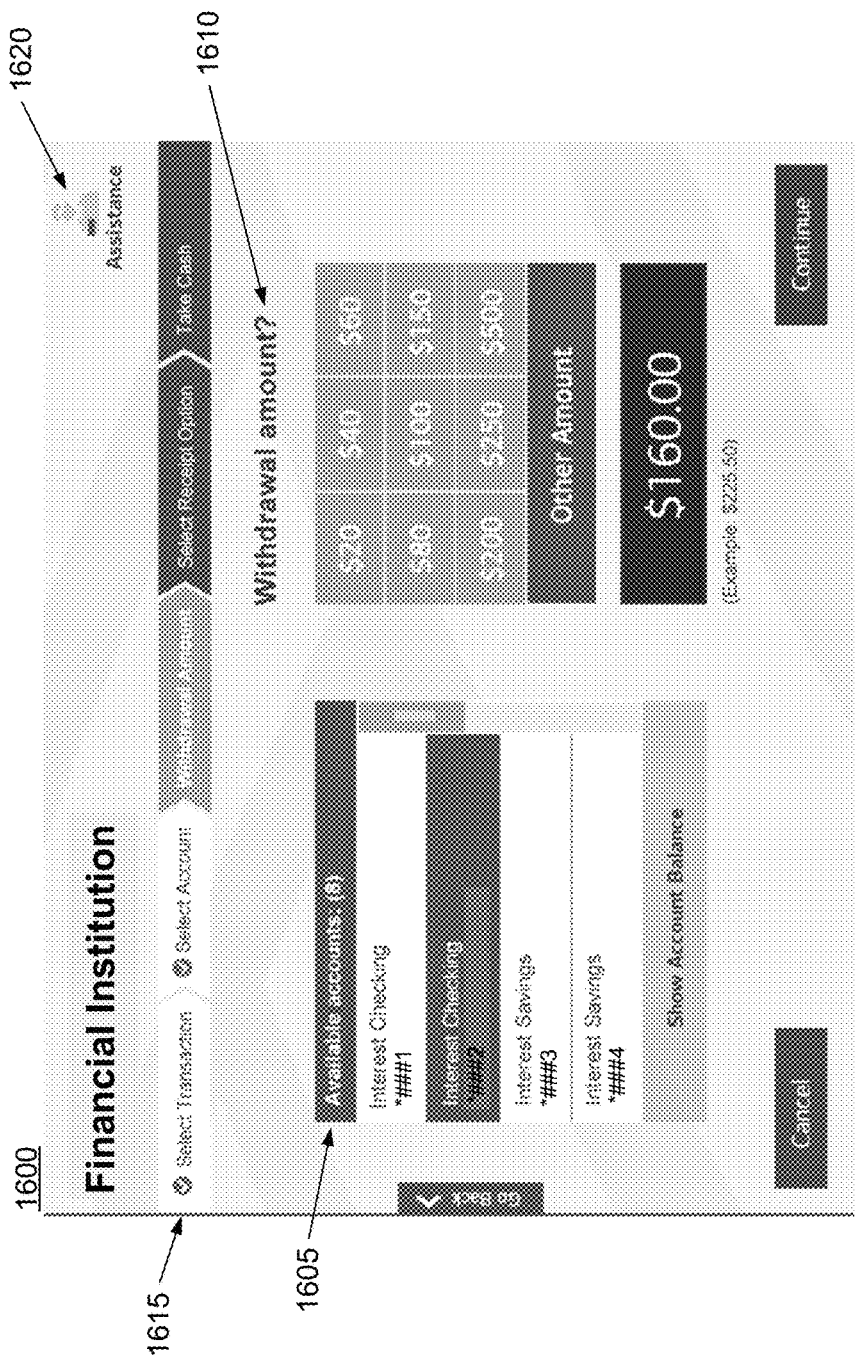
FIG. 16 illustrates an example user interface for withdrawing cash at an automated device in which various aspects of the disclosure may be implemented.

In step 704, the automated device may display an interface prompting the user to select an account to withdraw from. In step 706, the automated device may display an interface prompting the user to select a withdrawal amount. The automated device may display the prompts in steps 704 and 706 separately or together. FIG. 16 illustrates an example of the prompts in steps 704 and 706 displayed together.

FIG. 16 illustrates an example user interface 1600 for withdrawing cash at an automated device in which various aspects of the disclosure may be implemented. The interface 1600 may display the user's available accounts 1605. For example, the user may have eight available accounts to withdraw cash from. A scroll option may be provided if not all available accounts can be displayed together. The account selected by the user (e.g., Interest Checking account *###2) may be highlighted. The interface 1600 may also display an option 1610 for the user to select a withdrawal amount. The option 1610 may include fixed amounts of cash, such as $20, $40, $60, and the like. The option 1610 may also include an option for the user to input a custom amount of cash, such as $160.00. The interface 1600 may also include a progress bar 1615 indicating the progress of the transaction. The progress bar 1615 may indicate which steps of the transaction have been completed (e.g., select transaction, select account), the current step (e.g., withdrawal amount), and/or future steps that have not been completed (e.g., select receipt option, take cash). The interface 1600 may display an option 1620 for the user to request assistance from a local or remote agent.

Returning to FIG. 7A, in step 708, the automated device may attempt to validate the transaction. For example, the automated device may determine whether the withdrawal amount selected by the user is OK. For example, the user may be limited to maximum withdrawal amount, such as $500 or $1000. In step 710, the automated device may determine whether it has the denominations (e.g., $1 bills, $5 bills, $10 bills, $20 bills, $100 bills) available to create the selected withdrawal amount. If the withdrawal amount is not OK (step 708: N) or the automated device does not have the appropriate denominations (step 710: N), the automated device may return to step 706 to prompt the user to select a different withdrawal amount. Otherwise, the automated device may proceed to step 712.

In step 712, the automated device may display an option for the user to select the denominations for the cash withdrawal. If the user selects the option (step 712: Y), the automated device may calculate denominations available to the user in step 714. Otherwise (step 712: N), the automated device may determine to dispense the selected withdrawal amount using default denominations, such as $20 bills, the largest bills (e.g., a $100 bill for a $100 withdrawal), and the like.

In step 716, the automated device may display an interface prompting the user to select a receipt option. For example, the user may receive an electronic receipt (e.g., via email, text message, online account message portal, and the like) or a printed receipt. In step 718, the automated device may process the requested cash withdrawal transaction. The automated device may optionally display a message to the user that the transaction is being processed.

During any of the steps of the transaction (e.g., authentication, select transaction, select account, withdrawal amount, select receipt option, take cash), the automated device may display an option, such as option 1620 illustrated in FIG. 16, for the user to request assistance for the transaction from a local or remote agent. If the user selects the option (e.g., in step 720), the automated device may send a request to the computing device 310 (and the transaction assistance portal) or directly to any of the LTA devices 305 and 306 or remote agent devices 307-309 indicating that the user of the automated device has requested assistance. An alert indicating that the user has requested assistance may be displayed on the LTA and/or remote agent devices (along with the already displayed alerts for other users), as will be described in further detail below.

Figure 17:
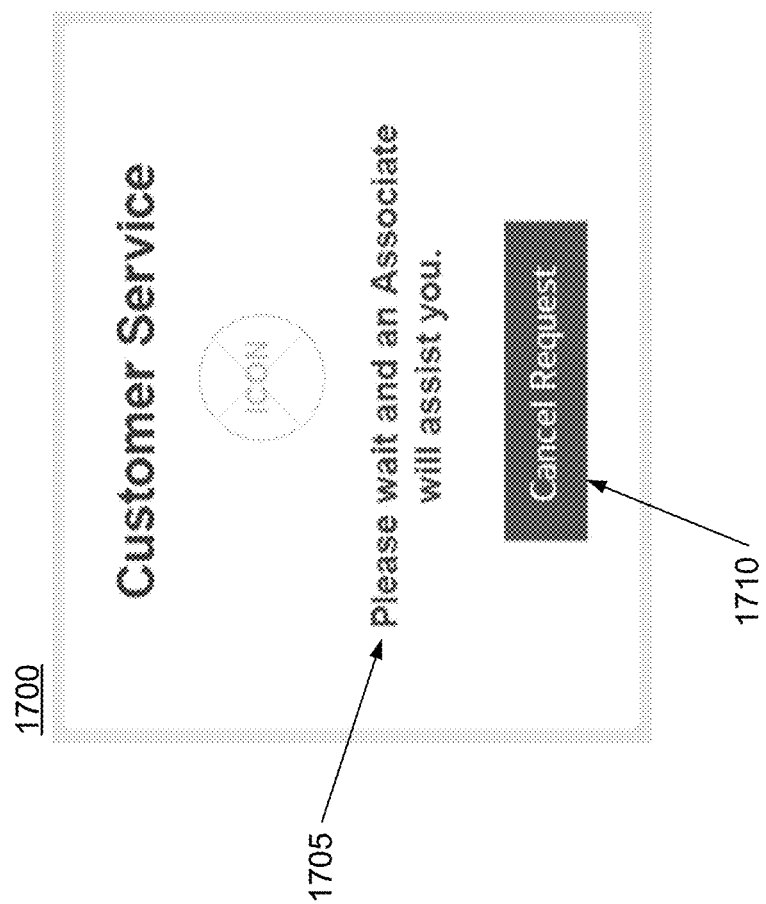
FIG. 17 illustrates an example user interface for waiting for assistance at an automated device in which various aspects of the disclosure may be implemented.

The automated device may also display a message to the user that the request for assistance has been sent. FIG. 17 illustrates an example user interface 1700 for waiting for assistance at an automated device in which various aspects of the disclosure may be implemented. The interface 1700 may include a message 1705 indicating that the request for assistance has been processed. The interface 1700 may also include an option 1710 for the user to cancel his or her request for assistance. Selection of the option 1710 may cause the automated device to return to the transaction. For example, the automated device may display the prior screen that the user used to request assistance, such as the interface 1600 illustrated in FIG. 16 if the user selected the assistance option 1620 from the interface 1600.

With reference to FIG. 7B, in step 722, the automated device (or another computing device) may determine whether an exception has occurred. The automated device may be malfunctioning. For example, a cash drawer for dispensing cash may be jammed. The automated device might be low or out on receipt paper. The user may have also have been flagged by the system for an agent to verify the user's identity prior to dispensing cash. The amount of cash requested by the user may be unusually high compared to the user's prior withdrawals or compared to average or medium cash withdrawals made at the location. In some aspects, agents may review a transaction according to business rules. Exemplary business rules include one of or a combination of a customer's method of authentication, transaction amount, transaction type, a geographical location of the transaction. The customer may have also requested assistance from an agent. As another example, the customer may have edited a check amount, and business rules may request an agent to verify the edited amount.

If an exception occurred (step 722: Y), in step 724, the automated device may determine whether assistance from a local or remote agent to handle the exception is needed. For example, assistance may be needed if a cash drawer is jammed, and the automated device cannot dispense the requested withdrawal amount. On the other hand, assistance might not be needed if the automated device is out of receipt paper and the user did not request a printed receipt. If assistance from an agent is needed (step 724: Y), the automated device may proceed to step 726 and display a message indicating to the user that an agent will assist the user.

Figure 22:
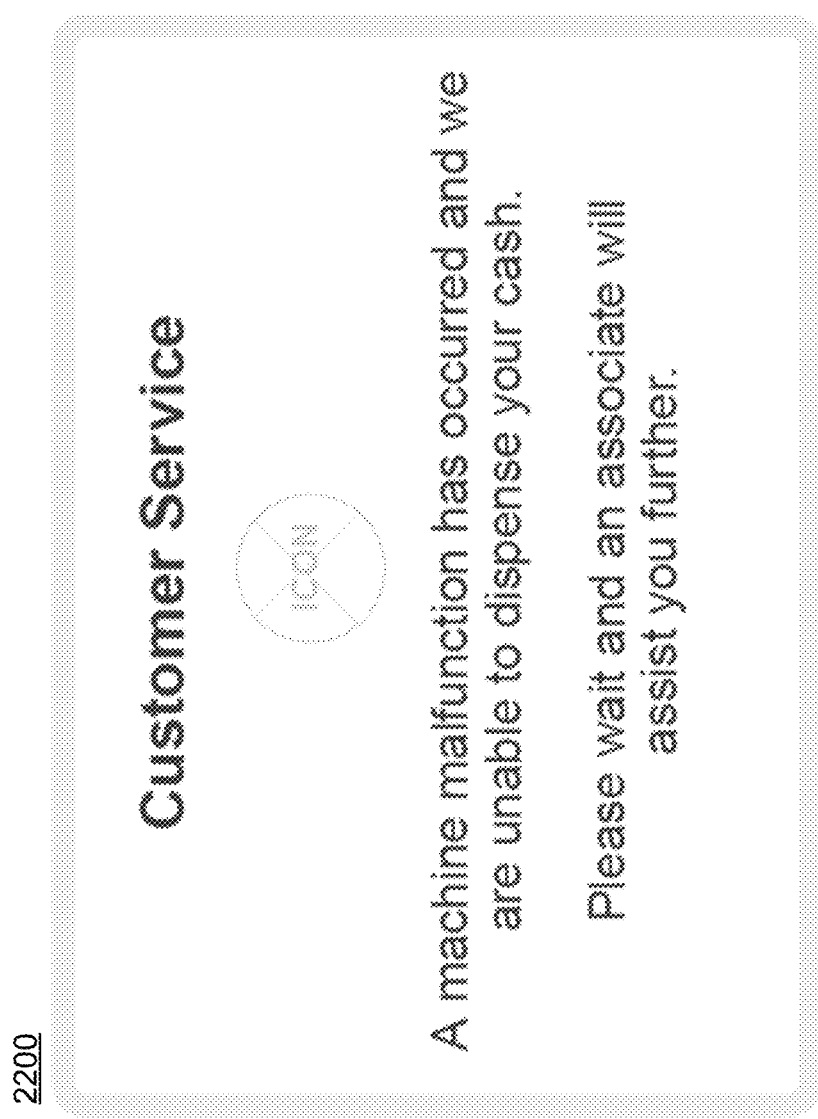
FIG. 22 illustrates another example user interface for waiting for waiting for assistance with a malfunctioning automated device in which various aspects of the disclosure may be implemented.

FIG. 22 illustrates an example user interface 2200 for waiting for waiting for assistance with a malfunctioning automated device in which various aspects of the disclosure may be implemented. In particular, the interface 2200 may display a message indicating that the automated device cannot dispense the requested cash. The message may also request the user to wait for assistance from a local or remote agent.

Returning to FIG. 7B, in step 728, the automated device (or other computing device) may determine whether to approve the cash withdrawal transaction. In some aspects, the transaction may be approved if the local or remote agent selects an approve transaction option on the agent's device, as will be described in further detail below. For example, if the user was flagged by the system, a local agent may approach the user to authenticate the user or otherwise handle the exception. After addressing the exception, the local agent may select the approve transaction option on the local agent's device to permit the cash withdrawal. A remote agent may similarly perform the approval process on the remote agent's device. If the remote agent needs access to the user to approve the transaction (e.g., to authenticate the user to the provided user credentials), the remote agent's device can connect to the automated device's video and/or audio devices, such as the camera, speaker, or microphone of the automated device. The remote agent and the user may communicate via the video and/or audio devices.

If the withdrawal has not been approved by an agent (step 728: N), in step 730, the automated device may optionally display a message to the user to change the withdrawal amount. If the user chooses not to change the withdrawal amount (step 730: N), the automated device may end the cash withdrawal transaction. If the user chooses to change the withdrawal amount (step 730: Y), the automated device may return to step 706 illustrated in FIG. 7A to determine the new withdrawal amount. For example, the user might not be approved to withdraw $1000 in cash, but may be approved to withdraw up to $500 in cash.

If the withdrawal has been approved by an agent (step 728: Y), in step 732, the automated device may optionally determine whether to print a receipt for the transaction. For example, the agent may select from his or her device to print a receipt. Additionally or alternatively, the automated device may determine whether to print a receipt based on a receipt option selected by the user in step 716 (e.g., printed receipt, electronic receipt, or none).

If the automated device determines to print a receipt (step 732: Y), the automated device may display a receipt notification to the user in step 734. The receipt notification may comprise a message indicating that a receipt is either being printed or sent electronically to the user. Additionally or alternatively, the receipt notification may provide the user an option to select a receipt type. If the automated device determines not to print a receipt (step 732: N), the automated device may complete the transaction in step 736. As previously described, an option to request assistance may be displayed on the automated device. If the option is selected (step 720: Y), the automated device may send a message requesting assistance from a local or remote agent. For example, the automated device may be out of receipt paper, but the user may desire to receive a printed receipt. By requesting assistance, a local agent may be able to provide a printed receipt to the user.

In step 738, the automated device may determine whether to perform another transaction. The automated device may display a message requesting the user to perform another transaction or to end the session. If the user selects the option to end the session or the session times out (step 738: N), the automated device may end the session. If, on the other hand, the user chooses to perform another transaction (step 738: Y), in step 740, the automated device may request the user to re-enter his or her PIN if the user authenticated with a PIN in the previous transaction.

In step 742, the automated device may determine whether the PIN entered by the user is correct. As previously explained, the automated device may provide the user with a predetermined number of tries, such as three tries. If the entered PIN is not correct (step 742: N) or if the user previously authenticated using, for example, a driver's license, the automated device may proceed to step 744 to authenticate the user based on the user's ID, as previously explained. The automated device may display a message to the user that the automated device is waiting for an agent to authenticate the user.

In step 744, local and/or remote agent devices may receive an indication that the user at the automated device needs authentication. A local or remote agent may select an option to authenticate the user. If the agent authenticates the user, the user may be authenticated in step 748, and the user may perform another transaction (e.g., step 746). On the other hand, if the agent does not authenticate the user, the session with the automated device may end.

In some aspects, the user might not need to re-authenticate with the automated device to perform another transaction. This may depend on the method of authentication during the prior transaction. The system may store an indication of the previous method of authentication, and the automated device may look up the previous method of indication. If, for example, a local or remote agent previously authenticated the user based on the user's ID or other means, the user might not need to be re-authenticated. On the other hand, the user might need to be re-authenticated if the user provided a card and/or PIN for the previous authentication.

In other aspects, rather than providing a PIN and/or an ID, such as a driver's license, for the subsequent transaction, the user might be authenticated with other information. The other information might be more readily available to the user than the PIN and/or driver's license. If the user is a customer of the financial institution, the other information may comprise any information available from the customer's profile with the financial institution. For example, the authentication information may comprise the last 4 digits of the customer's SSN, which may be stored in the customer's profile. The authentication information may comprise a portion of the customer's address, such as the customer's house number, which may also be stored in the customer's profile. Additional profile information that may be used for the second authentication include, but are not limited to, SSN, last 5 transactions, credit or debit card numbers, CVV codes, state where accounts were opened, or other account relationships.

In some aspects, the automated device may use information from the previous transaction to authenticate the user for the subsequent transaction. For example, if the previous transaction was a cash withdrawal, the automated device may prompt the user for the amount of cash withdrawn in the previous transaction. If the user enters the correct amount, the user may be authenticated for the subsequent transaction. Similarly, if the previous transaction was a check deposit, the automated device may authenticate the user if the user enters the amount deposited in the previous transaction.

The re-authentication may be based on physical attributes of the user. For example, the automated device may comprise a biometric fingerprint reader, and the user may authenticate by putting the user's hand or finger on the reader. The camera of the automated device may be used to recognize the user's face. For example, the camera and associated facial recognition software may confirm that the user that performed the previous transaction is the user that is requesting the second transaction. Alternatively, the camera and associated facial recognition software may compare a captured image of the user with the image of the user in the system, such as the user's driver's license or other ID card. In some aspects, the automated device may comprise an apparatus, such as a mat or a scale, that can measure the user's weight. If the weight has not changed between the first transaction and the second transaction, the automated device may authenticate the user for the second transaction.

FIGS. 8A-8D illustrate an example of at least a portion of a flow diagram for a check or cash deposit at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In step 802, the automated device may display an interface prompting an authenticated user to select a transaction. For example, the interface illustrated in FIG. 15 may be displayed at the automated device. If the user selects the deposit option 1505, the automated device may optionally highlight the deposit option 1505 for a predetermined amount of time (e.g., 1 second) (not illustrated).

In step 804, the automated device may display an interface prompting the user to select an account to deposit to. For example, the user's available accounts 1605 may be displayed on the automated device, and the account selected by the user may be highlighted. In step 806, the automated device may display an interface prompting the user to select a type of deposit. For example, the automated device may display an option for the user to deposit cash or to deposit checks. The automated device may display the prompts in steps 804 and 806 separately or together. Assume, for example, that the user has selected the option to deposit checks. The corresponding option may be highlighted by the automated device to provide feedback to the user.

In step 808, the automated device may display a message instructing the user to insert and/or scan one or more checks. The automated device may display instructions for inserting checks. For example, the instructions may indicate the maximum number of checks that may be inserted (e.g., 10 checks). The instructions may also instruct the user to endorse each check, smooth or flatten each check, and/or to remove any staples or envelopes.

In step 810, the automated device may determine whether one or more checks have been inserted. If not (step 810: N), the automated device may wait to receive checks from the user or may return to one or more previous screens, such as the screen in step 806. If the automated device determines that a check has been inserted, in step 812, the automated device may determine whether the check is non-negotiable or otherwise not transferrable. If so (step 812: Y), the automated device, in step 814, may display a message indicating that the entered document cannot be processed or is not negotiable. Otherwise (step 812: N), the automated device may proceed to step 816.

Figure 23:
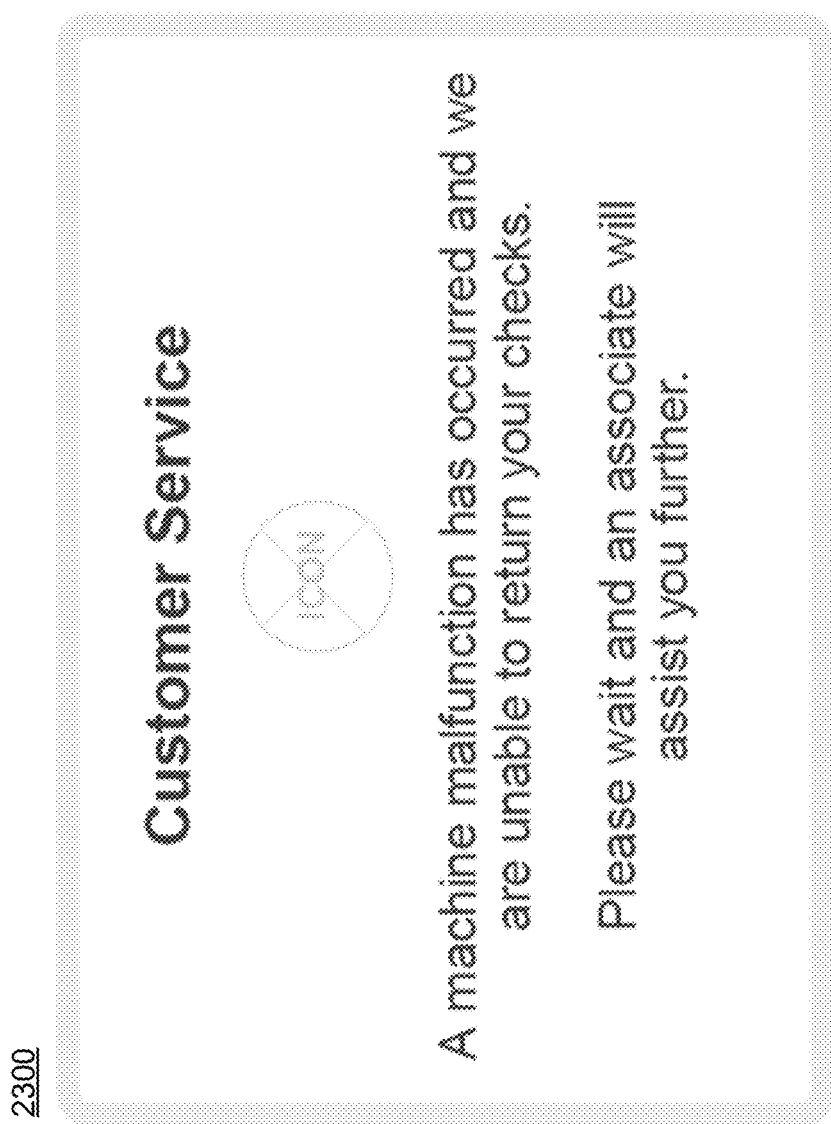
FIG. 23 illustrates yet another example user interface for waiting for assistance with a malfunctioning automated device in which various aspects of the disclosure may be implemented.

In step 816, the automated device may determine whether a check jam has occurred. If so (step 816: Y), the automated device may display, in step 818, a message indicating to the user that a jam has occurred. The automated device may also send a message to one or more local or remote agent device notifying the agent that a check jam has occurred. FIG. 23 illustrates an example user interface 2300 for waiting for assistance with a malfunctioning automated device in which various aspects of the disclosure may be implemented. For example, the interface 2300 may be displayed if a check has jammed and/or the automated device cannot otherwise return the inserted check.

During any of the steps of the check deposit transaction (e.g., authentication, select transaction, select account, deposit type, deposit review), the automated device may display an option, such as option 1520 illustrated in FIG. 15, for the user to request assistance for the transaction from a local or remote agent. If the user selects the option (e.g., in step 820), the automated device may send a request to the computing device 310 or directly to any of the LTA devices 305 and 306 or remote agent devices 307-309 indicating that the user of the automated device has requested assistance. An alert indicating that the user has requested assistance may be displayed on the LTA and/or remote agent devices (along with the already displayed alerts for other users), as will be described in further detail below. The automated device may also display a message to the user that the request for assistance has been sent. As previously explained, the interface 1700 illustrated in FIG. 17 may be displayed.

Figure 8A:
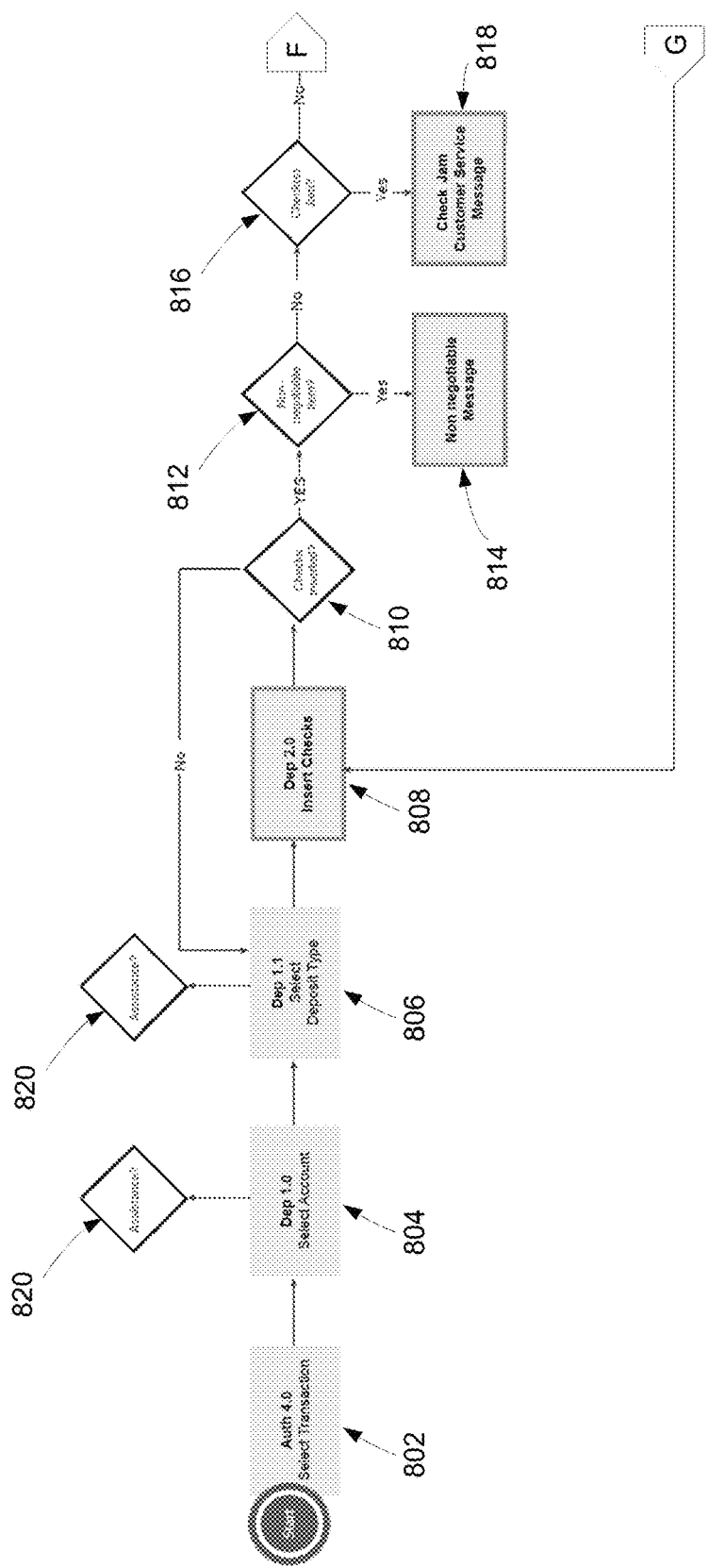
Figure 8B:
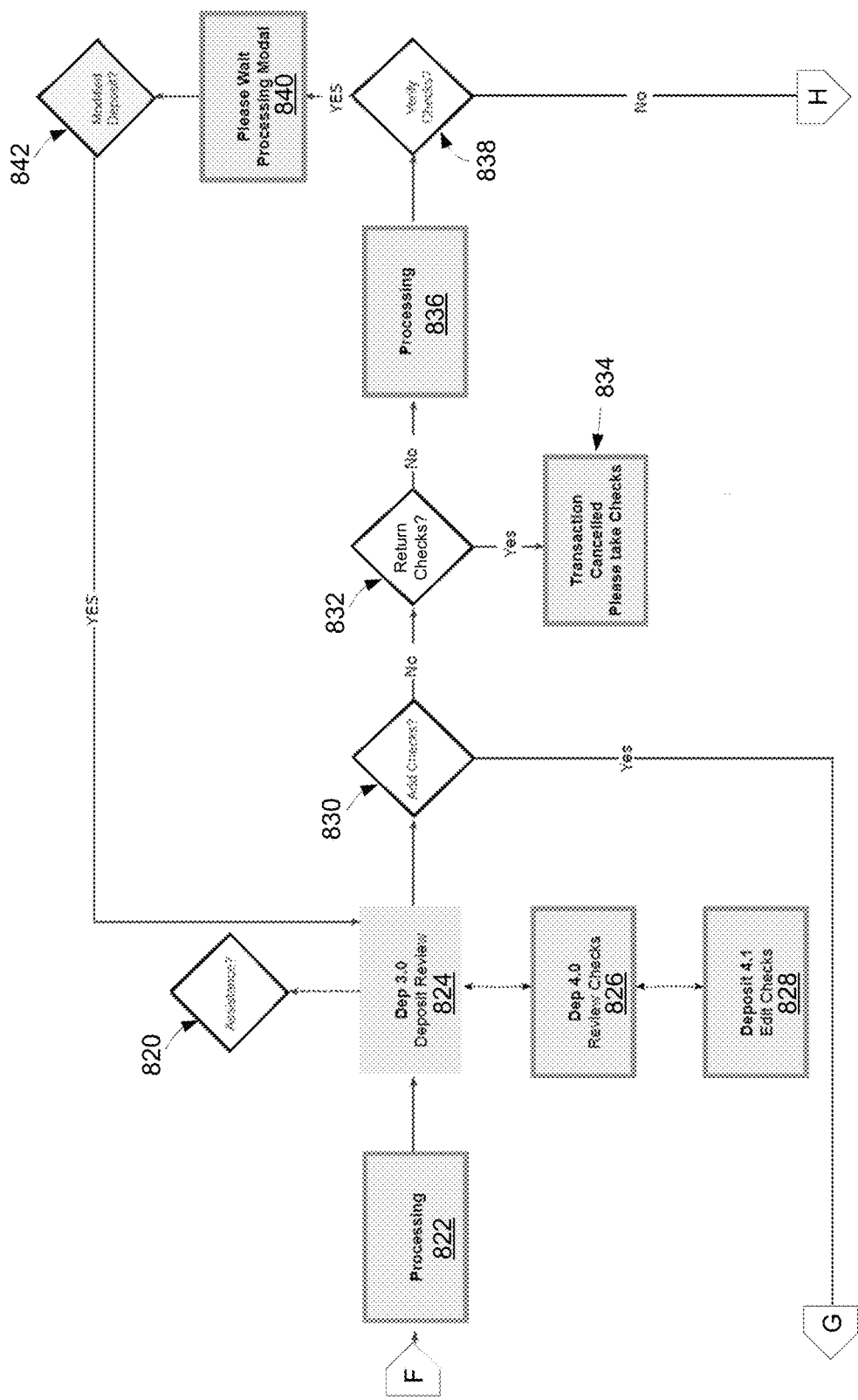

With reference to FIG. 8B, in step 822, the automated device may process the check inserted by the user. For example, the automated device may display a message to the user that the check is being processed. The automated device may scan an image of the front and/or the back of the check. During the processing, in steps 824, 826, and 828, the automated device may review the inserted check (or the scanned image of the inserted check). The automated device may verify that text on the scanned image of the check is clear. The automated device may also verify that the scanned image includes particular pieces of information, such as the name and/or address of the drawer of the check, the name of the payee, the printed amount on the check, the written amount on the check, a signature of the drawer, a routing number, an account number, a check number, an endorsement, and the like.

The automated device may display to the user the total number of checks scanned and/or if any of the scanned checks is unreadable and/or is missing information. If a check is unreadable, the automated device may display a message indicating that the unreadable check will be returned at the end of the deposit transaction. Alternatively, the automated device may return the unreadable check and provide the user an opportunity to reinsert the check. The automated device may also display the total deposit amount for all of the scanned and readable checks. The automated device may calculate the total deposit amount based on the printed amount on the check and the written amount of check. Additionally, the automated device may calculate the total deposit amount based on information input by the user. As the automated device processes the inserted check, it may display an option to request assistance from a local or remote agent (as illustrated in step 820).

In step 830, the automated device may determine whether the user will add additional checks. For example, the automated device may display an option for the user to add checks. If the user selects the option (step 830: Y), the automated device may return to step 808 and display a message instructing the user to insert the new check. The new check may be processed by the automated device as previously described. If the user does not desire to input any additional checks (step 830: N), the automated device may proceed to step 832.

In step 832, the automated device may determine whether to return any checks. For example, the automated device may return an unreadable check. The automated device may optionally provide the user an opportunity to reinsert the unreadable check, such as if the check is missing information, such as a signature, a payment amount, an endorsement, and the like. If there are one or more unreadable checks, in step 834, the automated device may either cancel the deposit transaction and/or proceed with the deposit with the readable checks. If no checks were returned or the automated device otherwise determines to proceed with the transaction, in step 836, the automated device may display an indication to the user that the check deposit is being processed.

In step 838, the automated device (or another computing device) may determine whether to request a local or remote agent to verify the user's check deposit transaction. If so (step 838: Y), the automated device may send a request to one or more agent devices to verify the transaction, and an alert or other message may be displayed on agents' devices in response to receiving the message, as will be described in further detail below. As previously explained, the automated device may return an unreadable check. In some aspects, however, instead of returning an unreadable check to the user, the automated device may request an agent to confirm the information on the check and/or entered by the user. For example, if the automated device did not detect an endorsement by the payee on the back of the check, the automated device may request the agent to verify that the check includes an endorsement. If the automated device cannot detect the amount written on the check or detects a discrepancy between the written amount and the amount entered by the user at the automated device, the automated device may send a request for assistance. If the number of inserted checks exceeds a threshold (e.g., 10 checks) or the total amount of each check or of all of the checks exceeds a threshold (e.g., $2000.00), the automated device may send a request for assistance. The local or remote agent device may also be used to verify checks based on configurable attributes, such as the customer's method of authentication (e.g., Card and PIN or photo ID and profile search), the transaction amount (which may vary based on relationship and mode of authentication), or transaction type (e.g., cash coming in versus cash coming out). Verification may also occur if the automated device could not read the check and/or the customer edited the check amount.

Figure 18:
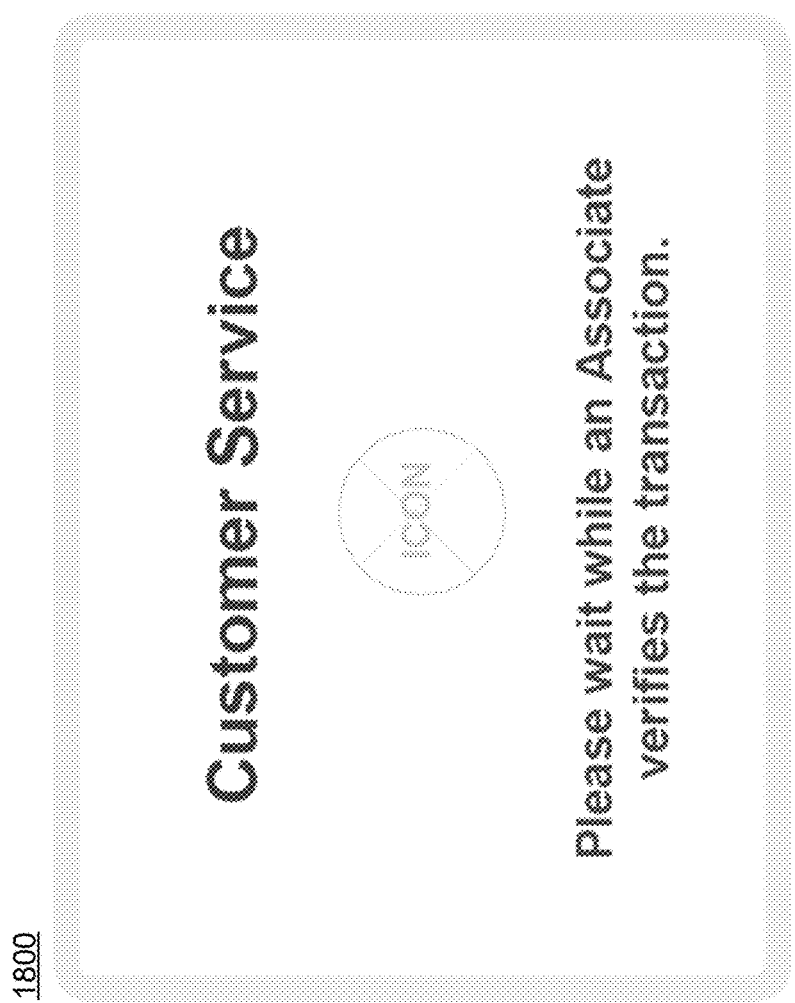
FIG. 18 illustrates an example user interface for waiting for verification of a transaction in which various aspects of the disclosure may be implemented.

During verification by the agent, the automated device, in step 840, may display a message to the user indicating that the check deposit transaction is currently being verified by an agent. FIG. 18 illustrates an example user interface 1800 for waiting for verification of a transaction in which various aspects of the disclosure may be implemented.

Figure 35:
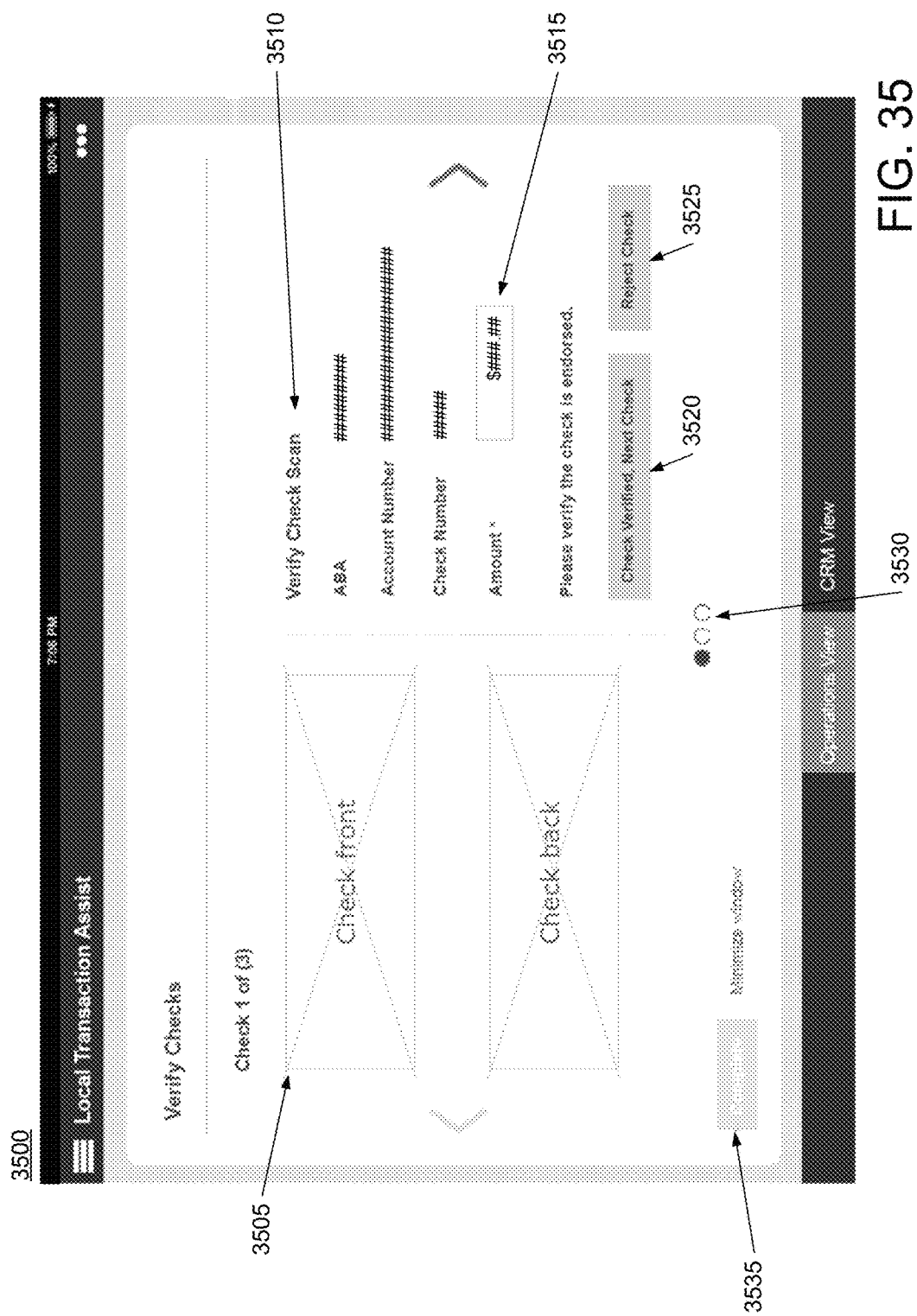
FIG. 35 illustrates an example user interface for verifying checks in which various aspects of the disclosure may be implemented.

FIG. 35 illustrates an example user interface 3500 for verifying checks in which various aspects of the disclosure may be implemented. The interface 3500 may be displayed on a local or remote agent's device in response to the agent receiving an alert and selecting an option to address the alert. The interface 3500 may display the scanned images 3505 of the front and the back of the check. The interface 3500 may also provide options for the agent to rotate, zoom in, zoom out, move, and/or reset the scanned image of the check (not illustrated).

The interface 3500 may also display information 3510 from the check identified by the automated device and/or by another computing device. Exemplary information includes the ABA routing number, the account number, the check number, the amount 3515, and any other information from the check. The amount 3515 displayed on the agent's device may comprise the amount detected by the automated device, the amount entered by the user, or both. The interface 3500 may also display an indication to the agent if the user has entered an amount or modified the amount detected by the automated device. The interface 3500 may also display one or more messages (e.g., reminders) to the agent for verifying the check. For example, the interface 3500 includes a reminder for the agent to "Please verify the check is endorsed."

The agent may compare the images 3505 of the scanned check to the information 3510 detected by the automated device or another device capable of processing the scanned images. If the information 3510 matches the information on the scanned images 3505 or the agent otherwise decides to verify the check, the agent may select the "Check Verified, Next Check" option 3520. If the user selects the option 3520, the agent's device may display an interface similar to the interface 3500 for the next check inserted by the user. If the information 3510 does not match the information on the scanned images 3505 or the agent otherwise decides not to verify the check, the agent may select the "Reject Check" option 3525. Selection of option 3525 may also cause the agent's device to display the next check. Alternatively, selection of the option 3525 may cause the user's transaction to be cancelled.

The interface 3500 may also include an option 3530 to scroll between the checks inserted by the user. The example illustrated in FIG. 35 includes three indicators (e.g., buttons or other GUI elements) because the user inserted three checks (or the automated device accepted three checks). However, any number of indicators may be displayed depending on the number of checks for the agent to verify. The interface may also include an option 3535 for the agent to complete the check verification process. If the complete option 3535 is selected, the agent's device may send a message to a central server or to the automated device indicating the check(s) that have been verified. In some aspects, the complete option 3535 may be made selectable by the agent once the agent verifies all of the checks.

Returning to FIG. 8B, in step 842, the automated device may receive a message from the agent's device indicating whether the check deposit transaction has been verified by an agent and/or indicating which checks have been verified. The automated device may determine whether the deposit was modified by the agent. If not, the automated device may display a message indicating that the deposit was verified and proceed to, for example, step 844, to provide a receipt for the transaction. On the other hand, if the agent modified the deposit (e.g., modifying the amount of a particular check, modifying the entire deposit amount, accepting a check rejected by the automated device, rejecting a check, and the like), the automated device may return to steps 824, 826, and 828 indicating to the user the changes made by the agent and requesting the user to approve the changes.

With reference to FIG. 8C, in step 844, the automated device may display an interface providing the user with receipt options. For example, the interface may include an option to print a receipt, electronically receive a receipt, or not to provide a receipt. The interface may also include an option to print or electronically send the receipt with or without scanned images of the check(s). This interface may display an option to request assistance from a local or remote agent (e.g., in step 820). Once a receipt option is selected (or after a predetermined amount of time passes), the automated device may process the check deposit and/or the selected receipt option in step 846. The automated device may optionally display a message to the user that the transaction is being processed.

In step 848, the automated device may determine whether there is a transaction alert. Transaction alerts may comprise, for example, deception alerts (which may be based on business rules), check handling messages, and/or host messages. For check handling, the system may identify certain check types, and upon identification of those check types, the system may prompt an agent device to perform additional process verification steps for the customer to complete the transaction. A host message may comprise a message coming from host system of records that allows the agent to override an alert (based on information the agent is able to obtain) or to decline a transaction based on business rules.

In step 850, the automated device may determine whether to print a receipt for the check deposit based on the receipt option selected by the user in step 844 or a default receipt option (e.g., printing a physical receipt). If the automated device determines to print a receipt (step 850: Y), the automated device may print a receipt in step 852 (or send an electronic receipt if the user selected that option). In step 854, the automated device may determine whether a physical receipt actually printed. If not (step 854: N), the automated device may determine that a receipt jam occurred in step 856. The automated device may display a notification of the receipt jam to the user and optionally provide an option for the user to receive an electronic receipt (e.g., via email). The automated device may also provide an option for the user to request assistance from an agent to receive a physical receipt. If the receipt printed (step 854: Y), the automated device may complete the check deposit transaction in step 858. The automated device may display a message indicating to the user that the check deposit transaction has been completed. If any checks were not accepted for any of the reasons previously described, the automated device may return the rejected checks in step 858.

Figure 8D:
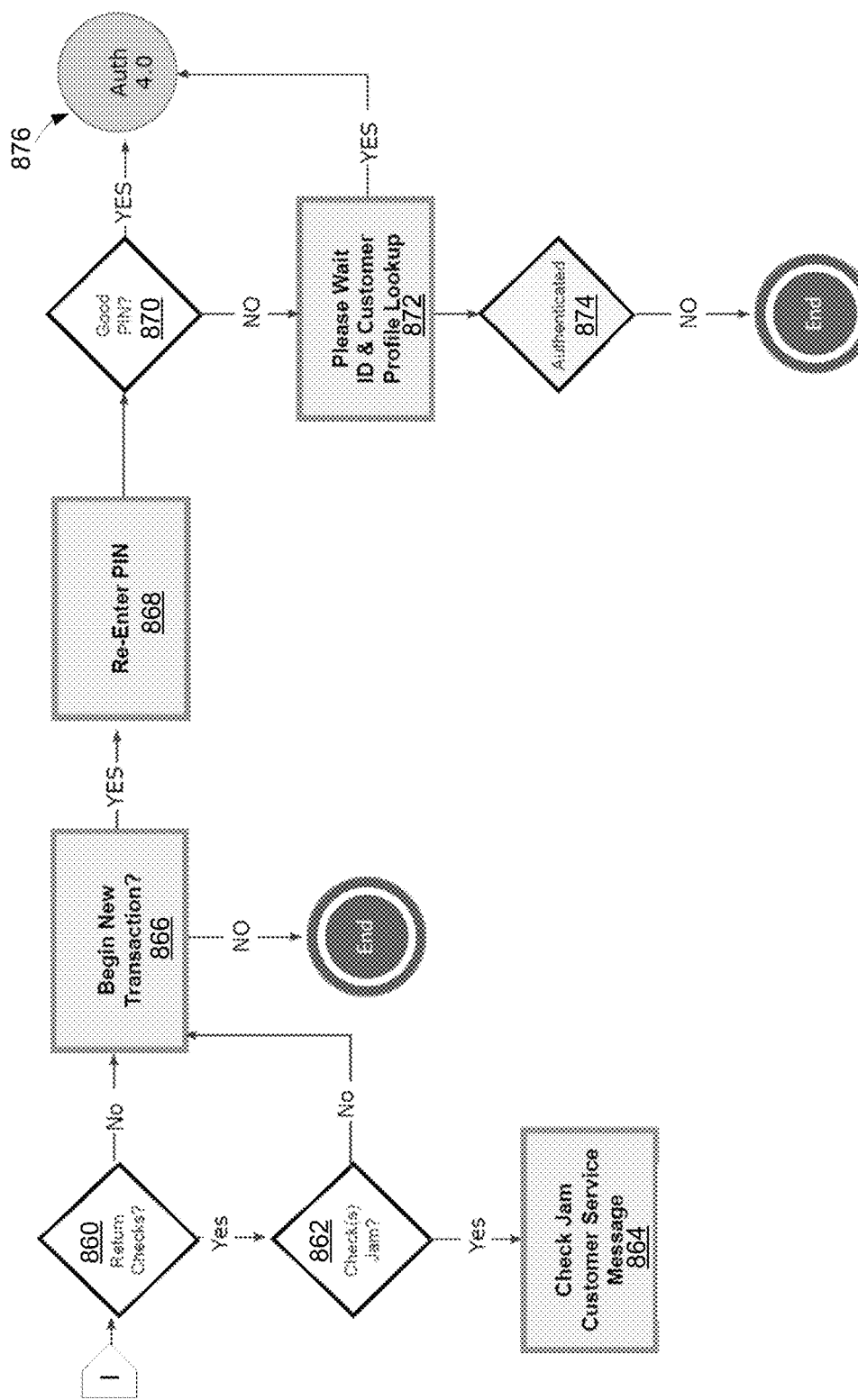

With reference to FIG. 8D, in step 860, the automated device may determine whether any checks were returned (or attempted to be returned). If so (step 860: Y), the automated device may determine, in step 862, whether any checks were jammed during the return process. If so (step 862: Y), the automated device may display, in step 864, a message indicating to the user that the check(s) cannot be returned and that an agent will assist the user. For example, the interface 2300 illustrated in FIG. 23 may be displayed if a check has jammed and/or the automated device cannot otherwise returned the inserted check. If no checks were returned and/or jammed, the automated device may proceed to step 866.

In step 866, the automated device may determine whether to perform another transaction. The automated device may display a message requesting the user to perform another transaction or to end the session. If the user selects the option to end the session or the session times out (step 866: N), the automated device may end the session. If, on the other hand, the user chooses to perform another transaction (step 866: Y), in step 868, the automated device may request the user to re-enter his or her PIN if the user authenticated with a PIN in the previous transaction.

In step 870, the automated device may determine whether the PIN entered by the user is correct. As previously explained, the automated device may provide the user with a predetermined number of tries, such as three tries. If the entered PIN is not correct (step 870: N) or if the user previously authenticated using, for example, a driver's license, the automated device may proceed to step 872 to authenticate the user based on the user's ID, as previously explained. The automated device may display a message to the user that the automated device is waiting for an agent to authenticate the user.

In step 872, local and/or remote agent devices may receive an indication that the user at the automated device needs authentication. A local or remote agent may select an option to authenticate the user. If the agent authenticates the user, the user may be authenticated in step 874, and the user may perform another transaction (e.g., step 876). On the other hand, if the agent does not authenticate the user, the session with the automated device may end.

As explained above, the user might not need to re-authenticate with the automated device to perform another transaction. For example, re-authentication may be based on a previous authentication by a local or remote agent using the user's ID or other means, the user authenticating based on a card and/or PIN for the previous authentication, any information available from the customer's profile with the financial institution (e.g., customer's SSN, customer's address or portion thereof, and the like), information from the previous transaction (e.g., the amount deposited in the previous check deposit transaction), physical attributes of the user (e.g., biometrics).

Figure 9A:
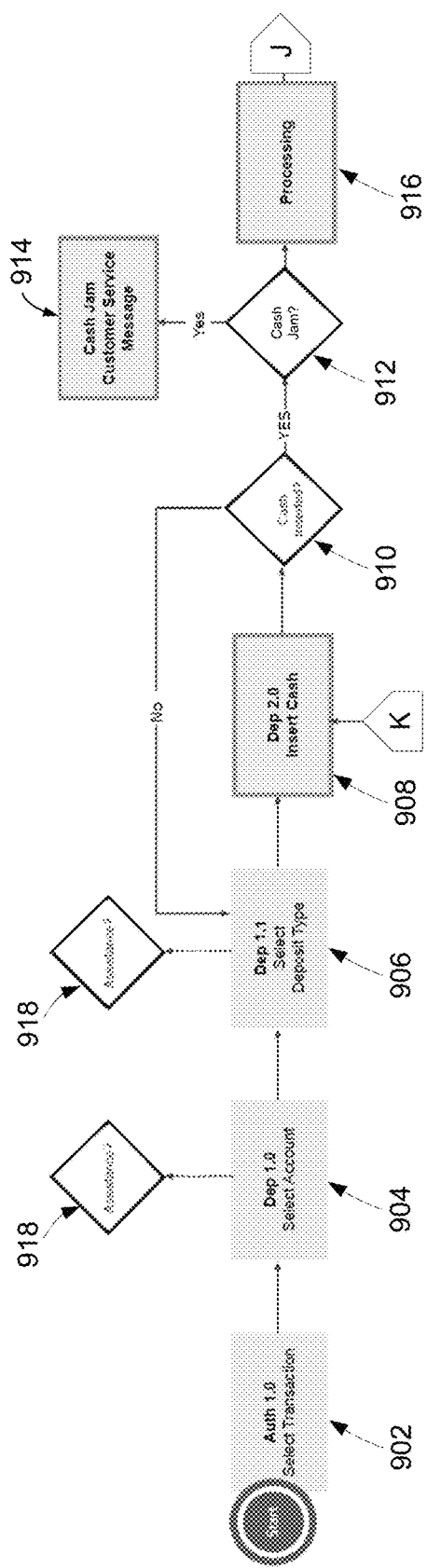
FIGS. 9A-9C illustrate an example of at least a portion of a flow diagram for a cash deposit at an automated device in which various aspects of the disclosure may be implemented.
Figure 9B:
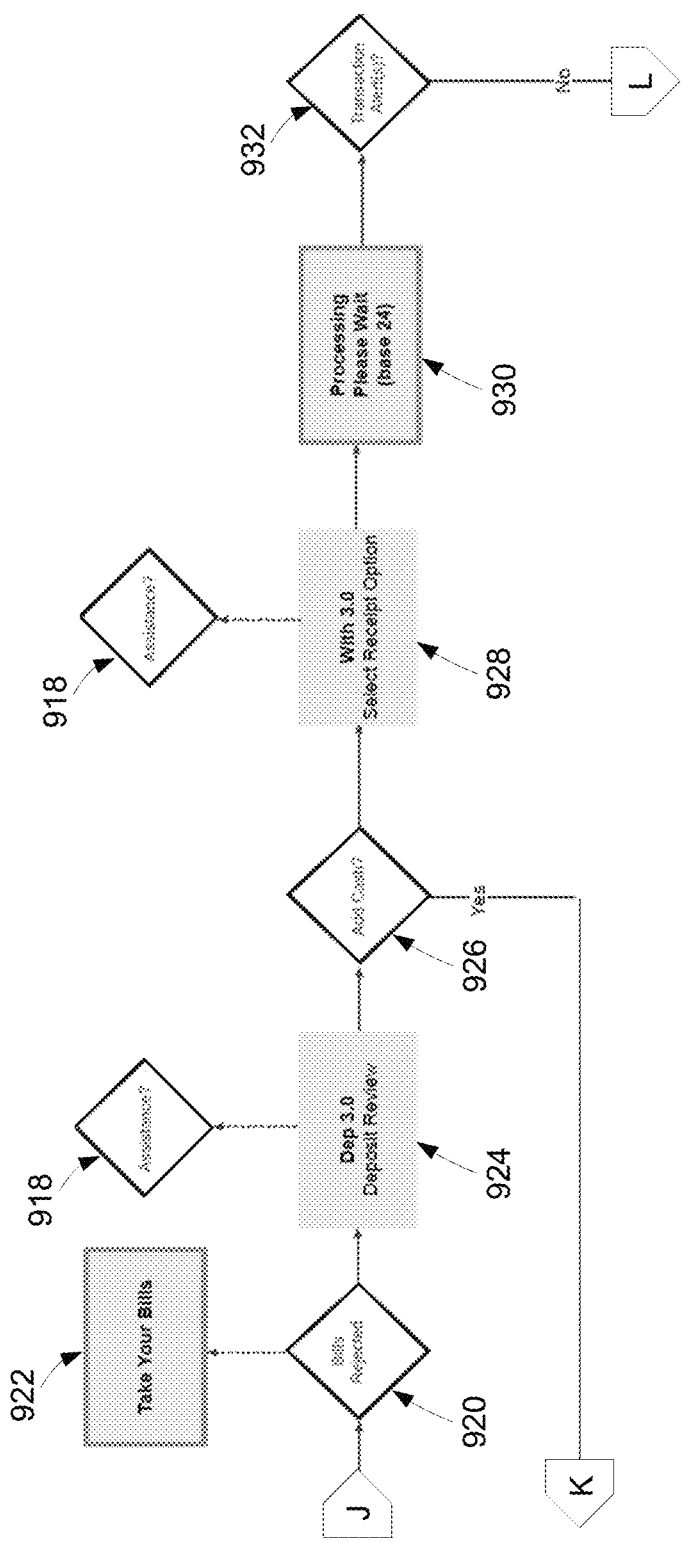
Figure 9C:
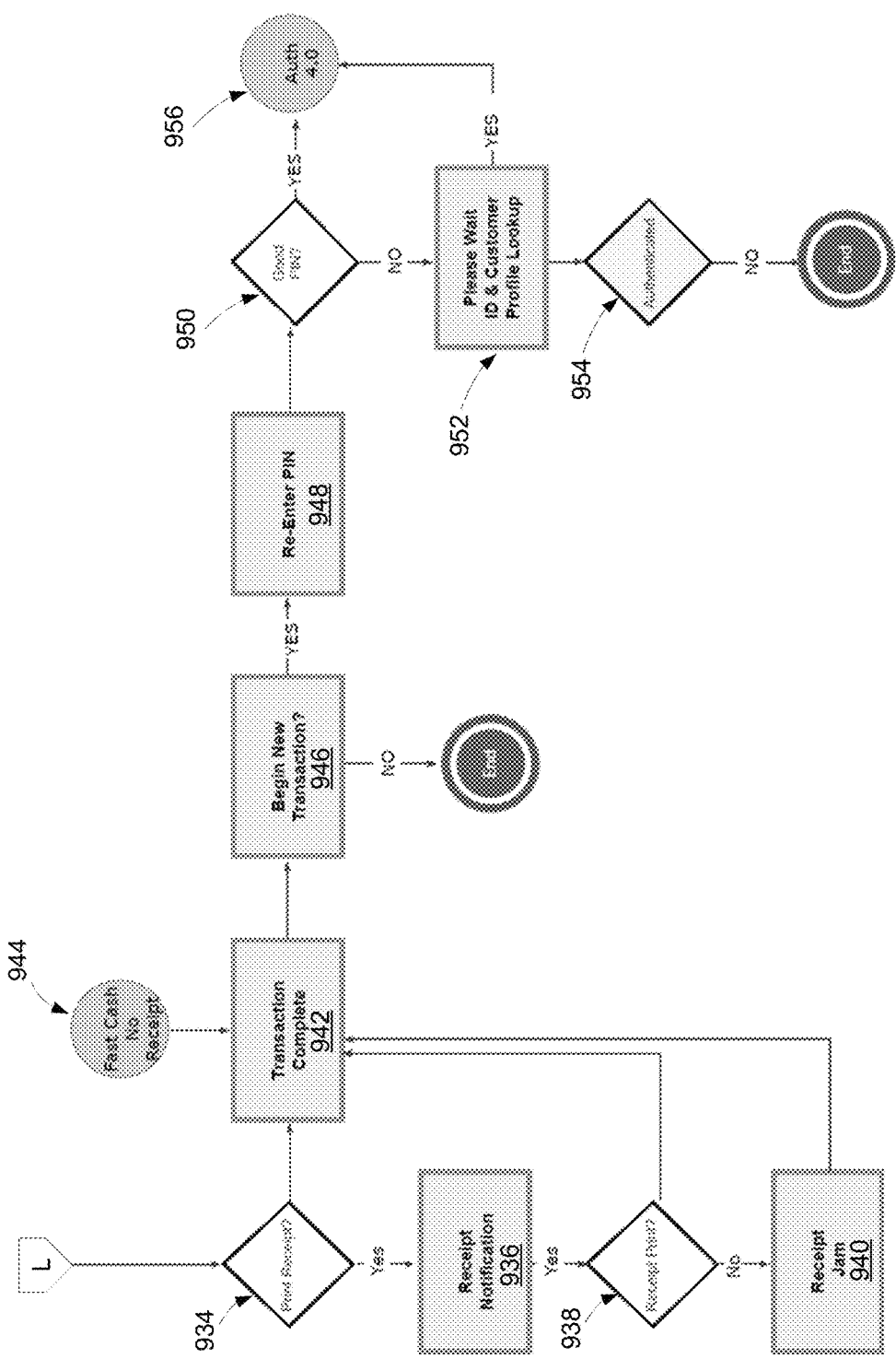

FIGS. 9A-9C illustrate an example of at least a portion of a flow diagram for a cash deposit at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In step 902, the automated device may display an interface prompting an authenticated user to select a transaction. For example, the interface illustrated in FIG. 15 may be displayed at the automated device. If the user selects the deposit option 1505, the automated device may optionally highlight the deposit option 1505 for a predetermined amount of time (e.g., 1 second) (not illustrated).

In step 904, the automated device may display an interface prompting the user to select an account to deposit to.

For example, the user's available accounts 1605 may be displayed on the automated device, and the account selected by the user may be highlighted. In step 906, the automated device may display an interface prompting the user to select a type of deposit. For example, the automated device may display an option for the user to deposit cash or to deposit checks. The automated device may display the prompts in steps 904 and 906 separately or together. Assume, for example, that the user has selected the option to deposit cash. The corresponding option may be highlighted by the automated device to provide feedback to the user.

In step 908, the automated device may display a message instructing the user to insert cash. The automated device may display instructions for inserting cash. For example, the instructions may indicate the maximum amount of cash that may be inserted (e.g., $1000.00), the maximum number of bills that may be inserted (e.g., 40 bills), the types of bills accepted (e.g., U.S. currency, larger bills, and the like). The instructions may also instruct the user to smooth or flatten the cash before inserting.

Figure 21:
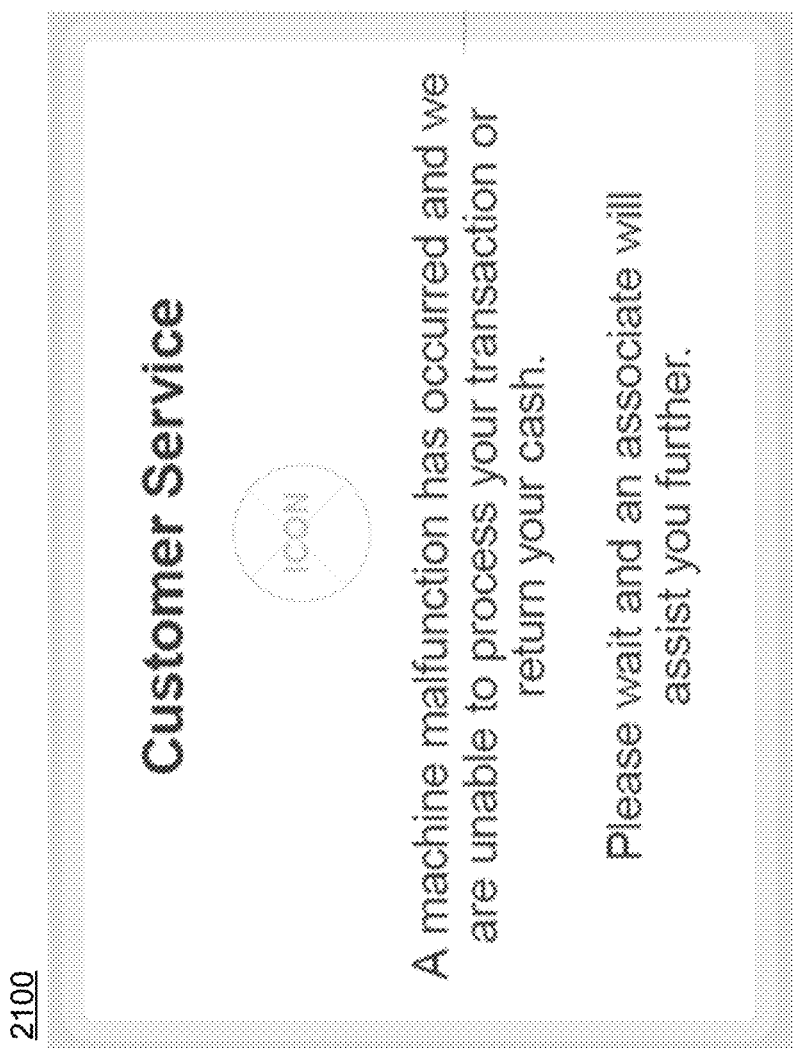
FIG. 21 illustrates an example user interface for waiting for assistance with a malfunctioning automated device in which various aspects of the disclosure may be implemented.

In step 910, the automated device may determine whether cash has been inserted. If not (step 910: N), the automated device may wait to receive cash from the user or may return to one or more previous screens, such as the screen in step 906. If the automated device determines that cash has been inserted, in step 912, the automated device may determine whether a cash jam has occurred. If so (step 912: Y), the automated device may display, in step 914, a message indicating to the user that a jam has occurred. The automated device may also send a message to one or more local or remote agent device notifying the agent that a cash jam has occurred. An interface similar to the interface 2300 illustrated in FIG. 23 (except replacing the word checks with the word cash) may be displayed if cash has jammed and/or the automated device cannot otherwise return the inserted cash. For example, FIG. 21 illustrates an example user interface 2100 for waiting for assistance with a malfunctioning automated device in which various aspects of the disclosure may be implemented. The interface 2100 may indicate to the user that a machine malfunction has occurred and that the automated device is unable to process the transaction or return the user's cash.

During any of the steps of the cash deposit transaction (e.g., authentication, select transaction, select account, deposit type, deposit review), the automated device may display an option, such as option 1520 illustrated in FIG. 15, for the user to request assistance for the transaction from a local or remote agent. If the user selects the option (e.g., in step 918), the automated device may send a request to the computing device 310 or directly to any of the LTA devices 305 and 306 or remote agent devices 307-309 indicating that the user of the automated device has requested assistance. An alert indicating that the user has requested assistance may be displayed on the LTA and/or remote agent devices (along with the already displayed alerts for other users), as will be described in further detail below. The automated device may also display a message to the user that the request for assistance has been sent. As previously explained, the interface 1700 illustrated in FIG. 17 may be displayed.

In step 916, the automated device may process the cash inserted by the user. For example, the automated device may display a message to the user that the cash is being processed. The automated device may scan an image of the front and/or the back of the inserted cash. The automated device may review the inserted cash (or the scanned images of the inserted cash). The automated device may verify that the cash is authentic and/or otherwise acceptable.

With reference to FIG. 9B, in step 920, the automated device may determine whether to return any cash. For example, the automated device may return unreadable cash or cash that the automated device cannot authenticate. The automated device may optionally provide the user an opportunity to reinsert the returned cash. If there are one or more unreadable bills, in step 922, the automated device may display a message to the user to take the unacceptable bills. The automated device may proceed with the cash deposit with the accepted bills.

In step 924, the automated device may optionally review the accepted cash (or the scanned images of the accepted cash), similar to step 916. In step 926, the automated device may determine whether the user will add additional cash. For example, the automated device may display an option for the user to add cash. If the user selects the option (step 926: Y), the automated device may return to step 908 and display a message instructing the user to insert the additional cash. The additional cash may be processed by the automated device as previously described. If the user does not desire to input any additional cash (step 926: N), the automated device may proceed to step 928.

In step 928, the automated device may display an interface providing the user with receipt options. For example, the interface may include an option to print a receipt, electronically receive a receipt, or not to provide a receipt. This interface may display an option to request assistance from a local or remote agent (e.g., in step 918). Once a receipt option is selected (or after a predetermined amount of time passes), the automated device may process the cash deposit and/or the selected receipt option in step 930. The automated device may optionally display a message to the user that the transaction is being processed.

In step 932, the automated device may determine whether there is a transaction alert. Transaction alerts may comprise, for example, deception alerts (which may be based on business rules), check handling messages, and/or host messages. For check handling, the system may identify certain check types, and upon identification of those check types, the system may prompt an agent device to perform additional process verification steps for the customer to complete the transaction. A host message may comprise a message coming from host system of records that allows the agent to override an alert (based on information the agent is able to obtain) or to decline a transaction based on business rules.

With reference to FIG. 9C, in step 934, the automated device may determine whether to print a receipt for the cash deposit based on the receipt option selected by the user in step 928 or a default receipt option (e.g., printing a physical receipt). If the automated device determines to print a receipt (step 934: Y), the automated device may print a receipt in step 936 (or send an electronic receipt if the user selected that option). In step 938, the automated device may determine whether a physical receipt actually printed. If not (step 938: N), the automated device may determine that a receipt jam occurred in step 940. The automated device may display a notification of the receipt jam to the user and optionally provide an option for the user to receive an electronic receipt (e.g., via email). The automated device may also provide an option for the user to request assistance from an agent to receive a physical receipt. If the receipt printed (step 938: Y), the automated device may complete the cash deposit transaction in step 942. The automated device may display a message indicating to the user that the cash deposit transaction has been completed. If the user selected a fast cash option, which will be described in further detail below, the automated might not provide a receipt to the user (step 944).

In step 946, the automated device may determine whether to perform another transaction. The automated device may display a message requesting the user to perform another transaction or to end the session. If the user selects the option to end the session or the session times out (step 946: N), the automated device may end the session. If, on the other hand, the user chooses to perform another transaction (step 946: Y), in step 948, the automated device may request the user to re-enter his or her PIN if the user authenticated with a PIN in the previous transaction.

In step 950, the automated device may determine whether the PIN entered by the user is correct. As previously explained, the automated device may provide the user with a predetermined number of tries, such as three tries. If the entered PIN is not correct (step 950: N) or if the user previously authenticated using, for example, a driver's license, the automated device may proceed to step 952 to authenticate the user based on the user's ID, as previously explained. The automated device may display a message to the user that the automated device is waiting for an agent to authenticate the user.

In step 952, local and/or remote agent devices may receive an indication that the user at the automated device needs authentication. A local or remote agent may select an option to authenticate the user. If the agent authenticates the user, the user may be authenticated in step 954, and the user may perform another transaction (e.g., step 956). On the other hand, if the agent does not authenticate the user, the session with the automated device may end.

As explained above, the user might not need to re-authenticate with the automated device to perform another transaction. For example, re-authentication may be based on a previous authentication by a local or remote agent using the user's ID or other means, the user authenticating based on a card and/or PIN for the previous authentication, any information available from the customer's profile with the financial institution (e.g., customer's SSN, customer's address or portion thereof, and the like), information from the previous transaction (e.g., the amount deposited in the previous cash deposit transaction), physical attributes of the user (e.g., biometrics).

FIGS. 10A-10D illustrate an example of at least a portion of a flow diagram for cashing checks at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In step 1002, the automated device may display an interface prompting an authenticated user to select a transaction. For example, the interface illustrated in FIG. 15 may be displayed at the automated device. If the user selects the cash check option 1515, the automated device may optionally highlight the cash check option 1515 for a predetermined amount of time (e.g., 1 second) (not illustrated).

In step 1004, the automated device may display a message instructing the user to insert and/or scan one or more checks. The automated device may display instructions for inserting checks. For example, the instructions may indicate the maximum number of checks that may be inserted (e.g., 10 checks). The instructions may also instruct the user to endorse each check, smooth or flatten each check, and/or to remove any staples or envelopes.

In step 1006, the automated device may determine whether one or more checks has been inserted. If not (step 1006: N), the automated device may wait to receive checks from the user or may return to one or more previous screens, such as the screen in step 1002. If the automated device determines that a check has been inserted, in step 1008, the automated device may determine whether the check is non-negotiable or otherwise not transferrable. If so (step 1008: Y), the automated device, in step 1010, may display a message indicating that the entered document cannot be processed or is not negotiable. Otherwise (step 1008: N), the automated device may proceed to step 1012.

In step 1012, the automated device may determine whether a check jam has occurred. If so (step 1012: Y), the automated device may display, in step 1014, a message indicating to the user that a jam has occurred. The automated device may also send a message to one or more local or remote agent device notifying the agent that a check jam has occurred. FIG. 23 illustrates an example user interface 2300 for waiting for assistance with a malfunctioning automated device in which various aspects of the disclosure may be implemented. For example, the interface 2300 may be displayed if a check has jammed and/or the automated device cannot otherwise return the inserted check.

During any of the steps of the cash check transaction (e.g., authentication, select transaction, cash checks review), the automated device may display an option, such as option 1520 illustrated in FIG. 15, for the user to request assistance for the transaction from a local or remote agent. If the user selects the option, the automated device may send a request to the computing device 310 or directly to any of the LTA devices 305 and 306 or remote agent devices 307-309 indicating that the user of the automated device has requested assistance. An alert indicating that the user has requested assistance may be displayed on the LTA and/or remote agent devices (along with the already displayed alerts for other users), as will be described in further detail below. The automated device may also display a message to the user that the request for assistance has been sent. As previously explained, the interface 1700 illustrated in FIG. 17 may be displayed.

In step 1016, the automated device may process the check inserted by the user. For example, the automated device may display a message to the user that the check is being processed. The automated device may scan an image of the front and/or the back of the check.

Figure 10A:
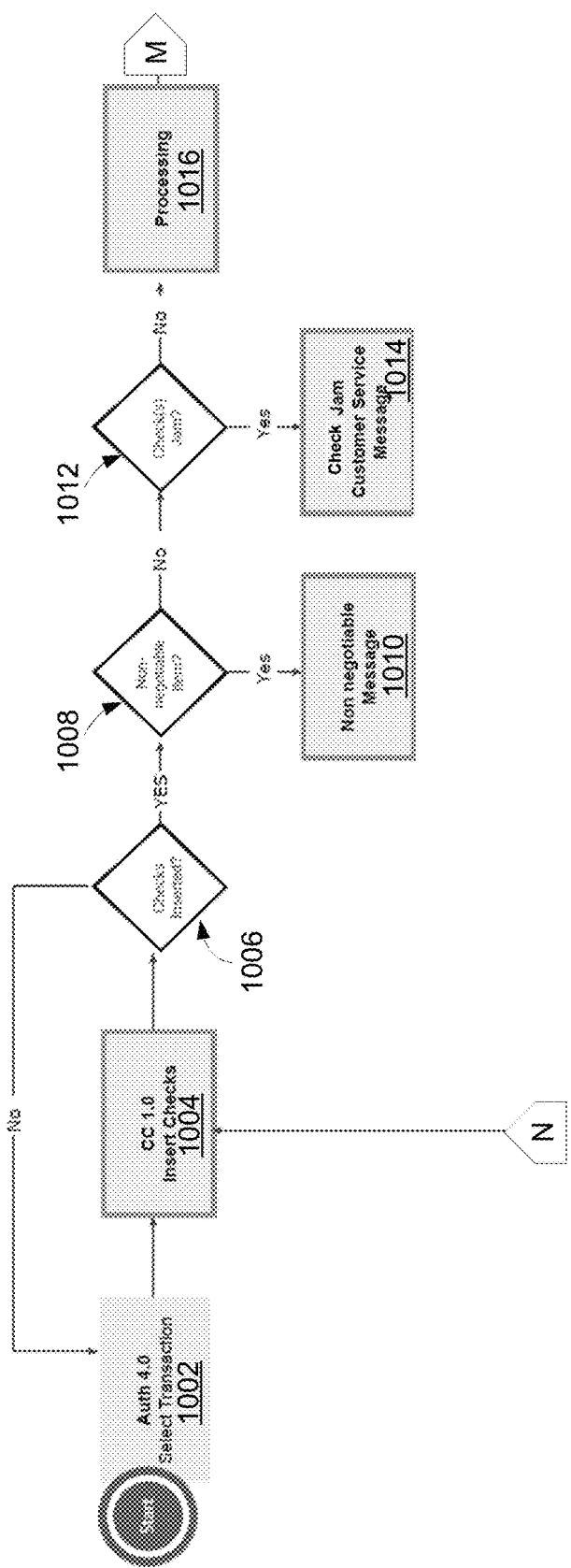
FIGS. 10A-10D illustrate an example of at least a portion of a flow diagram for cashing checks at an automated device in which various aspects of the disclosure may be implemented.
Figure 10B:
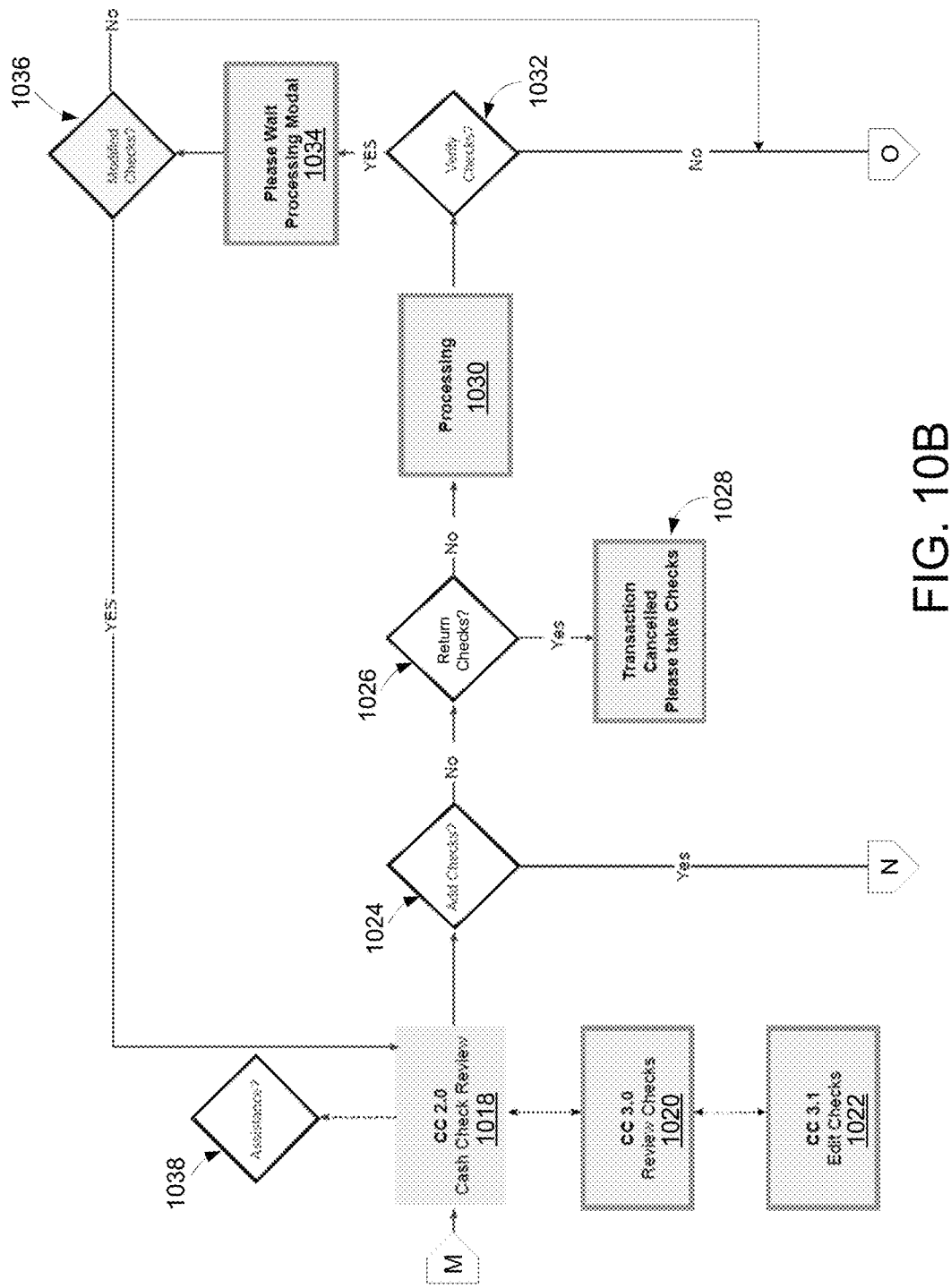

With reference to FIG. 10B, during the processing and in steps 1018, 1020, and 1022, the automated device may review the inserted check (or the scanned image of the inserted check). The automated device may verify that text on the scanned image of the check is clear. The automated device may also verify that the scanned image includes particular pieces of information, such as the name and/or address of the drawer of the check, the name of the payee, the printed amount on the check, the written amount on the check, a signature of the drawer, a routing number, an account number, a check number, an endorsement, and the like.

The automated device may display to the user the total number of checks scanned and/or if any of the scanned checks is unreadable and/or is missing information. If a check is unreadable, the automated device may display a message indicating that the unreadable check will be returned at the end of the deposit transaction. Alternatively, the automated device may return the unreadable check and provide the user an opportunity to reinsert the check. The automated device may also display the total cash amount for all of the scanned and readable checks. The automated device may calculate the total cash amount based on the printed amount on the check and the written amount of check. Additionally, the automated device may calculate the total cash amount based on information input by the user. As the automated device processes the inserted check, it may display an option to request assistance from a local or remote agent (as illustrated in step 1038).

In step 1024, the automated device may determine whether the user will add additional checks. For example, the automated device may display an option for the user to add checks. If the user selects the option (step 1024: Y), the automated device may return to step 1004 and display a message instructing the user to insert the new check. The new check may be processed by the automated device as previously described. If the user does not desire to input any additional checks (step 1024: N), the automated device may proceed to step 1026.

In step 1026, the automated device may determine whether to return any checks. For example, the automated device may return an unreadable check. The automated device may optionally provide the user an opportunity to reinsert the unreadable check, such as if the check is missing information, such as a signature, a payment amount, an endorsement, and the like. If there are one or more unreadable checks, in step 1028, the automated device may either cancel the cash check transaction and/or proceed with the cash check transaction with the readable checks. If no checks were returned or the automated device otherwise determines to proceed with the transaction, in step 1030, the automated device may display an indication to the user that the cash check transaction is being processed.

In step 1032, the automated device (or another computing device) may determine whether to request a local or remote agent to verify the user's cash check transaction. If so (step 1032: Y), the automated device may send a request to one or more agent devices to verify the transaction, and an alert or other message may be displayed on agents' devices in response to receiving the message, as will be described in further detail below. As previously explained, the automated device may return an unreadable check. In some aspects, however, instead of returning an unreadable check to the user, the automated device may request an agent to confirm the information on the check and/or entered by the user. For example, if the automated device did not detect an endorsement by the payee on the back of the check, the automated device may request the agent to verify that the check includes an endorsement. If the automated device cannot detect the amount written on the check or detects a discrepancy between the written amount and the amount entered by the user at the automated device, the automated device may send a request for assistance. If the number of inserted checks exceeds a threshold (e.g., 10 checks) or the total amount of each check or of all of the checks exceeds a threshold (e.g., $2000.00), the automated device may send a request for assistance. The local or remote agent device may also be used to verify checks based on configurable attributes, such as the customer's method of authentication (e.g., Card and PIN or photo ID and profile search), the transaction amount (which may vary based on relationship and mode of authentication), or transaction type (e.g., cash coming in versus cash coming out). Verification may also occur if the automated device could not read the check and/or the customer edited the check amount.

During verification by the agent, the automated device, in step 1034, may display a message to the user indicating that the cash check transaction is currently being verified by an agent. FIG. 18 illustrates an example user interface 1800 for waiting for verification of a transaction in which various aspects of the disclosure may be implemented. FIG. 35 illustrates an example user interface 3500 for verifying checks in which various aspects of the disclosure may be implemented. As previously explained, the interface 3500 may be displayed on a local or remote agent's device in response to the agent receiving an alert and selecting an option to address the alert.

In step 1036, the automated device may receive a message from the agent's device indicating whether the cash check transaction has been verified by an agent and/or indicating which checks have been verified. The automated device may determine whether the cash check amount was modified by the agent. If not, the automated device may display a message indicating that the deposit was verified and proceed to, for example, step 1040. On the other hand, if the agent modified the deposit (e.g., modifying the amount of a particular check, modifying the entire deposit amount, accepting a check rejected by the automated device, rejecting a check, and the like), the automated device may return to steps 1018, 1020, and 1022 indicating to the user the changes made by the agent and requesting the user to approve the changes.

Figure 10C:
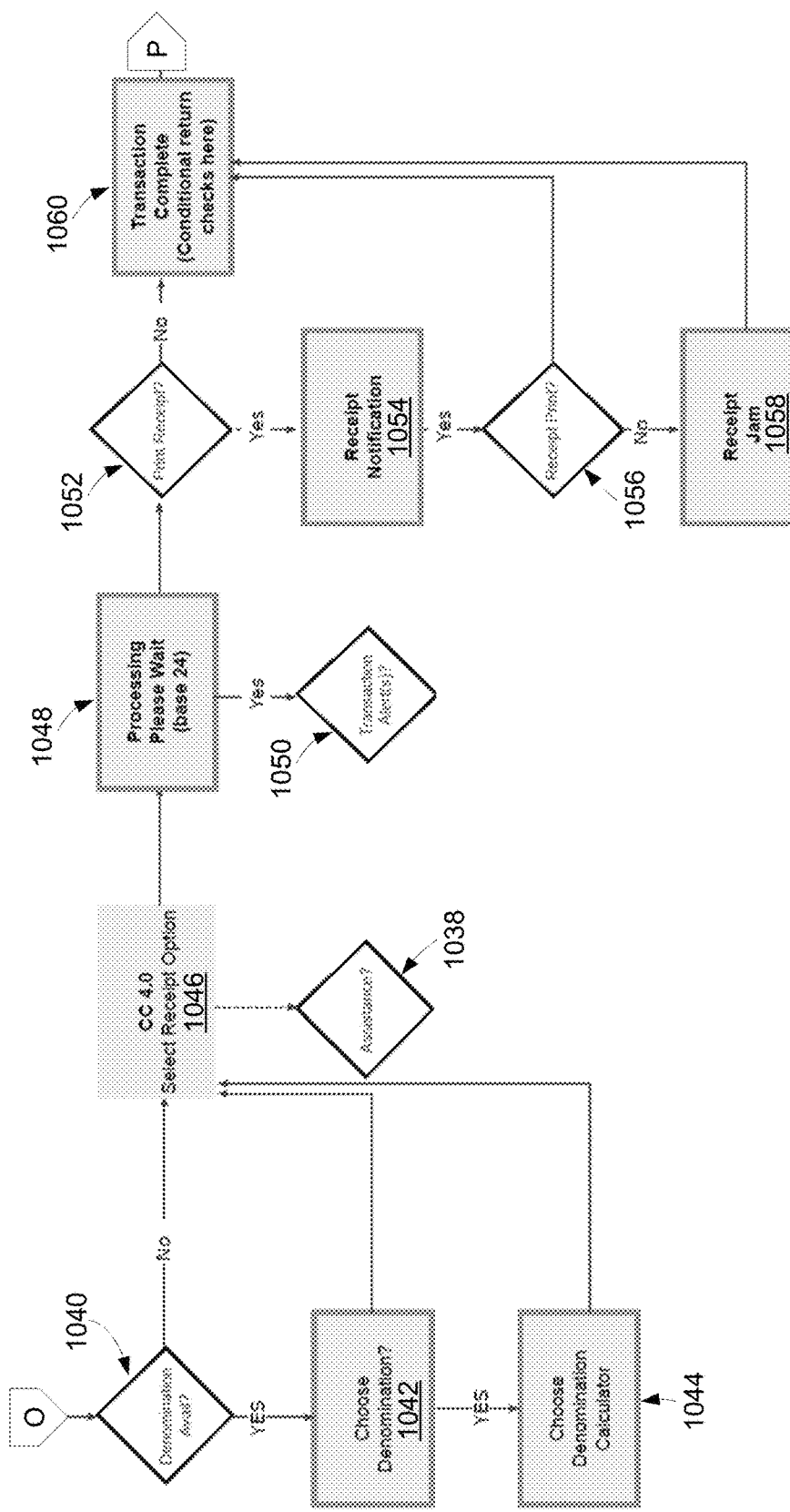

With reference to FIG. 10C, in step 1040, the automated device may determine whether it has the denominations (e.g., $1 bills, $5 bills, $10 bills, $20 bills, $100 bills) available to create the selected check cash amount. If the automated device does not have the appropriate denominations (step 1040: N), the automated device may proceed to step 1046. Otherwise, the automated device may proceed to step 1042.

In step 1042, the automated device may display an option for the user to select the denominations for the cash. If the user selects the option (step 1042: Y), the automated device may calculate denominations available to the user in step 1044. Otherwise (step 1042: N), the automated device may determine to dispense the cash amount using default denominations, such as $20 bills, the largest bills (e.g., a $100 bill for a $100 withdrawal), and the like.

In step 1046, the automated device may display an interface prompting the user to select a receipt option. For example, the user may receive an electronic receipt (e.g., via email, text message, online account message portal, and the like) or a printed receipt. In step 1048, the automated device may process the requested cash check transaction. The automated device may optionally display a message to the user that the transaction is being processed.

During any of the steps of the cash check transaction (e.g., authentication, select transaction, cash checks review), the automated device may display an option, such as option 1520 illustrated in FIG. 15, for the user to request assistance for the transaction from a local or remote agent. If the user selects the option (e.g., in step 1038), the automated device may send a request to the computing device 310 or directly to any of the LTA devices 305 and 306 or remote agent devices 307-309 indicating that the user of the automated device has requested assistance. An alert indicating that the user has requested assistance may be displayed on the LTA and/or remote agent devices (along with the already displayed alerts for other users), as will be described in further detail below. The automated device may also display a message to the user that the request for assistance has been sent. As previously explained, the interface 1700 illustrated in FIG. 17 may be displayed.

In step 1050, the automated device may determine whether there is a transaction alert. Transaction alerts may comprise, for example, deception alerts (which may be based on business rules), check handling messages, and/or host messages. For check handling, the system may identify certain check types, and upon identification of those check types, the system may prompt an agent device to perform additional process verification steps for the customer to complete the transaction. A host message may comprise a message coming from host system of records that allows the agent to override an alert (based on information the agent is able to obtain) or to decline a transaction based on business rules.

In step 1052, the automated device may determine whether to print a receipt for the cash check transaction based on the receipt option selected by the user in step 1046 or a default receipt option (e.g., printing a physical receipt). If the automated device determines to print a receipt (step 1052: Y), the automated device may print a receipt in step 1054 (or send an electronic receipt if the user selected that option). In step 1056, the automated device may determine whether a physical receipt actually printed. If not (step 1056: N), the automated device may determine that a receipt jam occurred in step 1058. The automated device may display a notification of the receipt jam to the user and optionally provide an option for the user to receive an electronic receipt (e.g., via email). The automated device may also provide an option for the user to request assistance from an agent to receive a physical receipt. If the receipt printed (step 1056: Y), the automated device may complete the cash check transaction in step 1060. The automated device may display a message indicating to the user that the cash check transaction has been completed. If any checks were not accepted for any of the reasons previously described, the automated device may return the rejected checks in step 1060.

Figure 10D:
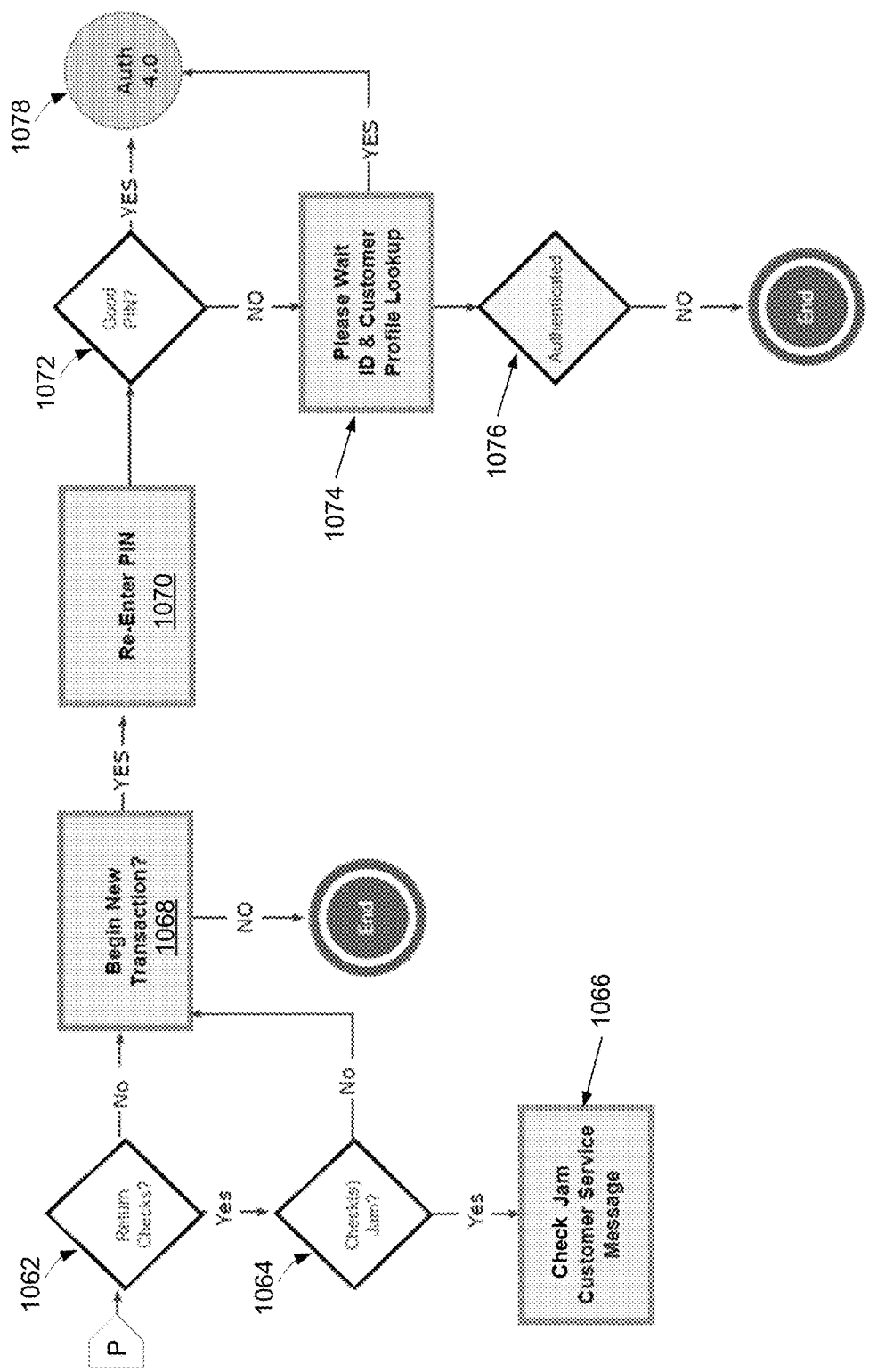

With reference to FIG. 10D, in step 1062, the automated device may determine whether any checks were returned (or attempted to be returned). If so (step 1062: Y), the automated device may determine, in step 1064, whether any checks were jammed during the return process. If so (step 1064: Y), the automated device, in step 1066, may display a message indicating to the user that the check(s) cannot be returned and that an agent will assist the user. For example, the interface 2300 illustrated in FIG. 23 may be displayed if a check has jammed and/or the automated device cannot otherwise returned the inserted check. If no checks were returned and/or jammed, the automated device may proceed to step 1068.

In step 1068, the automated device may determine whether to perform another transaction. The automated device may display a message requesting the user to perform another transaction or to end the session. If the user selects the option to end the session or the session times out (step 1068: N), the automated device may end the transaction. If, on the other hand, the user chooses to perform another transaction (step 1068: Y), in step 1070, the automated device may request the user to re-enter his or her PIN if the user authenticated with a PIN in the previous transaction.

In step 1072, the automated device may determine whether the PIN entered by the user is correct. As previously explained, the automated device may provide the user with a predetermined number of tries, such as three tries. If the entered PIN is not correct (step 1072: N) or if the user previously authenticated using, for example, a driver's license, the automated device may proceed to step 1074 to authenticate the user based on the user's ID as previously explained. The automated device may display a message to the user that the automated device is waiting for an agent to authenticate the user.

In step 1074, local and/or remote agent devices may receive an indication that the user at the automated device needs authentication. A local or remote agent may select an option to authenticate the user. If the agent authenticates the user, the user may be authenticated in step 1076, and the user may perform another transaction (e.g., step 1078). On the other hand, if the agent does not authenticate the user, the session with the automated device may end.

As explained above, the user might not need to re-authenticate with the automated device to perform another transaction. For example, re-authentication may be based on a previous authentication by a local or remote agent using the user's ID or other means, the user authenticating based on a card and/or PIN for the previous authentication, any information available from the customer's profile with the financial institution (e.g., customer's SSN, customer's address or portion thereof, and the like), information from the previous transaction (e.g., the amount of the check cashed in the previous cash check transaction), physical attributes of the user (e.g., biometrics).

Figure 11A:
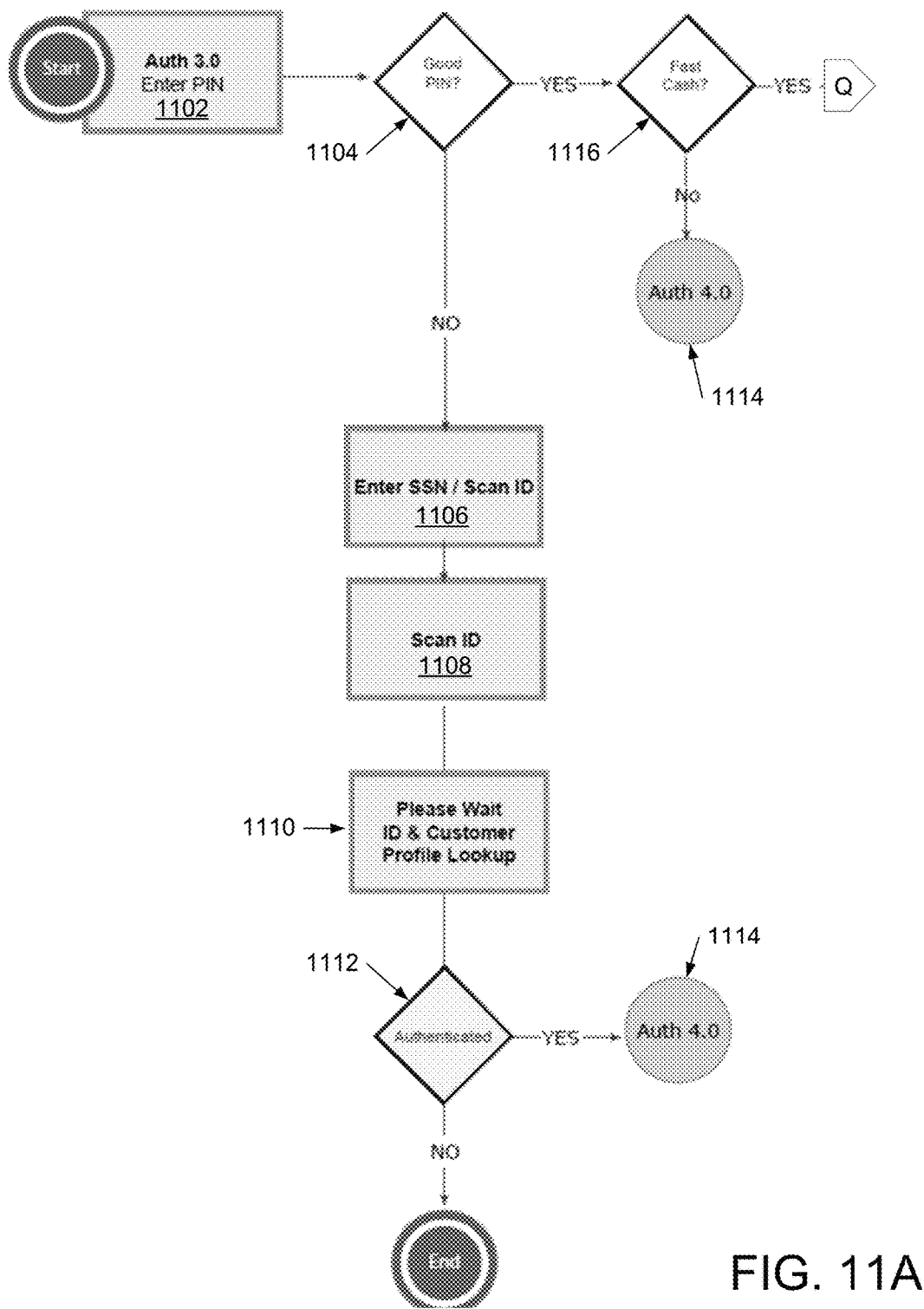
FIGS. 11A and 11B illustrate an example of at least a portion of a flow diagram for receiving cash at an automated device in which various aspects of the disclosure may be implemented.
Figure 11B:
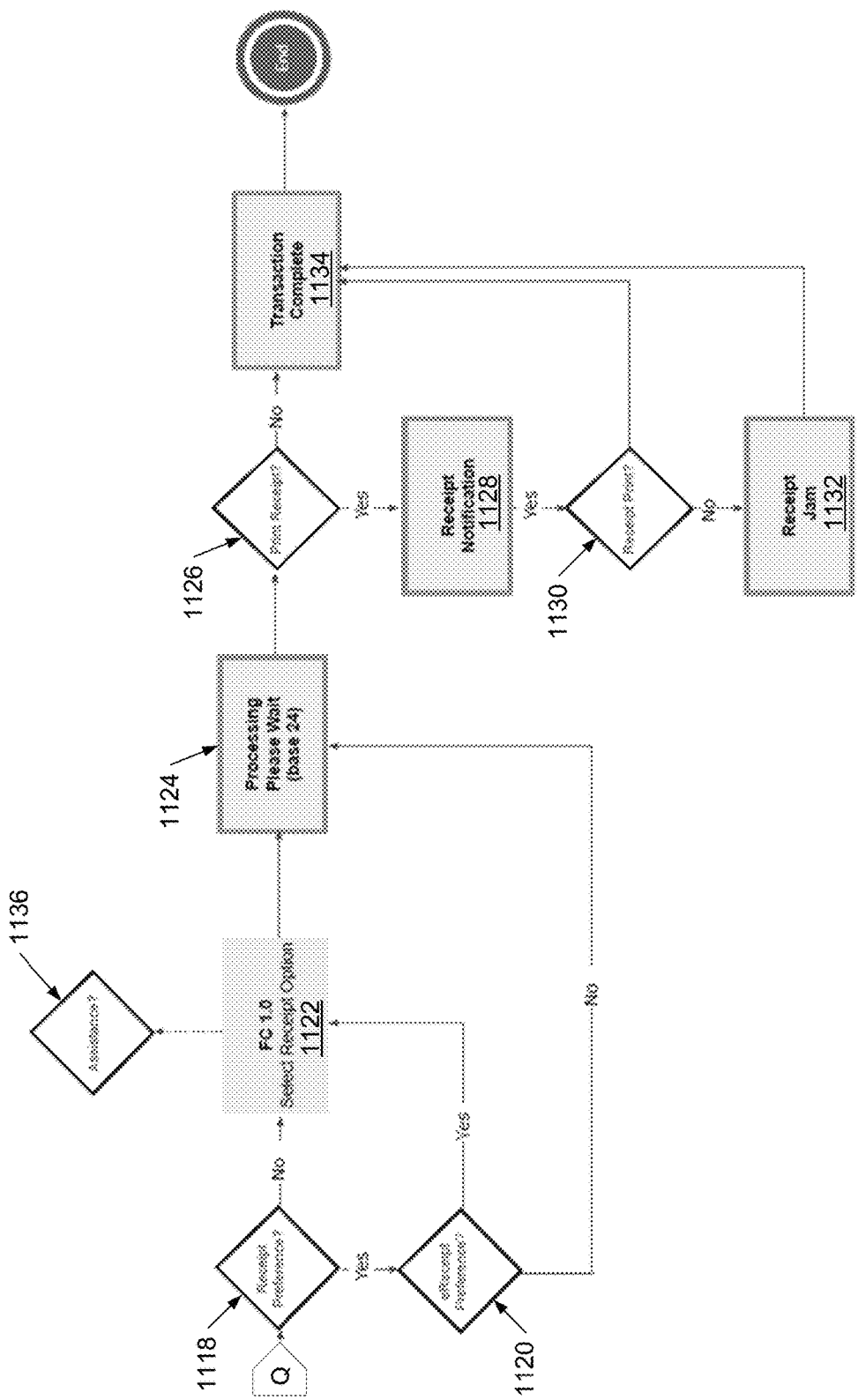

FIGS. 11A and 11B illustrate an example of at least a portion of a flow diagram for receiving cash at an automated device in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

If user enters a card and the card is validly read, the automated device may proceed to step 1102 and display a prompt for the user to enter a PIN or other passcode corresponding to the card. In step 1104, the automated device may determine whether the entered PIN is correct. If not (step 1104: N), the automated device may provide the user a predetermined number of attempts to enter the correct PIN (e.g., 3 times). If the user does not provide the correct PIN within the predetermined number, the automated device may prompt the user for scan his or her ID and/or enter an SSN in step 1106 (similar to step 626 previously described), receive a scanned image of the ID or the SSN in step 1108 (similar to step 614 previously described), and display a message that the user is being authenticated by an agent in step 1110 (similar to step 616 previously described). In step 1112 (similar to step 618 previously described), the user may be authenticated using the ID or the SSN if the agent selects any of the authenticate options previously described.

In step 1116, the automated device may display an option for the customer to receive a designated amount of cash (e.g., fast cash), which the customer may set for his or her account(s) or profile. If the customer selects the option to receive the designated amount of cash, the automated device may dispense the designated amount and proceed to step 1118 of FIG. 11B, which will be described in further detail below. The fast cash option may allow the user to quickly withdraw cash after authenticating with the automated device. If the customer has not selected the option, the method may proceed to step 1114.

In step 1114, the automated device may display an interface prompting the authenticated user to select a transaction. FIG. 15 illustrates an example user interface 1500 for selecting a transaction at an automated device in which various aspects of the disclosure may be implemented. The interface 1500 displays an option 1505 for a deposit, an option 1510 for a withdrawal, and an option 1515 to cash a check. The interface 1500 may also display an option 1520 for the user to request assistance from an agent that when selected, causes a request or alert to be displayed on local and/or remote agents' devices.

With reference to FIG. 11B, in steps 1118, 1120, and/or 1122, the automated device may display an interface providing the user with receipt options. For example, the interface may include an option to print a receipt, electronically receive a receipt, or not to provide a receipt. This interface may display an option to request assistance from a local or remote agent (e.g., in step 1136). Once a receipt option is selected (or after a predetermined amount of time), the automated device may process the fast cash transaction and/or the selected receipt option in step 1124. The automated device may optionally display a message to the user that the transaction is being processed.

In step 1126, the automated device may determine whether to print a receipt for the fast cash transaction based on the receipt option selected by the user or a default receipt option (e.g., printing a physical receipt). If the automated device determines to print a receipt (step 1126: Y), the automated device may print a receipt in step 1128 (or send an electronic receipt if the user selected that option). In step 1130, the automated device may determine whether a physical receipt actually printed. If not (step 1130: N), the automated device may determine that a receipt jam occurred in step 1132. The automated device may display a notification of the receipt jam to the user and optionally provide an option for the user to receive an electronic receipt (e.g., via email). The automated device may also provide an option for the user to request assistance from an agent to receive a physical receipt. If the receipt printed (step 1130: Y), the automated device may complete the fast cash transaction in step 1134. The automated device may display a message indicating to the user that the fast cash transaction has been completed.

Figure 12A:
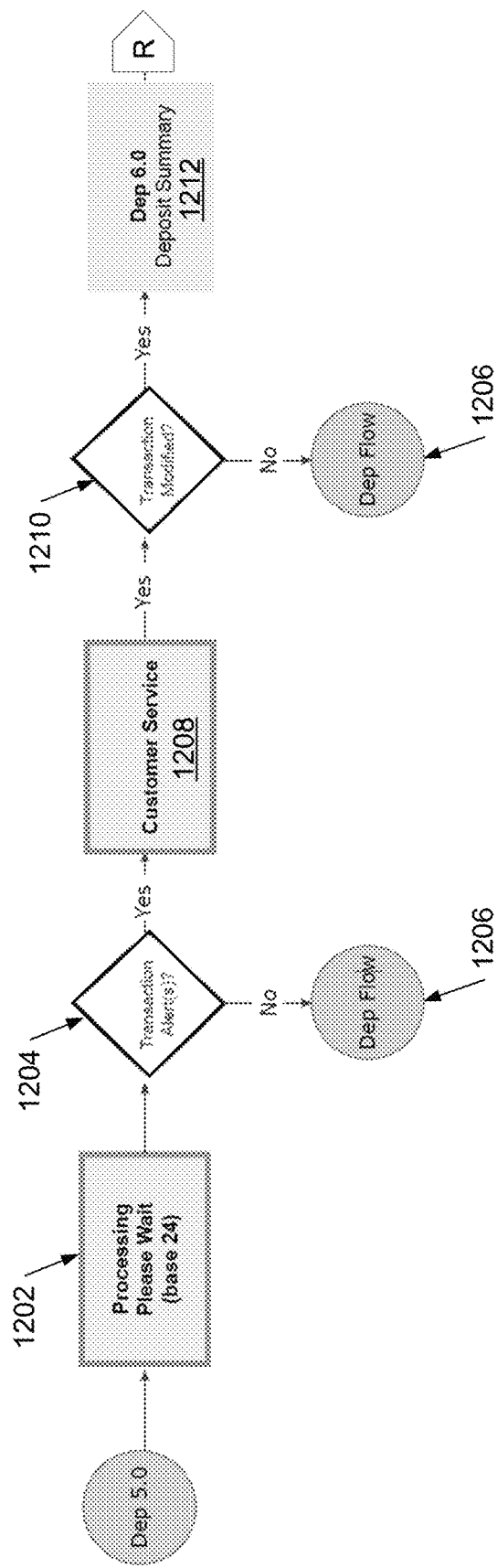
FIGS. 12A-12C illustrate an example of at least a portion of a flow diagram for depositing checks at an automated device or handling check deposit exceptions and/or alerts in which various aspects of the disclosure may be implemented.
Figure 12B:
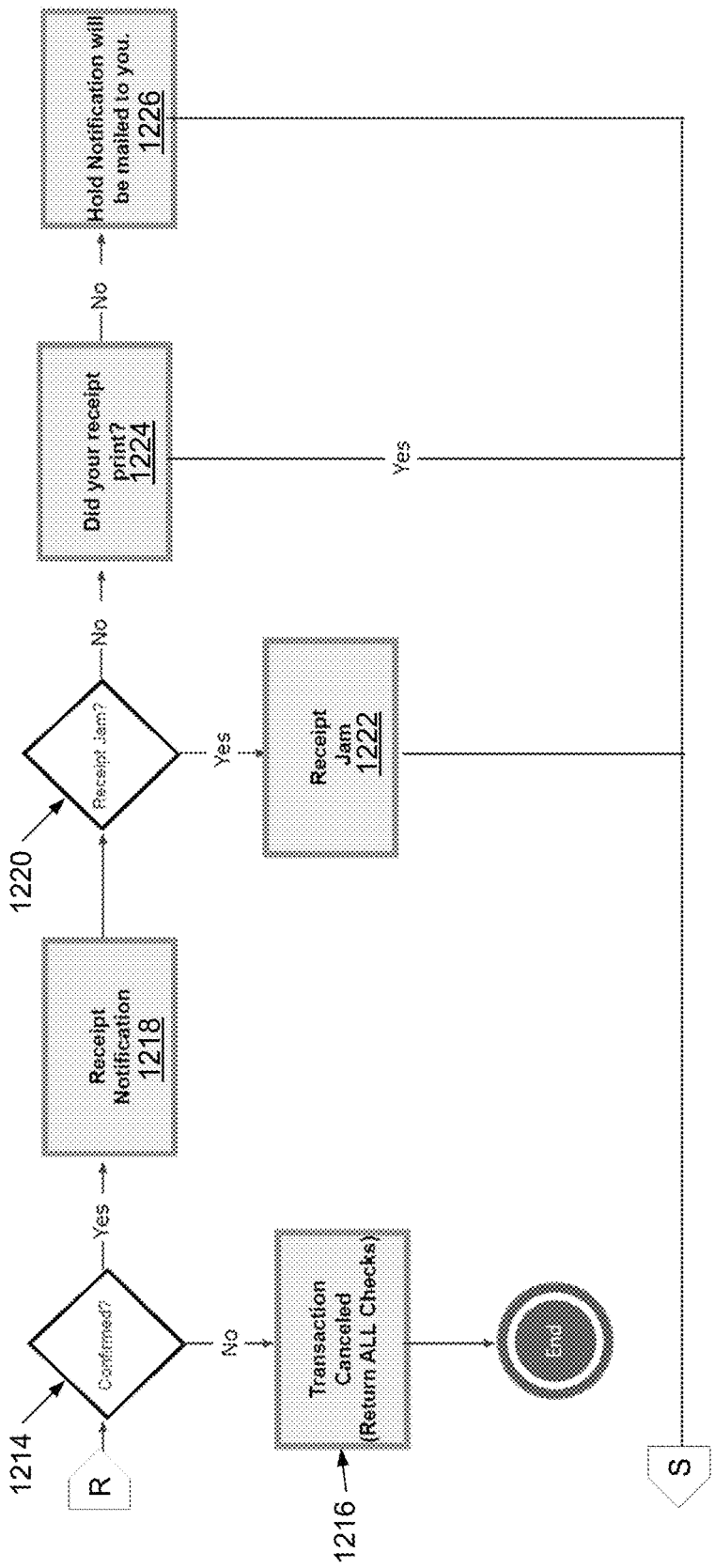
Figure 12C:
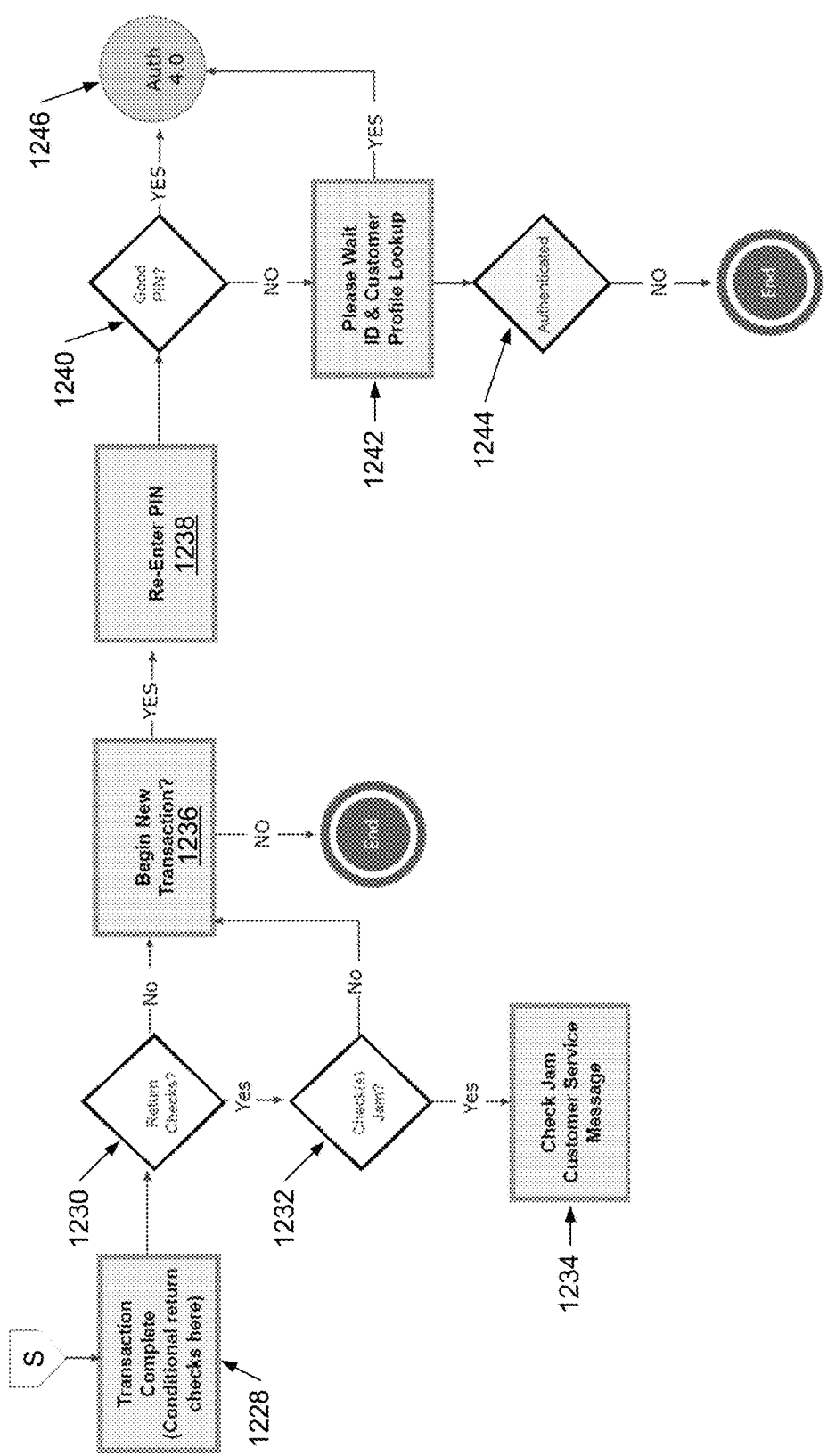

FIGS. 12A-12C illustrate an example of at least a portion of a flow diagram for depositing checks at an automated device or handling check deposit exceptions and/or alerts in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In some aspects, a deposit may be modified due to exceptions and/or alerts that occur during the transaction. In step 1202, a check deposit transaction may be processed by an automated device, LTA device, and/or remote agent device, as previously described. In step 1204, the automated device may determine whether there is a transaction alert. Transaction alerts may comprise, for example, deception alerts (which may be based on business rules), check handling messages, and/or host messages. For check handling, the system may identify certain check types, and upon identification of those check types, the system may prompt an agent device to perform additional process verification steps for the customer to complete the transaction. A host message may comprise a message coming from host system of records that allows the agent to override an alert (based on information the agent is able to obtain) or to decline a transaction based on business rules. If there are no transaction alerts (step 1204: N), the automated device, in step 1206, may proceed to the check deposit flow illustrated in FIGS. 8A-D, such as to step 850. If, on the other hand, there is a transaction alert (step 1204: Y), the automated device, in step 1208, may send a message to one or more LTA or remote agent devices requesting assistance from a local or a remote agent. The automated device may also display a message to the user indicating that a local or remote agent will assist the user with the transaction.

In step 1210, the automated device may receive a message from the agent's device indicating whether the check deposit transaction has been verified by an agent and/or indicating which checks have been verified. The automated device may determine whether the deposit was modified by the agent. If not (step 1210: N), the automated device, in step 1206, may proceed to the check deposit flow illustrated in FIGS. 8A-D. For example, the automated device may display a message indicating that the deposit was verified and proceed to, for example, step 844, to provide a receipt for the transaction. On the other hand, if the agent modified the deposit (e.g., modifying the amount of a particular check, modifying the entire deposit amount, accepting a check rejected by the automated device, rejecting a check, and the like), the automated device may proceed to step 1212 indicating to the user the changes made by the agent and requesting the user to approve the changes, similar to steps 824, 826, and 828 illustrated in FIG. 8B. The automated device may display an interface requesting that the user confirm the modifications made by the agent. For example, the agent may have instructed the automated device to return a check and/or to otherwise place a hold on a check. The automated device may also display an option to cancel the check deposit transaction and for the automated device to return all of the checks.

With reference to FIG. 12B, in step 1214, the automated device may determine whether the user confirmed the modifications made by the agent. If not (step 1214: N) and/or the user selects the option to cancel the transaction, the automated device, in step 1216, may cancel the transaction and return all of the checks to the user. If the user confirmed the modifications (step 1214: Y), the automated device may print a receipt in step 1218 (or send an electronic receipt if the user selected that option).

In step 1220, the automated device may determine whether a receipt jam occurred. If a receipt jam occurred (step 1220: Y), the automated device may display a notification of the receipt jam to the user and optionally provide an option for the user to receive an electronic receipt (e.g., via email). The automated device may also provide an option for the user to request assistance from an agent to receive a physical receipt. If the receipt did not jam (step 1220: N), the automated device may optionally display a message requesting the user to confirm that a receipt printed in step 1224. If the user did not receive a receipt (step 1224: N), the automated device, in step 1226, may display a message to the user that a receipt and/or optionally a hold notification will be mailed to the user.

With reference to FIG. 12C, the automated device may complete the check deposit transaction in step 1228. The automated device may display a message indicating to the user that the check deposit transaction has been completed. If any checks were not accepted for any of the reasons previously described, the automated device may return the rejected checks in step 1228.

In step 1230, the automated device may determine whether any checks were returned (or attempted to be returned). If so (step 1230: Y), the automated device may determine, in step 1232, whether any checks were jammed during the return process. If so (step 1232: Y), the automated device may display a message indicating to the user that the check(s) cannot be returned and that an agent will assist the user. For example, the interface 2300 illustrated in FIG. 23 may be displayed if a check has jammed and/or the automated device cannot otherwise returned the inserted check.

If no checks were returned and/or jammed, the automated device may proceed to step 1236.

In step 1236, the automated device may determine whether to perform another transaction. The automated device may display a message requesting the user to perform another transaction or to end the session. If the user selects the option to end the session or the session times out (step 1236: N), the automated device may end the session. If, on the other hand, the user chooses to perform another transaction (step 1236: Y), in step 1238, the automated device may request the user to re-enter his or her PIN if the user authenticated with a PIN in the previous transaction.

In step 1240, the automated device may determine whether the PIN entered by the user is correct. As previously explained, the automated device may provide the user with a predetermined number of tries, such as three tries. If the entered PIN is not correct (step 1240: N) or if the user previously authenticated using, for example, a driver's license, the automated device may proceed to step 1242 to authenticate the user based on the user's ID as previously explained. The automated device may display a message to the user that the automated device is waiting for an agent to authenticate the user.

In step 1242, local and/or remote agent devices may receive an indication that the user at the automated device needs authentication. A local or remote agent may select an option to authenticate the user. If the agent authenticates the user, the user may be authenticated in step 1244, and the user may perform another transaction (e.g., step 1246). On the other hand, if the agent does not authenticate the user, the session with the automated device may end.

As explained above, the user might not need to re-authenticate with the automated device to perform another transaction. For example, re-authentication may be based on a previous authentication by a local or remote agent using the user's ID or other means, the user authenticating based on a card and/or PIN for the previous authentication, any information available from the customer's profile with the financial institution (e.g., customer's SSN, customer's address or portion thereof, and the like), information from the previous transaction (e.g., the amount deposited in the previous check deposit transaction), physical attributes of the user (e.g., biometrics).

Figure 13A:
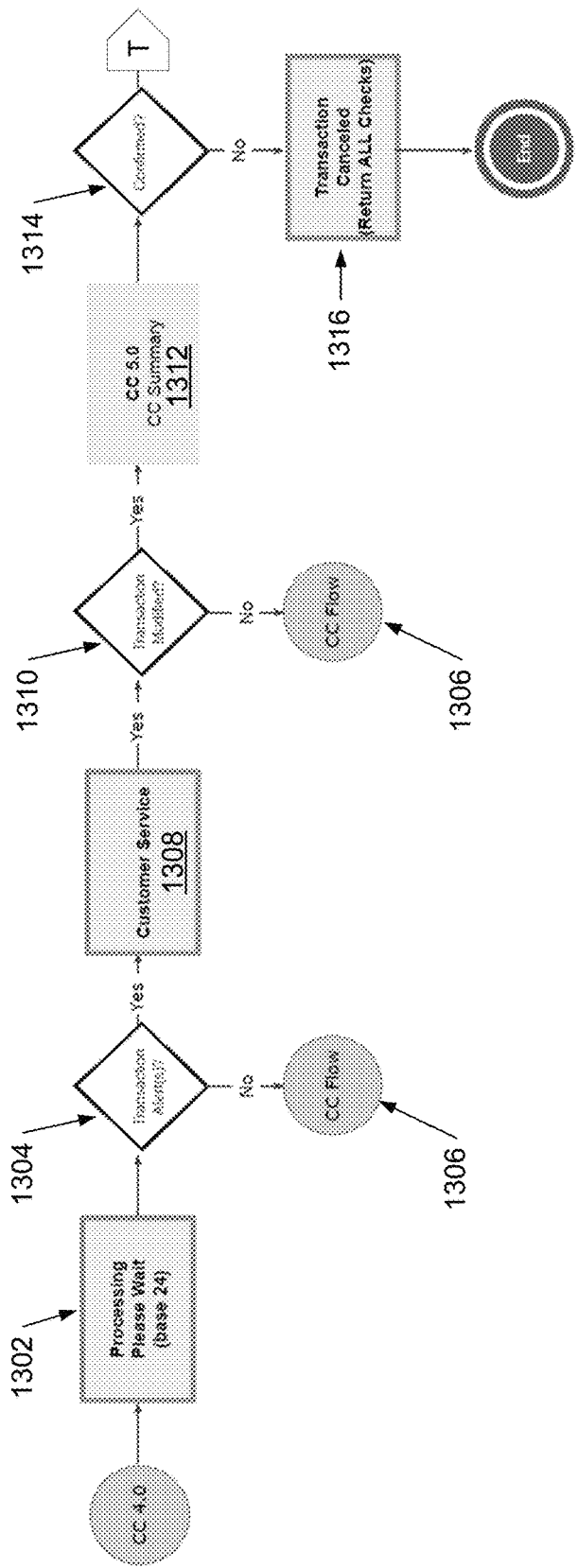
FIGS. 13A and 13B illustrate an example of at least a portion of a flow diagram for cashing a check at an automated device or handling check cashing exceptions and/or alerts in which various aspects of the disclosure may be implemented.
Figure 13B:
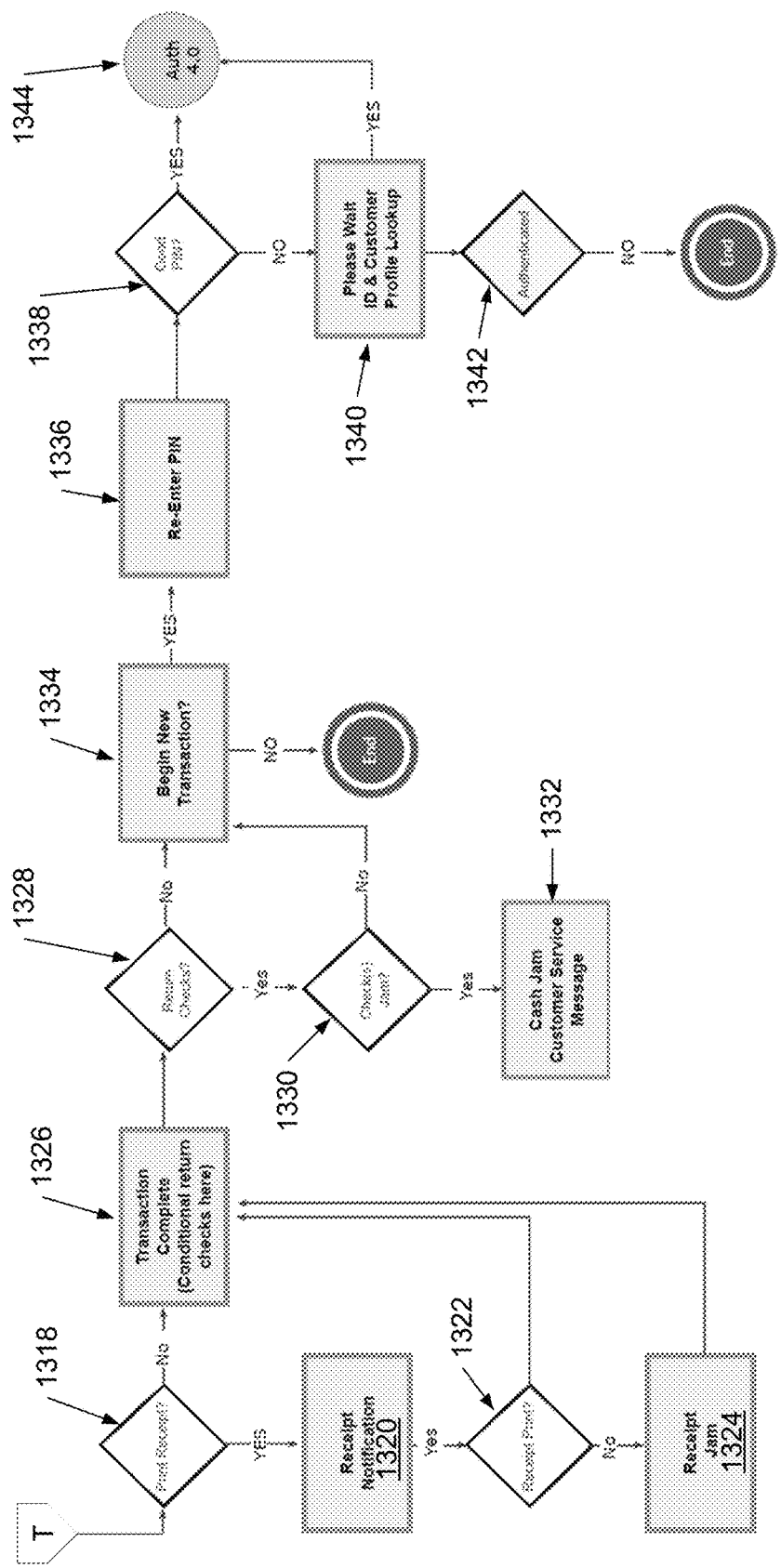

FIGS. 13A and 13B illustrate an example of at least a portion of a flow diagram for cashing a check at an automated device or handling check cashing exceptions and/or alerts in which various aspects of the disclosure may be implemented. The illustrated steps may be performed by any of the computing devices illustrated in FIGS. 3 and 4, including the automated devices 302, 303, and 304, the LTA devices 305 and 306, the remote agent devices 307, 308, and 309, and the computing device 310.

In some aspects, a cash check transaction may be modified due to exceptions and/or alerts that occur during the transaction. In step 1302, a cash check transaction may be processed by an automated device, LTA device, and/or remote agent device, as previously described. In step 1304, the automated device may determine whether there is a transaction alert. Transaction alerts may comprise, for example, deception alerts (which may be based on business rules), check handling messages, and/or host messages. For check handling, the system may identify certain check types, and upon identification of those check types, the system may prompt an agent device to perform additional process verification steps for the customer to complete the transaction. A host message may comprise a message coming from host system of records that allows the agent to override an alert (based on information the agent is able to obtain) or to decline a transaction based on business rules. If there are no transaction alerts (step 1304: N), the automated device, in step 1306, may proceed to the cash check deposit flow illustrated in FIGS. 10A-D, such as to step 1052. If, on the other hand, there is a transaction alert (step 1304: Y), the automated device, in step 1308, may send a message to one or more LTA or remote agent devices requesting assistance from a local or a remote agent. The automated device may also display a message to the user indicating that a local or remote agent will assist the user with the transaction.

In step 1310, the automated device may receive a message from the agent's device indicating whether the cash check transaction has been verified by an agent and/or indicating which checks have been verified. The automated device may determine whether the cash check transaction was modified by the agent. If not (step 1310: N), the automated device, in step 1306, may proceed to the cash check flow illustrated in FIGS. 10A-D. For example, the automated device may display a message indicating that the cash check transaction was verified and proceed to, for example, step 1052, to provide a receipt for the transaction. On the other hand, if the agent modified the transaction (e.g., modifying the amount of a particular check, modifying the entire cash amount, accepting a check rejected by the automated device, rejecting a check, and the like), the automated device may proceed to step 1312 indicating to the user the changes made by the agent and requesting the user to approve the changes. The automated device may display an interface requesting that the user confirm the modifications made by the agent. For example, the agent may have instructed the automated device to return a check and/or to reject a check. The automated device may also display an option to cancel the cash check transaction and for the automated device to return all of the checks.

In step 1314, the automated device may determine whether the user confirmed the modifications made by the agent. If not (step 1314: N) and/or the user selects the option to cancel the transaction, the automated device, in step 1316, may cancel the transaction and return all of the checks to the user. If the user confirmed the modifications (step 1314: Y), the automated device may proceed to step 1318.

With reference to FIG. 13B, in step 1318, the automated device may determine whether to print a receipt for the cash check transaction based on the receipt option selected by the user or a default receipt option (e.g., printing a physical receipt). If the automated device determines to print a receipt (step 1318: Y), the automated device may print a receipt in step 1320 (or send an electronic receipt if the user selected that option). In step 1322, the automated device may determine whether a physical receipt actually printed. If not (step 1322: N), the automated device may determine that a receipt jam occurred in step 1324. The automated device may display a notification of the receipt jam to the user and optionally provide an option for the user to receive an electronic receipt (e.g., via email). The automated device may also provide an option for the user to request assistance from an agent to receive a physical receipt. If the receipt printed (step 1322: Y), the automated device may complete the cash check transaction in step 1326. The automated device may display a message indicating to the user that the cash check transaction has been completed. If any checks were not accepted for any of the reasons previously described, the automated device may return the rejected checks in step 1326.

In step 1328, the automated device may determine whether any checks were returned (or attempted to be returned). If so (step 1328: Y), the automated device may determine, in step 1330, whether any checks were jammed during the return process. If so (step 1330: Y), the automated device may display a message indicating to the user that the check(s) cannot be returned and that an agent will assist the user. For example, the interface 2300 illustrated in FIG. 23 may be displayed if a check has jammed and/or the automated device cannot otherwise returned the inserted check. If no checks were returned and/or jammed, the automated device may proceed to step 1334.

In step 1334, the automated device may determine whether to perform another transaction. The automated device may display a message requesting the user to perform another transaction or to end the session. If the user selects the option to end the session or the session times out (step 1334: N), the automated device may end the session. If, on the other hand, the user chooses to perform another transaction (step 1334: Y), in step 1336, the automated device may request the user to re-enter his or her PIN if the user authenticated with a PIN in the previous transaction.

In step 1338, the automated device may determine whether the PIN entered by the user is correct. As previously explained, the automated device may provide the user with a predetermined number of tries, such as three tries. If the entered PIN is not correct (step 1338: N) or if the user previously authenticated using, for example, a driver's license, the automated device may proceed to step 1340 to authenticate the user based on the user's ID as previously explained. The automated device may display a message to the user that the automated device is waiting for an agent to authenticate the user.

In step 1340, local and/or remote agent devices may receive an indication that the user at the automated device needs authentication. A local or remote agent may select an option to authenticate the user. If the agent authenticates the user, the user may be authenticated in step 1342, and the user may perform another transaction (e.g., step 1344). On the other hand, if the agent does not authenticate the user, the session with the automated device may end.

As explained above, the user might not need to re-authenticate with the automated device to perform another transaction. For example, re-authentication may be based on a previous authentication by a local or remote agent using the user's ID or other means, the user authenticating based on a card and/or PIN for the previous authentication, any information available from the customer's profile with the financial institution (e.g., customer's SSN, customer's address or portion thereof, and the like), information from the previous transaction (e.g., the amount cashed in the previous cash check transaction), physical attributes of the user (e.g., biometrics).

A local agent may have an LTA device (e.g., device 305 or device 306 illustrated in FIG. 3). A remote agent may similarly have a remote agent device (e.g., device 307, device 308, or device 309). The LTA devices and/or remote agent devices may be used by agents to assist users in their transactions, respond to transaction alerts or exceptions, and build relationships with the users, among numerous other functions, as described herein. Prior to using a device, the agent may authenticate with (e.g., sign on to) the device. The agent may provide credentials, such as a username and/or password. Once the agent has signed on, the device may display an option to the agent to select a location to view and/or service, such as the location 301 illustrated in FIG. 3. By selecting a location, the device may display a list of automated devices at the location so that the agent may assist a user at the selected location. For the sake of brevity, the aspects below will be described from the perspective of an LTA device. However, the aspects below may similarly apply to a remote agent device, except that a remote agent might not be able to physically walk up to a user and/or automated device to assist the user.

Figure 24:
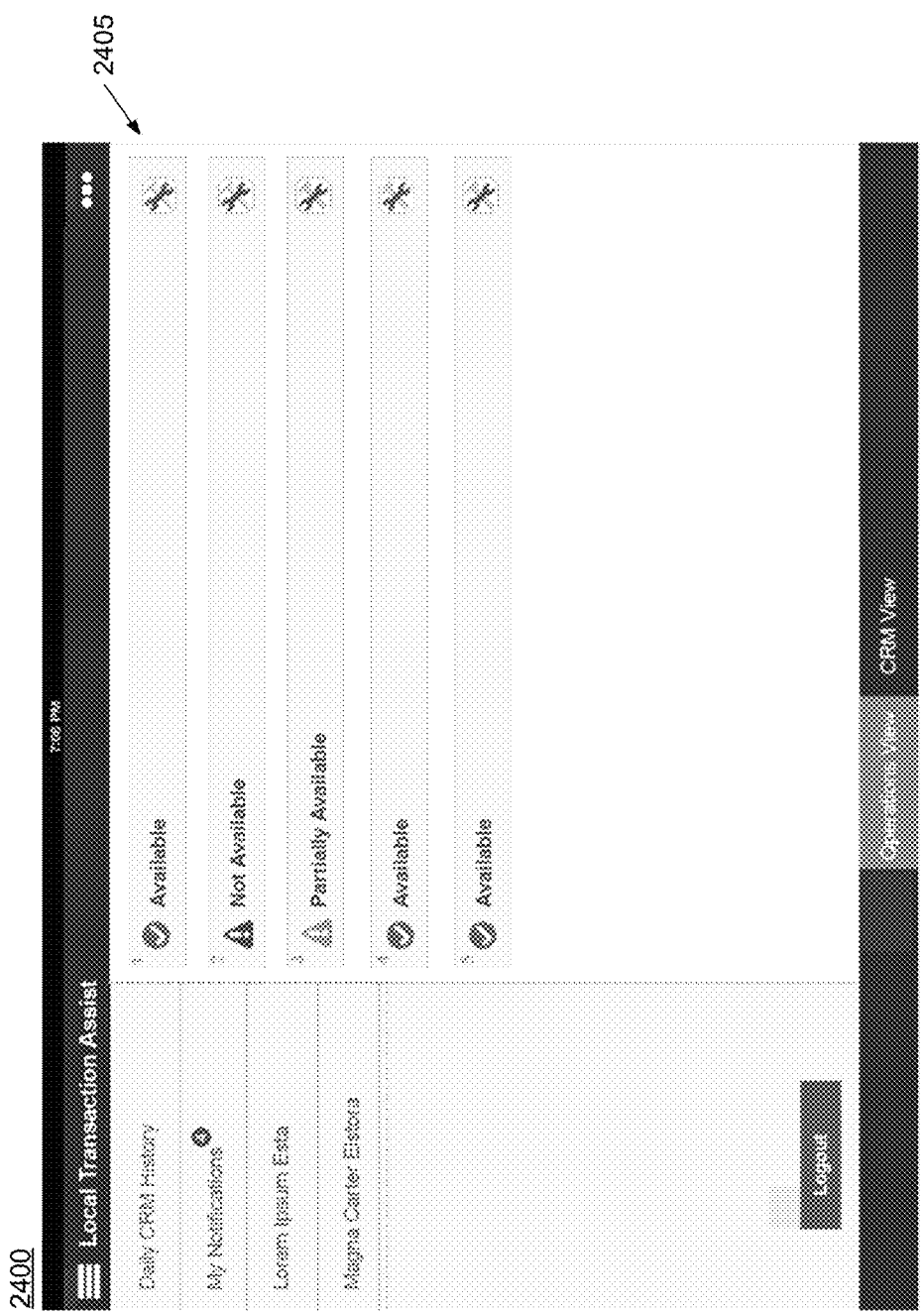
FIG. 24 illustrates an example user interface for local transaction assistance in which various aspects of the disclosure may be implemented.

FIG. 24 illustrates an example user interface 2400 for local transaction assistance in which various aspects of the disclosure may be implemented. The interface 2400 may be displayed on an LTA device after an agent signs on to the LTA device and/or selects a location to service. The interface 2400 may be managed by a computing device, such as computing device 310, running a transaction assistance portal. The interface 2400 may list 2405 the automated devices at the selected location. For example, the location may have five automated devices.

The interface 2400 may also identify the status of each of the automated devices. For example, the interface 2400 may indicate that automated devices 1, 4, and 5 are available, automated device 2 is not available, and automated device 3 is partially available. Each automated device may send its status to a central computing device, such as the computing device 310, which may manage the automated devices at one or many locations 301. The computing device 310 may keep the status of the automated devices up to date on the interface 2400. In some aspects, an automated device that is available may be configured to provide its full capabilities. For example, if the automated device has 10 features and/or devices (e.g., check scanning, cash dispenser, receipt printer, display), the available device may be able to use all 10 of its features and/or devices.

An automated device that is partially available may be configured to provide a portion of its capabilities. For example, 8 out of 10 of the automated device's features and/or devices might be fully operational, and the remaining 2 might not be operational (e.g., the receipt paper may be out, and a cash drawer may be empty). An automated device that is not available might have some features and/or devices that are operational, but the automated device might not be made available to users. For example, an automated device may be manually taken out of service by an agent. An automated device might not be available if a particular feature is not functioning, such as the display screen or the card acceptor of the automated device. The automated device might not be available if a particular subset of features is not functioning. For example, if three or more features (or any other threshold) are not functioning, the automated device may be taken out of service. Each of the statuses displayed on the interface 2400 may be selectable, and selection of a status may cause the interface 2400 to display the features that are not functioning.

Figure 25:
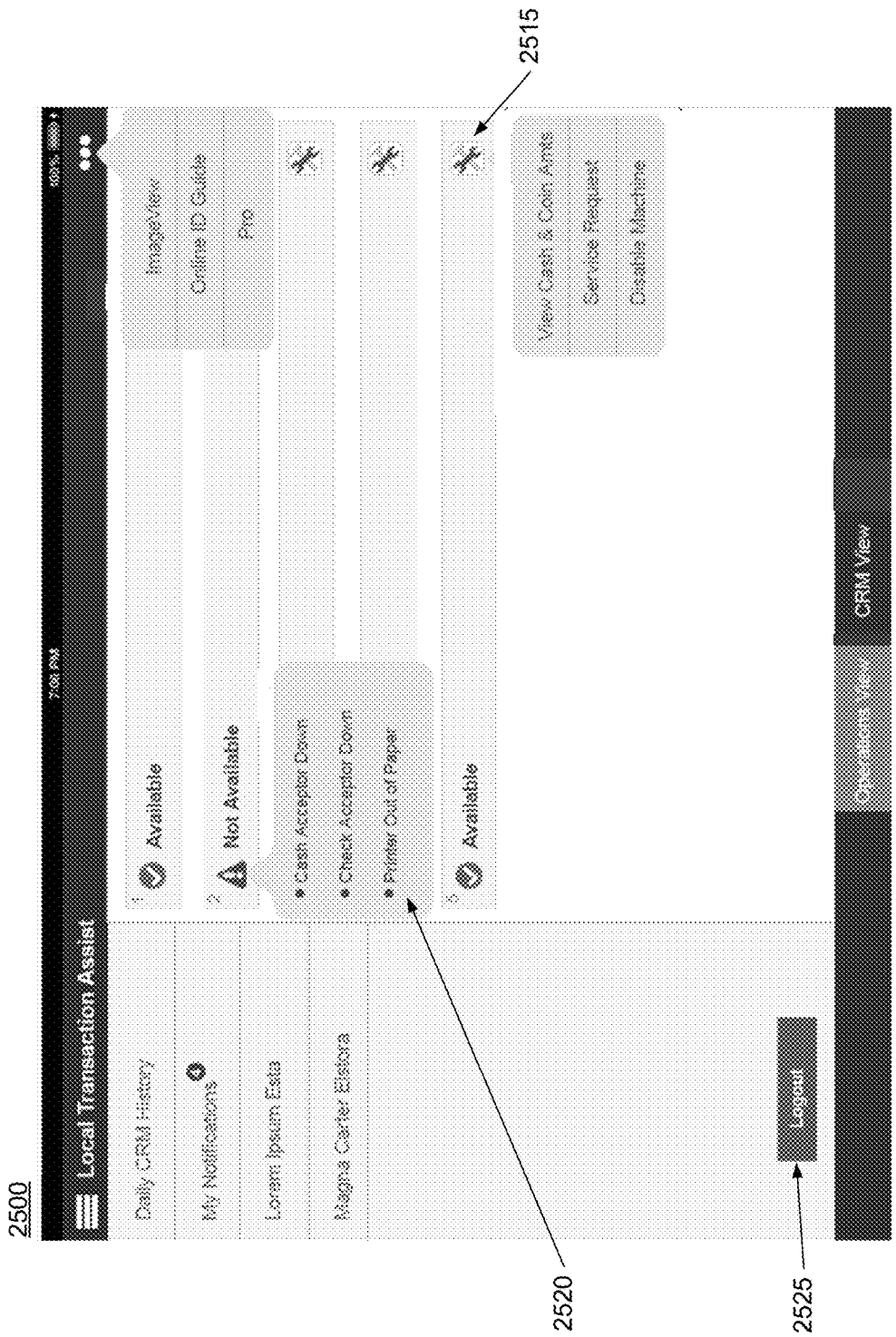
FIG. 25 illustrates an example user interface for local transaction assistance in which various aspects of the disclosure may be implemented.

FIG. 25 illustrates an example user interface 2500 for local transaction assistance in which various aspects of the disclosure may be implemented. An agent may have selected the status indicator for the second automated device indicating that the second device is not available. In response to the selection, the interface 2500 may display a list 2520 listing the features that are not functioning (e.g., the health of the automated device). For example, the cash acceptor of the second device may be down, the check acceptor may be down, and the printer may be down. The interface 2500 may also display a tools option 2515 for each automated device. Selection of the tools option 2515 may cause the display 2500 to display various options for the corresponding automated device, such as an option to view the amount of cash and coins at the automated device, an option to request service for the automated device (e.g., to replenish receipt paper, to fix the display screen, and the like), and an option to disable the machine. Selection of the option to disable the machine may cause a computing device to send an instruction to the corresponding automated device to make itself unavailable to users. The interface 2500 may display an option 2525 for the agent to log out of the system and/or to log out of a particular location.

Figure 26:
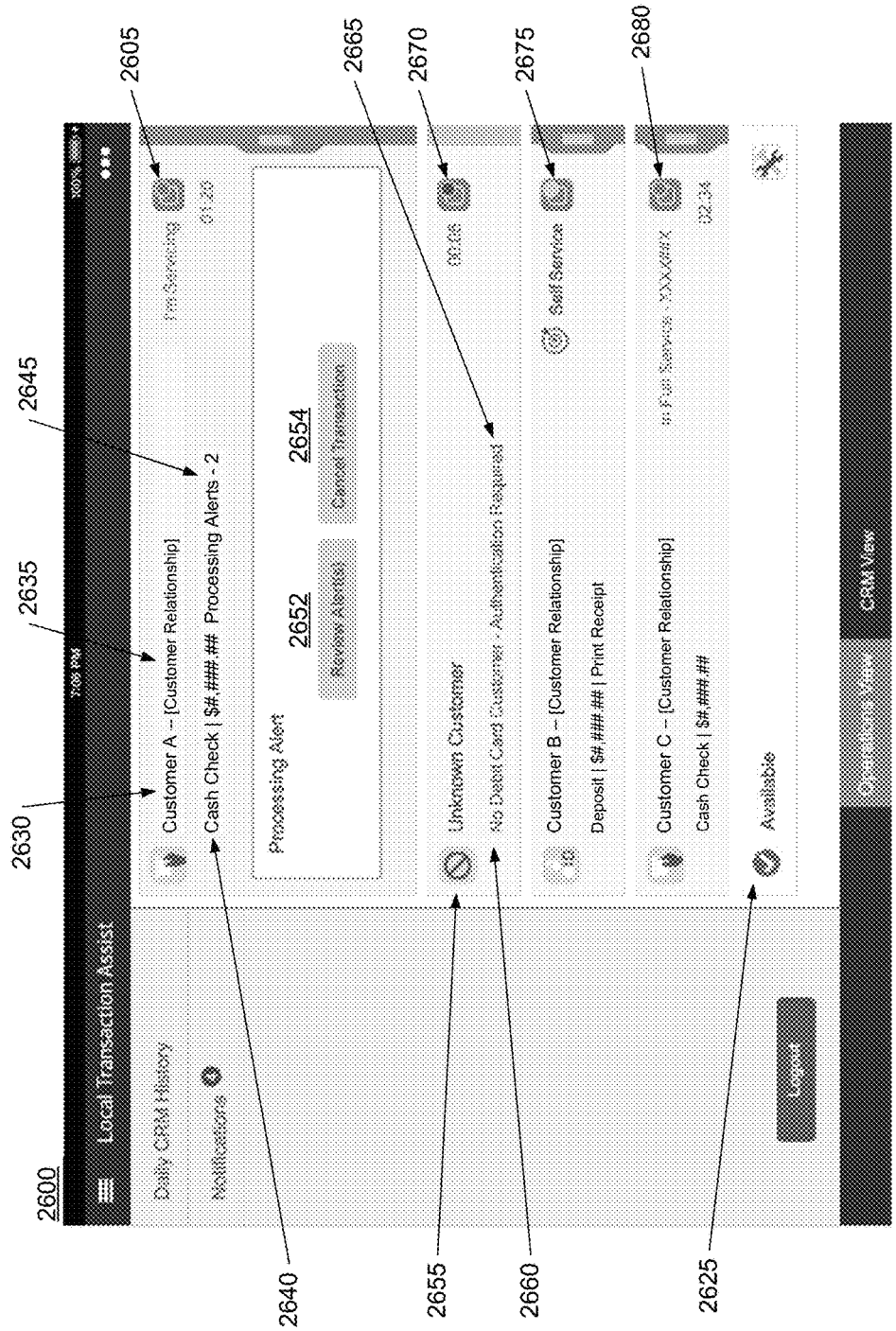
FIG. 26 illustrates an example user interface for local transaction assistance in which various aspects of the disclosure may be implemented.

FIG. 26 illustrates an example user interface 2600 for local transaction assistance in which various aspects of the disclosure may be implemented. Local agents (and similarly remote agents) may actively monitor multiple customers' interactions at the automated device and can determine if a customer might require assistance. The transaction assistance portal may comprise a many-to-many model. Multiple agents may see what multiple customers are doing on automated devices. Moreover, agents, which may comprise managers, tellers, personal bankers, and the like, may be trained for different roles. For example, a first agent may be trained to assist in an A-type transaction, a B-type transaction, and a C-type transaction. A second agent may be trained to assist in an A-type transaction, a B-type transaction, and a D-type transaction. Each agent's training or certifications may be stored in an employee database.

The interface 2600 may be different for each agent, based on their training or certifications. For example, the LTA device of the first agent might list customers performing A-type transactions, B-type transactions, and C-type transactions, but might not list customer performing D-type transactions. Alternatively, the LTA device might display D-type transactions, but may indicate to the agent that the agent cannot assist the customer performing a D-type transaction (e.g., by greying out an assist option). As another example, the LTA device of the second agent might list customers performing A-type transactions, B-type transactions, and D-type transactions and either exclude customers performing C-type transactions from the list or grey out an assist option for the customers performing C-type transactions. The LTA device and/or the transaction portal may make these determinations based on the agent's profile stored in the employee database.

The LTA device may send a request to access the transaction assistance portal to a computing device, such as computing device 310, managing the transaction assistance portal. The computing device may send permission to the LTA device granting it access to the transaction assistance portal. In other words, one or more interfaces for assisting customers may be displayed on the LTA device. For example, while an agent is assisting a customer, the agent may be able to see other customer transactions and/or needs via the transaction assistance portal. The interface 2600 illustrates an example where the agent having the LTA device is assisting a customer (Customer A), while being presented a list of transactions being performed by other customers at other automated devices. The LTA device assisting a customer may send a message to, for example, the computing device 310 indicating that the LTA device is assisting the customer. The computing device 310 may update the transaction assistance portal to indicate to one or more other LTA or remote agent devices that an LTA device is already assisting the customer. Once a customer is assisted and released by the LTA device, the computing device 310 may similarly update the transaction assistance portal to indicate that the LTA device is no longer assisting the customer. The same LTA device or another LTA device may assist the customer with another issue or transaction in the future.

The computing device 310 and/or the LTA device may generate the interface 2600 (or any of the interfaces described herein) for display on a display of the LTA device. The interface 2600 may include an indicator 2605 indicating that the LTA device is currently servicing Customer A 2630. The indicator 2605 may be used to indicate to other agents that the agent of the current LTA device is taking over a particular customer's transaction. The interface 2600 may also indicate the amount of time that the customer has been at the automated device (e.g., 1 minute and 20 seconds). The interface 2600 may identify the customer's relationship 2635 with the entity. For example, the customer might have a first level of relationship with the institution, a second level of relationship, and the like. The customer relationship indicator 2635 may additionally or alternatively identify the type of account with the institution (e.g., a checking account, a savings account, a money market account, and the like). The interface 2600 may indicate 2640 the type of transaction being performed by the customer at the automated device, such as cashing a check (and optionally an amount of the check, such as $#,###.##). The indicator 2640 may additionally or alternatively display the progress of the transaction.

As previously explained, an automated device may send an alert to the LTA device (or other computing device managing the transaction portal) during a transaction. For a check cashing transaction, for example, the automated device may send a message requesting verification of a check, indicating that a check is jammed, and indicating that the automated does not have sufficient cash to dispense, among numerous other alerts. An indicator 2645 may identify the alert (e.g., Processing Alerts—2). The interface 2600 may display one or more options for the agent to act on the alert. The interface 2600 may display an option 2652 for the agent to review the alert(s). Selection of the option 2652 may cause the LTA device to display an interface that can be used to address the alert. For example, the interface may comprise the interface 3500 illustrated in FIG. 35 if the alert is a request for the agent to verify a check inserted by the customer. The interface 2600 may also display an option 2654 for the agent to cancel the transaction. Selection of the option 2654 may cause the LTA device to send a message to the computing device managing the transaction portal and/or a message to the automated device to cancel the transaction.

The interface 2600 may display information for another customer 2655 (or a user that is not a customer). The amount of time 2670 that the customer 2655 has been at the automated device may be displayed. The interface 2600 may also display one or more alerts for the customer 2655, such as an alert 2660 indicating that the customer is attempting to authenticate without a debit card and an alert 2665 indicating that the customer requires authentication by an agent. The interface 2600 may indicate that the unknown customer 2655 is not currently being assisted by an agent. For example, a graphic (e.g., a GUI) may be displayed and/or made a different color (e.g., red) to indicate that the customer 2655 requires assistance and is waiting for assistance.

The interface 2600 may display information for yet other customers, such as a Customer B and a Customer C. The interface 2600 may indicate 2675, for example, that Customer B is currently performing a self-service transaction and has not requested (or does not otherwise require) assistance from an agent. For a Customer C, the interface 2600 may indicate 2680 that the customer is currently being serviced by another agent's device (e.g., in full service mode). The indicator 2680 may include an identifier for the other agent or device, such as XXX##X. The interface 2600 may indicate 2625 that this automated device at the location is available and not currently being used by a customer.

Figure 27:
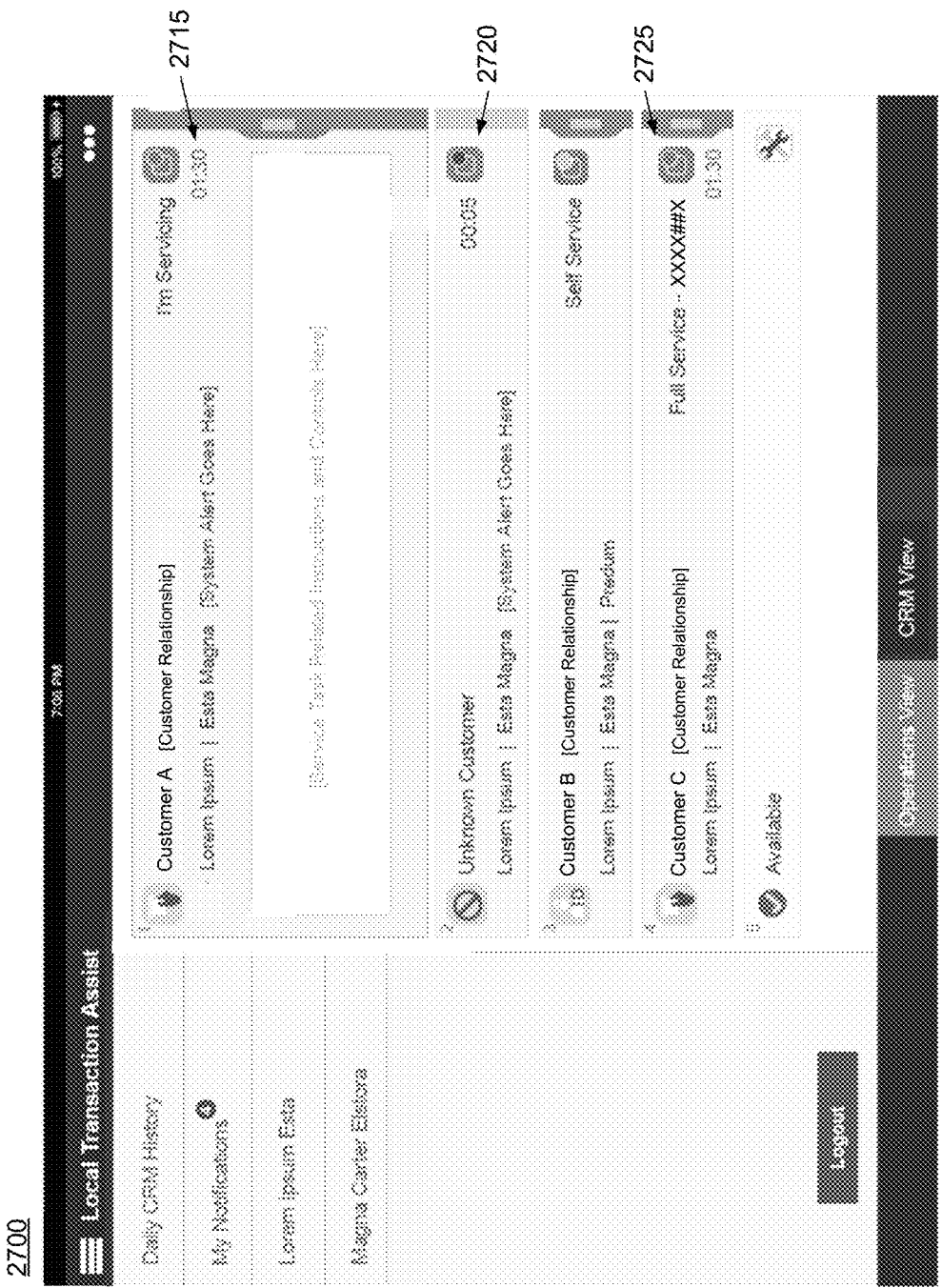
FIG. 27 illustrates an example user interface for local transaction assistance in which various aspects of the disclosure may be implemented.

FIG. 27 illustrates an example user interface 2700 for local transaction assistance in which various aspects of the disclosure may be implemented. The interface 2700 may display the amount of time that each customer has spent at an automated device. For example, Customer A, who is currently being assisted by the agent, may have spent 1 minute and 30 seconds at automated device 1 (indicator 2715). The unknown customer at automated device 2 may have spent 5 seconds at the automated device 2 (indicator 2720). Customer C may have spent 1 minute and 30 seconds at automated device 4 (indicator 2725). If a customer, such as Customer B, is using an automated device in self-service mode, the interface 2700 might not display the amount of time spent at the device. In alternative aspects, the interface 2700 may display the amount of time for Customer B. The indicators 2715, 2720, and 2725 may be dynamic and may change according to the time spent at the automated device. Agents may use these indicators to see how long a transaction takes or how long the customer has been at the device.

Although not illustrated, the interface 2700 may also display the amount of time that has passed since the user requested assistance, a transaction alert or exception occurred, or the user otherwise requires assistance. Once an agent and LTA device begins assisting the user, this time indicator may disappear from the interface 2700. Alternatively, even if the user is being serviced by an agent, the amount of time since the request, alert, or exception may continue to be displayed. In some aspects, agents may respond to requests or alerts based on the amount of time that the user has been at a particular device, and/or the amount of time since requesting assistance or an alert occurred. Agents may also respond based on the type of transaction or portion thereof that the user is attempting to perform.

The LTA device (and the interface 2700) may assist the agent in determining which customer to service next. For example, the interface 2700 may display the total amount of time that the user has spent at the automated device, such as the transaction time (e.g., indicators 2715, 2720, and 2725). In some aspects, agents may assist users based on the amount of time spent at the automated device, starting with the user that has spent the greatest amount of time at the automated device.

The interface 2700 may adjust the order of the customers displayed on the LTA device based on the total time. For example, assume that a first customer has been at a first device for 1 minute and 30 seconds, a second customer has been at a second device for 30 seconds, and a third customer has been at a third device for 2 minutes and 15 seconds. The LTA device may display the third customer at the top of the list (2:15), the first customer second on the list (1:30), and the second customer at the bottom of the list (0:30).

If the LTA device is servicing a customer, it may display that customer at the top of the list. In the three-customer example above, assume that the LTA device is servicing the first customer. The LTA device may display the first customer at the top of the list, the third customer second on the list, and the second customer at the bottom of the list. The LTA device may similarly display customers that are already being serviced by other agents at the bottom of the list. In the example above, assume that another LTA device is servicing the third customer. In this example, the LTA device may display the first customer at the top of the list, the second customer second on the list, and the third customer at the bottom of the list. The order may be dynamically adjusted as customers complete their transactions, new customers begin their transactions, agents begin assisting customers, and agents complete assisting customers.

In some aspects, LTA devices may receive a notification from an automated device and/or another computing device in the network if the customer at the automated device might require assistance, but has not requested assistance. For example, the LTA device may receive a notification if a transaction at an automated device is taking longer than usual. The automated device or other computing device may compare the transaction time to an expected transaction time for the type of transaction the customer is performing. The expected transaction time may comprise a predetermined amount of time (e.g., 45 seconds for a fast cash withdrawal, 2 minutes for depositing 3 checks, and the like). The expected transaction time may alternatively comprise a historical average or medium for that type of transaction. If the transaction time of the customer at an automated device has exceeded a threshold, such as the expected transaction time (or the expected transaction time with a time buffer), the LTA devices may receive a notification that the customer might require assistance. The LTA devices may similarly receive a notification if the display screen on the automated device times out, which may indicate that the customer might require assistance.

As explained above, the interface 2700 may display the amount of time since the user requested assistance or an alert or exception occurred during the transaction. This time may comprise a request time (e.g., the amount of time since the automated device sent the request for assistance). In some aspects, agents may assist users based on the request time, starting with the user with the greatest request time.

The interface 2700 may adjust the order of the customers displayed on the LTA device based on the request time. For example, assume that a request time for a first customer at a first device is 30 seconds, a request time for a second customer at a second device is 15 seconds, and a request time for a third customer at a third device is 45 seconds. The LTA device may display the third customer at the top of the list (45 seconds), the first customer second on the list (30 seconds), and the second customer at the bottom of the list (15 seconds).

If the LTA device is servicing a customer, it may display that customer at the top of the list. In the three-customer example, assume that the LTA device is servicing the first customer. In this example, the LTA device may display the first customer at the top of the list, the third customer second on the list, and the second customer at the bottom of the list. The LTA device may similarly display customers that are already being serviced at the bottom of the list. In the example above, assume that another LTA device is servicing the third customer. In this example, the LTA device may display the first customer at the top of the list, the second customer second on the list, and the third customer at the bottom of the list. The order may be dynamically adjusted as new requests, alerts, and/or exceptions come up and as requests, alerts and/or exceptions are taken up or resolved by agents.

The LTA device (and the interface 2700) may assist the agent in determining which customer to service next based on the type of assistance needed. Some types of assistance may typically require more time than other types of assistance. For example, it may take an agent more time to physically replenish a cash drawer than to verify the amount listed on a check scanned by the automated device. The estimated amount of time it takes for each type of assistance may be predetermined (e.g., 2 minutes for an agent to replenish a cash drawer, 10 seconds for an agent to verify the amount listed on a check). Additionally or alternatively, the estimated amount of time may be based on a historical average or medium. For example, historically, it may have taken agents 2 minutes and 4 seconds on average to replenish a cash drawer from the time the automated device sent the alert.

The interface 2700 may optionally display the estimated amount of time that the particular type of assistance will take, and agents may assist users based on that amount of time, starting with the assistance that is estimated to take the least amount of time. By addressing these types of assistance first, agents may be able to address more issues in a shorter time period.

The interface 2700 may adjust the order of the customers displayed on the LTA device based on the type of assistance. For example, assume that a first customer at a first device requires assistance that typically takes 1 minute and 30 seconds to address, a second customer at a second device requires assistance that typically takes 30 seconds, and a third customer at a third device requires assistance that typically takes 2 minutes and 15 seconds. The LTA device may display the third customer at the top of the list (2:15), the first customer second on the list (1:30), and the second customer at the bottom of the list (0:30).

If the LTA device is servicing a customer, it may display that customer at the top of the list. In the three-customer example above, assume that the LTA device is servicing the first customer. In this example, the LTA device may display the first customer at the top of the list, the third customer second on the list, and the second customer at the bottom of the list. The LTA device may similarly display customers that are already being serviced at the bottom of the list. In the example above, assume that another LTA device is servicing the third customer. In this example, the LTA device may display the first customer at the top of the list, the second customer second on the list, and the third customer at the bottom of the list. The order may be dynamically adjusted as new requests, alerts, and/or exceptions come up and as requests, alerts and/or exceptions are taken up or resolved by agents.

The LTA device (and the interface 2700) may use one or more other factors to assist the agent in determining which customer to service next. For example, the LTA device may prioritize customers that are closer to completing their transactions over customers that are just beginning their transactions. As previously explained, the LTA device may display each customer's transaction progress (e.g., authentication, select transaction, select account, and the like). The LTA device may move customers up the list if they are close to completing their transactions, but have requested assistance and/or an alert or exception occurred. For example, a customer may be moved up the list if the customer requested a printed receipt for the transaction, but the automated device cannot print the receipt (e.g., it is out of receipt paper, there is a receipt paper jam, and the like). By prioritizing customers at the tail end of their transactions, the LTA device may be used to help the customer to complete his or her transaction so that other customers may use the automated device. The order on the LTA device may also be adjusted based on the customer's relationship with the institution. For example, customers at a first level of relationship may be prioritized over customers at a second level of relationship.

The LTA device (and the interface 2700) may prioritize customers based on a combination of any of the factors listed above, including the total transaction time, the request time, the type of assistance (and the corresponding estimated amount of time), the transaction progress, and/or the customer's relationship with the institution. For example, a computing device may assign a value to each factor considered, with a higher value indicating a higher priority. The computing device may optionally assign a weight to each value. The weights may be adjusted to put more weight (or less weight) on a particular factor. The computing device may determine a priority value by combining the value and corresponding weight for each factor and determine which customers to move up the list and which customers to move down the list based on the priority value. For example, the customer with the largest priority value may be at the top of the list, and the customer with the smallest priority value may be at the bottom of the list.

Figure 28:
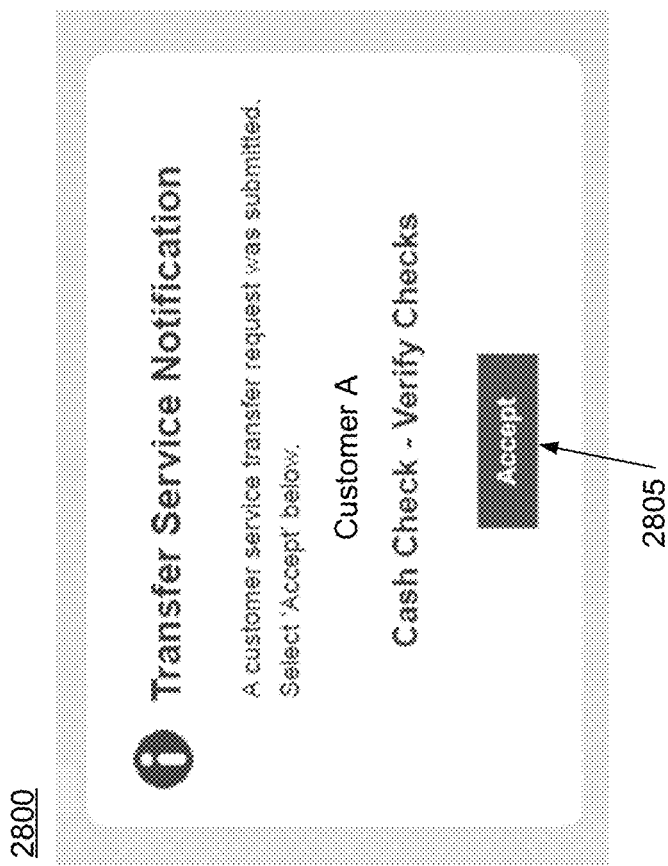
FIG. 28 illustrates an example user interface for a transfer service notification in which various aspects of the disclosure may be implemented.

FIG. 28 illustrates an example user interface 2800 for a transfer service notification in which various aspects of the disclosure may be implemented. In some aspects, a service request may be transferred between agents. An LTA device may transfer a service request to another LTA device or to a remote agent device, or a remote agent device may transfer a service request to another remote agent device or to an LTA device. Accordingly, local and remote agents may work alone or in tandem to service the customer.

The computing device may attempt to service a request from an automated device using an LTA device, rather than a remote agent device. A network connection may be established between the automated device and an LTA device. In some aspects, the interface 2700 may be displayed on LTA devices, but not remote agent devices. A local agent that sees a service request on the interface 2700 may transfer the request to a remote agent. The interface 2700 may display an option to transfer the request to a remote agent device. If a local agent selects the transfer option, the LTA device may send a request to transfer the service to one or more remote agent devices (or a computing device managing the transaction assistance portal). The network connection between the LTA device and the automated device may be removed. The computing device managing the transaction assistance portal may send a request to a remote agent device requesting the remote agent device to service the user.

The example user interface 2800 may be displayed on a remote agent device in response to the LTA device sending the request to transfer. The interface 2800 may display a message indicating that a customer service transfer request was submitted. The message may optionally identify the customer (e.g., Customer A) or the type of transaction. The interface 2800 may display an option 2805 for the remote agent to accept the transfer request. In response to the remote agent selecting the option 2805, a communication session, via a network connection, between the automated device requiring assistance and the remote agent device may be established. During the session, the remote agent device and the automated device may facilitate communications (e.g., via audio and/or video devices, such as the speaker or camera of the remote agent device or the automate device), as described herein. A local agent may similarly request to transfer a service request while the local agent is assisting the customer. In other words, the local agent may assist the customer for a portion of the customer's transaction, while a remote agent assists with another portion of the customer's transaction. The number of transfers is not limited to one and can include any number of transfers. For example, after the local agent transfers a service request to a remote agent, the remote agent may transfer the request back to the local agent, transfer the request to another remote agent, or transfer the request to another local agent.

In some aspects, a request may be transferred automatically without input from a local agent. For example, the location of the automated device might not have a local agent that is qualified or has been trained to address a particular request or type of transaction. For example, assume that the location has a first local agent that is trained to assist in an A-type transaction, a B-type transaction, and a C-type transaction and a second agent that is trained to assist in the A-type transaction, the B-type transaction, and a D-type transaction. As explained above, each agent's training or certifications may be stored in an employee database. If an automated device sends a request for assistance in an F-type transaction, the LTA devices or other computing device may detect, based on the data stored in the employee database and the employees signed on to the transaction assist portal, that the location does not have a local agent trained or certified to assist in an F-type transaction. In response to the detection, an LTA device or other computing device may automatically send a transfer request to a remote agent device.

A service request may also be automatically transferred to a remote agent device based on the time of day of the request. In particular, a particular location may be staffed with local agents during regular business hours, but might not be staffed otherwise. During these hours, customers may still be able to access automated devices to perform transactions, such as if the automated device is part of a drive through, is outside, or is otherwise accessible. If the user requests assistance during a transaction or an alert or exception occurs, the automated device may request assistance from a remote agent device. The automated devices may have three modes of operation: self-service, local assisted self-service during hours when the location lobby is open, and remote assisted service when the location lobby is closed. The computing device or other devices may identify the hours for each location and transfer service to local or remote agent devices accordingly.

A service request may be automatically transferred to a remote agent device based on the number of service requests and/or the number of local agents at the location. For example, the local agents at the location may be overloaded with requests, and remote agents may assist during overload situations. A computing device may identify an overload condition based on the ratio of the number of service requests to the number of local agents. If the ratio exceeds a threshold, one or more request may be transferred to a remote agent. A computing device may also identify an overload condition based on a calculated wait time for customers at the automated devices. The wait time may be calculated based on one or more of the amount of time that the customer has been at the automated device (e.g., the active session) or the amount of time that the customer has been waiting for assistance at a particular step. If the wait time exceeds a threshold wait time, one or more requests may be transferred to a remote agent. Once the ratio of requests to local agents drops below a threshold ratio, or the wait time drops below a threshold wait time, future requests may be serviced by local agents at the location.

Figure 29:
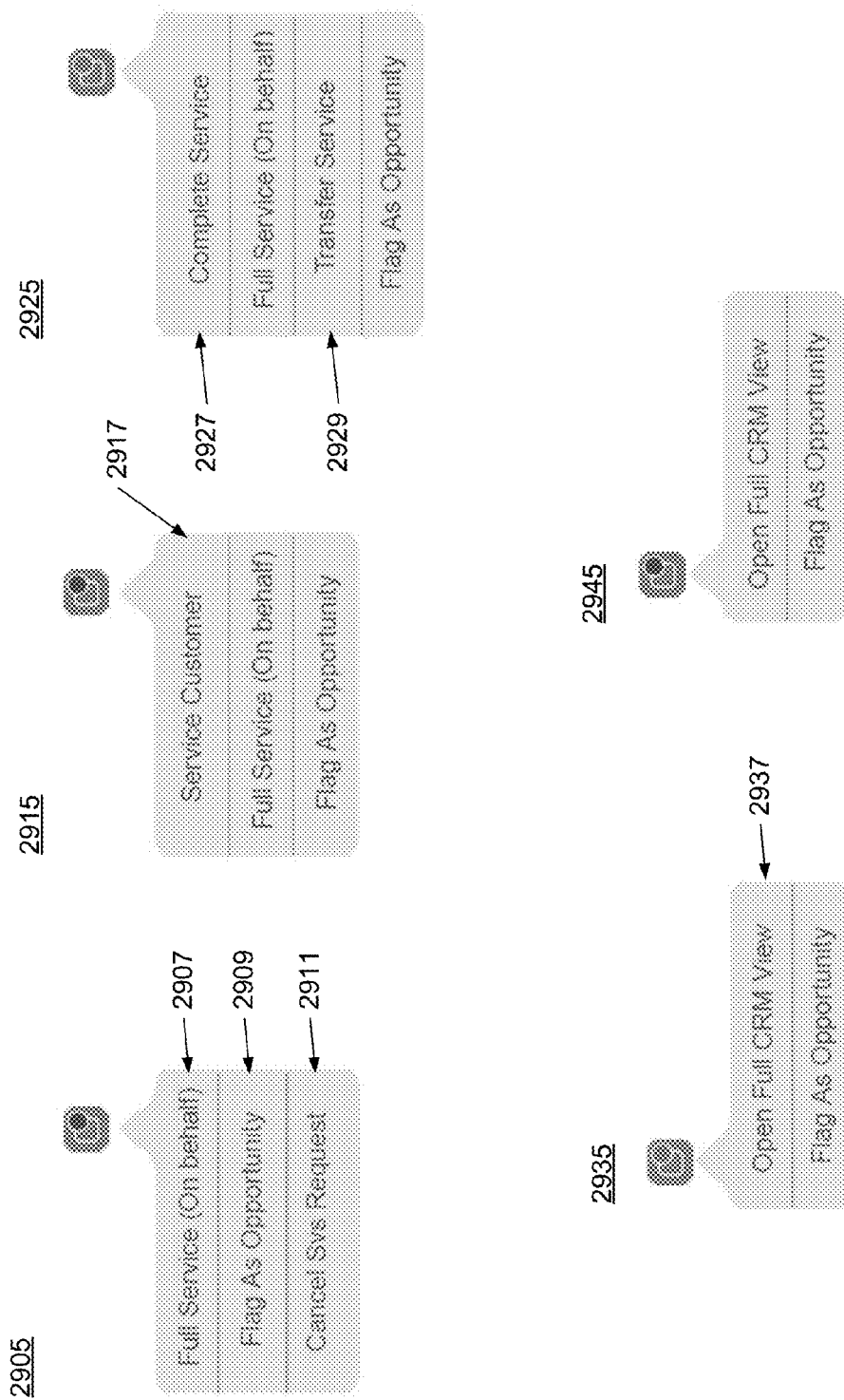
FIG. 29 illustrates example selectable actions in which various aspects of the disclosure may be implemented.

FIG. 29 illustrates example selectable actions in which various aspects of the disclosure may be implemented. One or more of the selectable actions illustrated in FIG. 29 may be displayed on the LTA device (or remote agent device). The interface 2905 may be displayed if, for example, the user selects a request service option at the automated device. The interface 2905 may display a full service option 2907. In response to an agent selecting the full service option 2907, the agent may be granted full service access to the automated device, such as via the agent's LTA device. The agent may complete the transaction for the customer in full service mode. The system may store data indicating that the agent helped the customer at the automated device and assisted in full service mode on behalf of the customer. Once the transaction is complete, the system may update the data to indicate that service has been completed.

The interface 2905 may also display an option 2909 to flag the user as an opportunity. In response to selecting this option, the user may be identified by the system for an agent to potentially provide additional opportunities or services to the user after the user completes his or her transaction. The system may load the user's information onto a customer relationship management (CRM) interface. The system may also load one or more icons onto the CRM interface, such as a target icon, to indicate that the user has been flagged by an agent for an opportunity. Flagging for opportunities will be described in further detail in the examples below. The interface 2905 may also display an option 2911 to cancel the service request. If the agent selects this option 2911, the request from the automated device may be cancelled, and the automated device and/or user may be notified that the service request was cancelled. The automated device may close an interface indicating that the automated device is waiting for service and/or return to an interface displayed on the automated device before the user requested assistance.

The interface 2915 may be displayed if, for example, a task (e.g., an alert or exception) occurs during the transaction. In some aspects, the interface 2915 might not include an option for the agent to cancel the service request. The interface 2915 may display a service customer option 2917. If an agent selects the option 2917, the agent's LTA device may be connected to the automated device, and the agent may be able to provide assisted service to the customer at the automated device (as opposed to full service). The interface 2915 may also include a full service option and a flag as opportunity option as previously described.

The interface 2925 may be displayed if, for example, the agent is assisting the user. The interface 2925 may display a complete service option 2927. If the agent selects this option 2927, the assistance by the LTA device of the agent may be completed, and the connection between the automated device and the LTA device may be disconnected. The request may also be removed from the list of service requests (e.g., as listed on interface 2700). The interface 2925 may also display an option 2929 to transfer the service request to another device, such as another LTA device or another remote agent device, as previously described. The interface 2925 may also display a full service option and a flag as opportunity option, as described above.

The interface 2935 may be displayed if, for example, the user is being assisted by another agent. The interface 2945 may be displayed if, for example, an agent switches to the CRM view. Each of the interfaces 2935 and 2945 may also display an open full CRM view 2937. In response to selecting this option, a CRM interface for the user may be displayed on the agent's LTA device. The CRM interface will be described in further detail below. Each of the interfaces 2935 and 2945 may display a flag as opportunity option, as described above.

Figure 30:
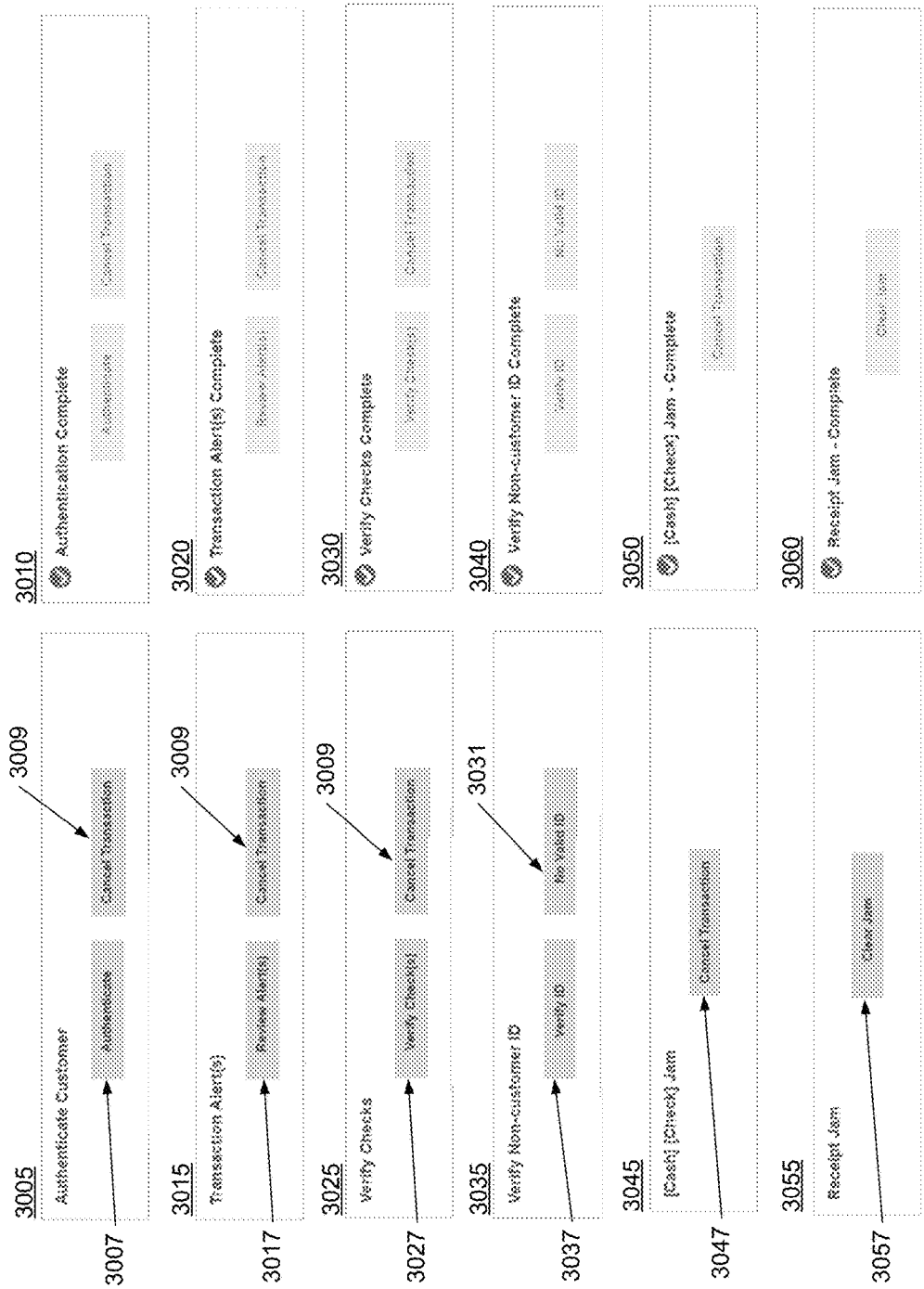
FIG. 30 illustrates example selectable actions for authentication, transaction alerts, verifying checks, and verifying non-customer IDs in which various aspects of the disclosure may be implemented.

FIG. 30 illustrates example selectable actions for authentication, transaction alerts, verifying checks, and verifying non-customer IDs in which various aspects of the disclosure may be implemented. The selectable actions may be displayed on the LTA device (or remote agent device) of an agent assisting the user. The interface 3005 may be displayed when the agent is authenticating the user as described above. For example, the user may authenticate using a card (e.g., a bank card, a credit card, an ATM card, and the like)

and/or an ID (e.g., a driver's license). If the agent decides to authenticate the user, the agent may select the authenticate option 3007. The LTA device may send a message to the automated device that the user has been authenticated, and the user may proceed with his or her transaction on the automated device. The interface 3010 may be displayed on the LTA device after the agent authenticates the user. If, on the other hand, the agent decides not to authenticate the user, the agent may select the cancel transaction option 3009. The LTA device may send a message to the automated device to cancel the transaction, and a message may be displayed to the user that the user cannot be authenticated.

The interface 3015 may be displayed when the agent is reviewing a transaction alert as described above. If the agent decides to review the alert, the agent may select the review alert option 3017. The LTA device may display the alert to the agent. Example interfaces for transaction alerts will be described in further detail in the examples below. Once the alert is addressed, the agent may provide input to the LTA device, and the LTA device may send a message to the automated device that the alert has been cleared. The user may proceed with his or her transaction on the automated device. The interface 3020 may be displayed on the LTA device after the transaction alert has been cleared. If, on the other hand, the agent decides not to address the transaction alert, the agent may select the cancel transaction option 3009. The LTA device may send a message to the automated device to cancel the transaction, and a message may be displayed to the user that the transaction could not be completed.

The interface 3025 may be displayed when the agent is verifying checks scanned by the automated device as described above. If the agent decides to review the checks, the agent may select the verify checks option 3027. The LTA device may display the checks to the agent, as previously described. Once the agent verifies the checks, the agent may provide input to the LTA device, and the LTA device may send a message to the automated device that the checks have or have not been verified. The user may proceed with his or her transaction on the automated device. The interface 3030 may be displayed on the LTA device after one or more checks have been verified. If, on the other hand, the agent decides not to verify the checks, the agent may select the cancel transaction option 3009. The LTA device may send a message to the automated device to cancel the transaction, and a message may be displayed to the user that the transaction could not be completed.

The interface 3035 may be displayed when the agent is verifying a non-customer ID, such as a drivers' license, as described above. If the agent decides to verify the non-customer ID, the agent may select the authenticate option 3037. The LTA device may send a message to the automated device that the ID has been verified (or display the ID for verification). After verification, the user may proceed with his or her transaction on the automated device. The interface 3040 may be displayed on the LTA device after the agent verifies the non-customer ID. If, on the other hand, the agent decides not to verify the non-customer ID, the agent may select the no valid ID option 3031. The LTA device may send a message to the automated device to cancel the transaction, and a message may be displayed to the user that the user cannot be authenticated.

The interface 3045 may be displayed when the agent is addressing a cash or check jam at the automated device as described above. The interface 3045 may comprise a cancel transaction option 3047. The agent may select the cancel transaction option 3047. The LTA device may send a message to the automated device to cancel the transaction, and a message may be displayed to the user that the transaction could not be completed. The interface 3050 may be displayed on the LTA device after selection of the cancel transaction option 3047.

The interface 3055 may be displayed when the agent is addressing a receipt jam at the automated device as described above. If the agent decides to clear the jam, the agent may select the clear jam option 3057. In response to selection of the option 3057, the LTA device may notify maintenance personnel to clear the jam. The LTA device may also attempt to instruct the automated device to clear the jam by, for example running one or more of its paper rolls until the jam clears. After the jam has cleared, the user may proceed with his or her transaction on the automated device. The interface 3060 may be displayed on the LTA device after the request to clear the receipt jam is sent or the receipt jam is actually cleared.

Figure 36:
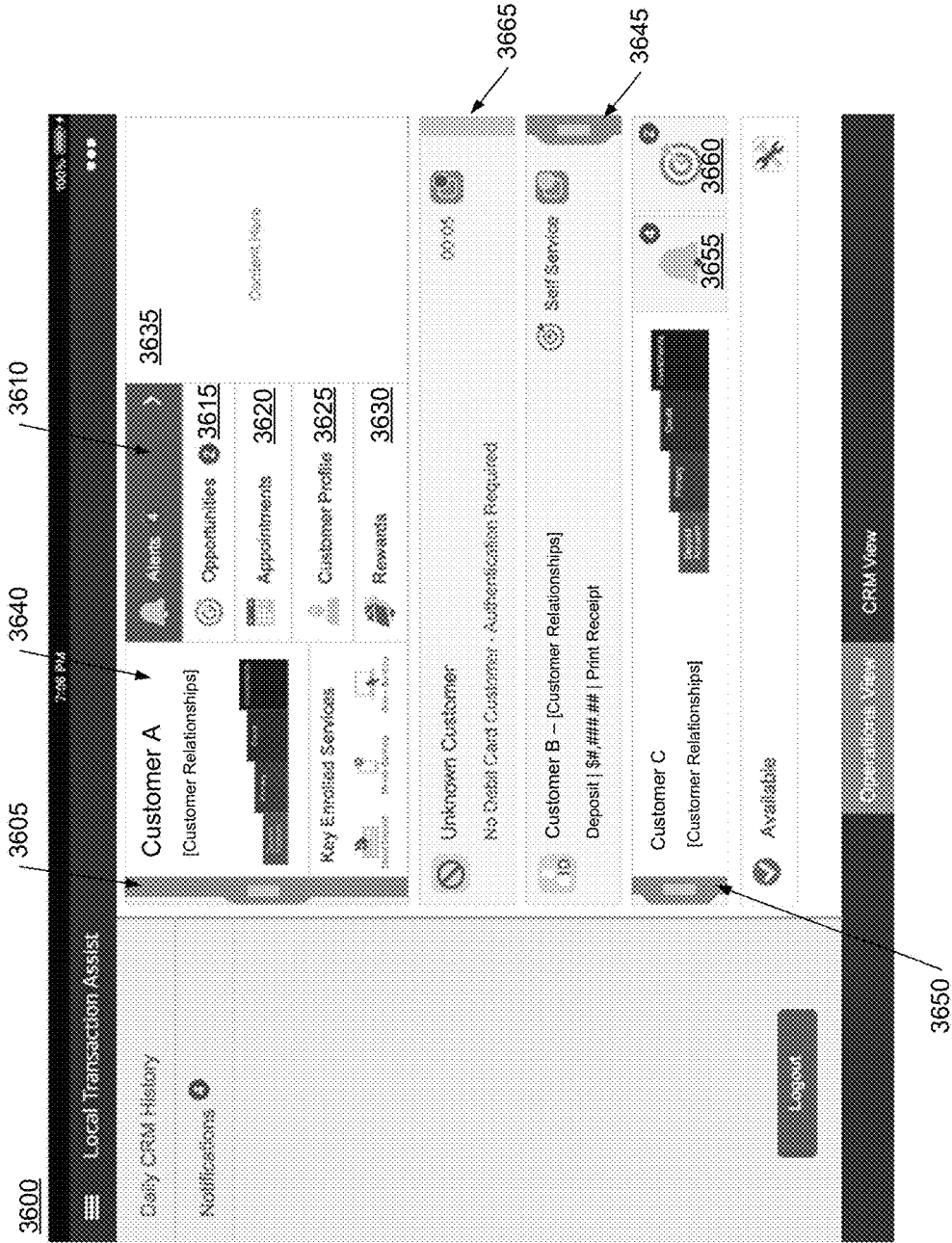
FIG. 36 illustrates an example user interface for local transaction assistance in which various aspects of the disclosure may be implemented.

FIG. 36 illustrates an example user interface 3600 for local transaction assistance in which various aspects of the disclosure may be implemented. Using the interface 3600 (and similarly the interface 2600 illustrated in FIG. 26), an LTA device may provide the agent with an operations view and a CRM view for each user and/or automated device. In other words, the LTA device may run in a dual mode configuration. The agent may switch between the operations and CRM views for each user (and optionally for all of the users). For example, the interface 3600 may comprise a toggle 3605 (or other GUI element) for Customer A. As illustrated in FIG. 36, the agent may be in a CRM view for Customer A. If the agent slides the toggle 3605 from the left-hand side to the right-hand side of the interface 3600, the operations view for Customer A may be displayed to the agent, as illustrated in FIG. 26. The agent may similarly slide the toggle 3605 from the right-hand side to the left-hand side of the interface 3600 to return to the CRM view for Customer A illustrated in FIG. 36.

The CRM view may display a navigation menu, which may include one or more selectable options for the agent to view information on the customer. In response to a selection of the alerts option 3610 from the navigation menu, alerts for Customer A may be displayed in the content pane 3635. For example, Customer A may have 4 alerts. Alerts may be pertinent to the customer's profile or account. Alerts may identify upcoming appointments. Alerts may include travel flags. Alerts may include recent deception. Alerts may include issues report in other channels or business units.

In response to a selection of the opportunities option 3615, the flagged opportunities for Customer A may be displayed in the content pane 3635. Customer A currently has been flagged for 2 different opportunities. As previously explained, an agent may flag a customer for one or more opportunities during the user's transaction. The same agent or two different agents may have flagged customer A for these opportunities. Once flagged, those opportunities may be displayed in the content pane 3635. In some aspects, all of the LTA devices servicing the location may be updated to indicate that the customer has been flagged for one or more opportunities.

The flagged opportunities may be stored in a database, such as a user profile if the user is a customer of the entity. If the user is not a customer, the LTA device that flags the user (or another computing device) may create a profile for the non-customer, and store the flagged opportunities in association with the new profile. By storing flagged opportunities, a user may be presented with customized opportunities after the user has finished his or her transaction at the automated device or has left the self-service device. An agent may physically approach the user after the user has left the automated device to present the opportunity or offer to the user before the user leaves the location. Alternatively, if no agents are available before the user leaves the location, the flagged opportunities may continue to be stored in the database, so that the opportunity may be presented to the user the next time the user returns. In particular, after the user returns and authenticates with an automated device, the LTA devices at the location display the previously-saved opportunities for the user.

The flagged opportunity may be presented to the user after an agent assists the user with a transaction. For example, assume that a transaction alert or exception occurs while the user is authenticating with an automated device. An agent may see the alert or exception on his or her LTA device and assist the user with authentication, such as verifying information on the user's driver's license. After the agent completes the service, the agent may present the user with the flagged opportunity. The agent may know which opportunities to present to the user because the opportunities for the user are displayed in the CRM view on the LTA device. As previously explained, the agent may use the toggle 3605 to toggle between an operations view used to assist with the transaction and a CRM view used to present opportunities to the user. In some aspects, the agent may be required to finish assisting the user with the transaction before the agent can access the user's flagged opportunities. For example, the CRM view for Customer A may be read only (but still viewable) until the agent is finished assisting with the transaction. In some aspects, an agent may choose not to act on a flagged opportunity until the customer is assisted with his or her transaction.

Exemplary opportunities include signing up for a particular service, such as receiving electronic statements, direct deposits, and the like. Other exemplary opportunities include an opportunity to open an account with the entity (e.g., a checking account, a savings account, a money market savings account, a credit card account, a mortgage, and the like). For example, a user (who may or might not be a customer) may regularly visit the location every other Friday to cash a check. Each time the user visits the location, a computing device may store the information in a profile for the user. Based on a pattern of visit, the computing device may determine to flag the user for an opportunity that will shorten the user's visit or eliminate the need for a visit altogether. The computing device may automatically flag the user for an opportunity, or an LTA device may display the pattern of visit to an agent, and the agent may manually flag the user for the opportunity. For example, if the user is a customer, the customer may be flagged for an opportunity to enroll in direct deposit. An agent may present the direct deposit opportunity to the customer the next time the customer visits the location. If the user is not a customer, the user may be flagged for an opportunity to open an account with the entity and to enroll in direct deposit. A temporary, non-customer profile may be created for the user, the profile including information that may be used to identify the user the next time the user visits the location, such as a first name, a last name, driver's license information, and the like.

Flagged opportunities may also be presented to users at the automated device. For example, after the user completes a transaction, the automated device may present one or more of the opportunities flagged for the user on its display. In some aspects, agents may control, via LTA devices, whether or not to present the opportunity to the user at the automated device. For example, if there is a long queue for the automated devices, an agent may select an option on the LTA device for the automated device not to present the opportunity to the user. Flagged opportunities may also be presented to users by a teller, a personal banker, or another automated device used to present opportunities. For example, after the user completes a transaction at the automated device, the automated device may display a message instructing the user to go to a particular teller, personal banker, or another automated device to receive the offer.

If the user decides to act on a particular opportunity, such as signing up for a new product, the automated device or an LTA device may pre-populate the application for the new product with information stored for the user. For example, if the user is a customer, the automated device or LTA device may access the customer's profile with the entity and populate the application with relevant information (e.g., name, current accounts, SSN, address, and the like). The automated device or LTA device may similarly populate the application for a non-customer based on temporary information stored for the non-customer (e.g., name, driver's license information, and the like). Accordingly, the user might be able to complete the application quicker than if they are not pre-populated. In some aspects, if the automated device or LTA device is able to completely fill out the application based on the user's profile, the user may simply review the information and provide legal consent for the application to be processed.

Returning to FIG. 36, the navigation menu may display an appointments option 3620. In response to a selection of the option 3620 by an agent, the user's appointments may be displayed in the content pane 3635. The user's appointments may be retrieved from the user's profile. The agent may access the appointment information to save the user time. For example, the user may have an appointment scheduled in one week. Rather than having the user return to the location in one week, the agent may ask the user whether he or she would like to have the appointment after completing the transaction at the automated device.

The appointments option 3620 may also be used by an agent to schedule an appointment for the user from the agent's LTA device. If a user decides to act on (e.g., listen to) an opportunity flagged for the user, an appointment may be scheduled for the user, and the appointment may be displayed on the LTA device. The appointment information may also be used to give credit to agents that service the customer and/or flag opportunities for the customer that the customer eventually signs up for.

The navigation menu may also comprise a customer profile option 3625. In response to a selection of the option 3625 by an agent, some of the information from the customer's profile may be displayed in the content pane 3635. Once a customer authenticates via the automated device, the customer's transaction might not be tied specifically to a card used for authentication (e.g., a bank card or a debit card) or specific account information. Instead, the automated device and/or an LTA device may have access to and/or act upon the customer's full profile. In other words, the customer may have access to a plurality of accounts associated with the customer's profile, rather than just the account associated with a particular card (e.g., a card used for authentication). An agent at an LTA device may similarly be granted access to and/or act upon the customer's full profile, such as information from the plurality of accounts associated with the customer's profile.

The user may have access to his or her profile or accounts associated therewith after authenticating using an ID, such as a driver's license, as previously explained with reference to FIGS. 31-34. For example, an agent may authenticate the customer using an image of the customer's scanned driver's license. Based on information on the ID (or other information, such as a SSN or TIN provided by the customer), the agent may search for the customer in a database. Once the customer is found and authenticated by the agent via the agent's LTA device, the customer may have access to all of the customer's accounts associated with the customer's profile. Thus, the customer may choose to, for example, deposit a check into any of the user's accounts. The customer may similarly be able to withdraw cash from any of the user's accounts. Various other uses of the customer profile were described above.

The navigation menu may also comprise a rewards option 3630. In response to a selection of the option 3630 by an agent, the user's rewards may be displayed in the content pane 3635. The CRM view for Customer A may also include a pane 3640 that identifies the customer, the customer's relationships, the customer's accounts, and/or the customer's key enrolled services.

The interface 3600 may comprise toggles for one or more other customers, such as a toggle 3645 for Customer B, who may be in a self-service mode at the automated device, and a toggle 3650 for Customer C, who may be being assisted by another LTA device. In some aspects, less information may be displayed for customers not being serviced by the agent. The CRM view for Customer C, for example, may display alerts 3655 and opportunities 3660 for Customer C. In some aspects, a toggle option 3665 might not be included for users that have not yet been authenticated, such as the Unknown Customer.

Figure 37:
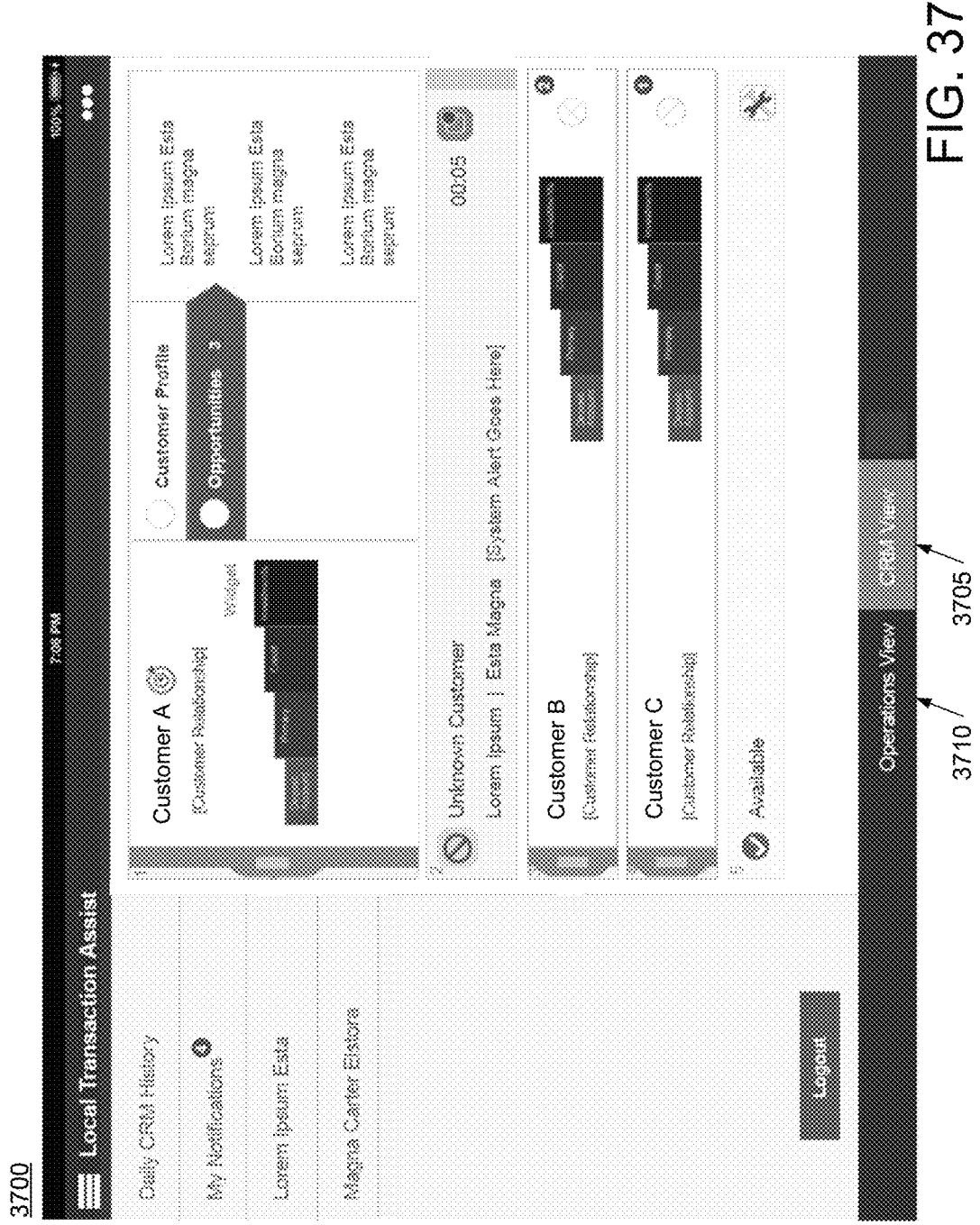
FIG. 37 illustrates an example user interface for local transaction assistance in which various aspects of the disclosure may be implemented.

FIG. 37 illustrates an example user interface 3700 for local transaction assistance in which various aspects of the disclosure may be implemented. The interface 3700 may comprise a global CRM view option 3705. In response to a selection of the option 3705 by an agent, the LTA device may toggle all of the customers to a CRM view (if applicable). If a CRM view is not available for a particular user, such as Unknown Customer 2, the view for Unknown Customer 2 might not toggle to the CRM view. The agent may similarly select the global operations view option 3710 to toggle all of the customers to an operations view (not illustrated).

Figure 5:
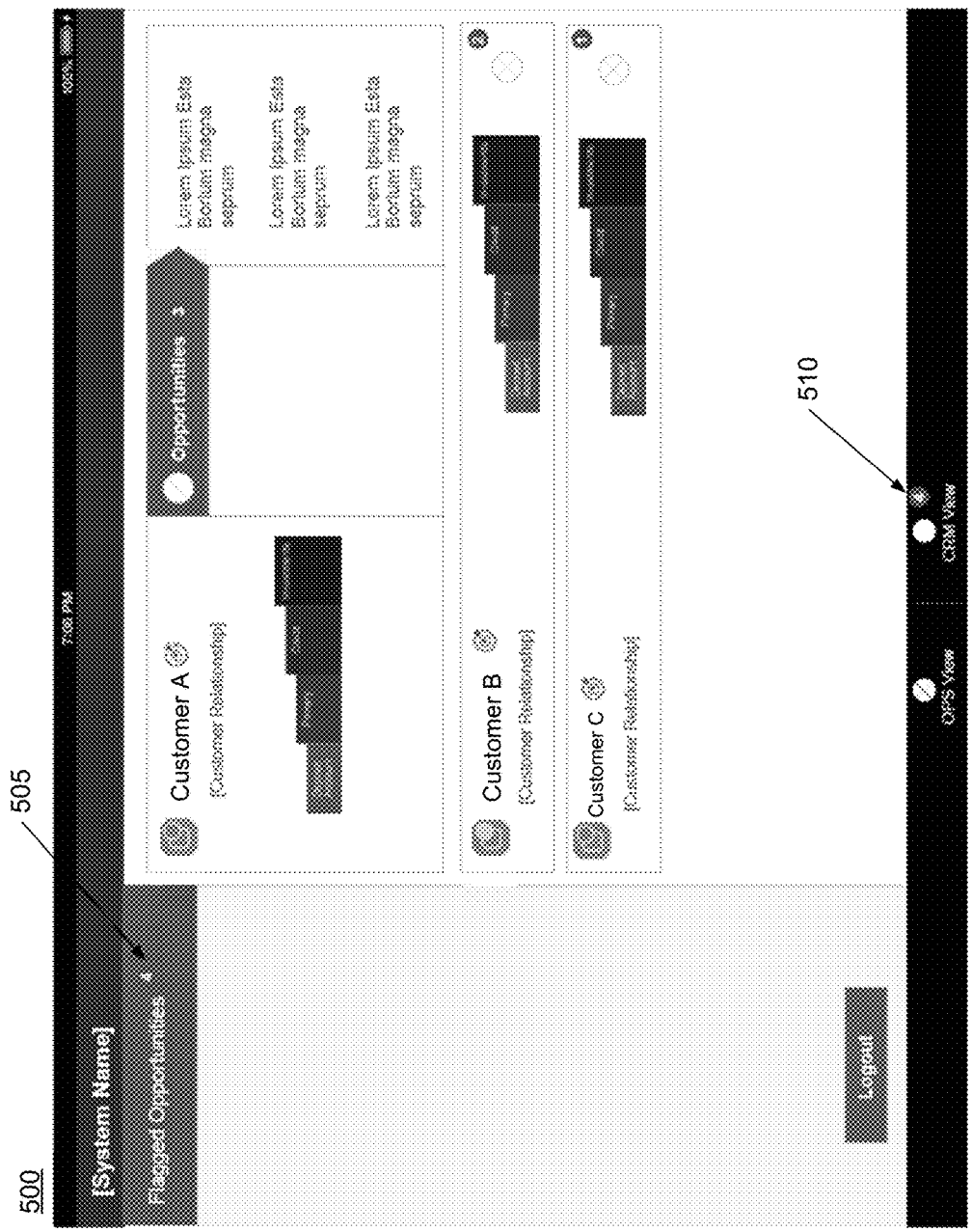
FIG. 5 illustrates an example user interface for local transaction assistance in which various aspects of the disclosure may be implemented.

FIG. 5 illustrates an example user interface 500 for local transaction assistance in which various aspects of the disclosure may be implemented. The interface 500 may comprise a CRM view and may display flagged opportunities, as previously described. The counter 505 may indicate the number of customers flagged as opportunities (e.g., 4 customers). As customers are removed either by the system or by an agent, the counter 505 may be reduced. Similarly, the counter 505 may be increased as customers are flagged. In some aspects, the number of customers listed may be limited to a threshold number, such as 10 customers. If the number of flagged opportunities exceeds the threshold number, the LTA device or other computing device may remove the oldest customer (e.g., by date and time flagged). For example, if 11 customers have been flagged, the oldest customer may be removed from the list.

The LTA device or other computing device may also monitor the amount of time that each customer has been on the list. If this amount of time exceeds a threshold (e.g., 10 minutes), the customer may be removed from the list. For example, once a customer has been on the list for more than 10 minutes and has not been selected by an agent for an opportunity, the customer may be removed from the list. As previously described, the customer may be added to the list the next time the customer returns to the location and authenticates with an automated device. The customer might be kept on the list even if the threshold time has been exceeded if the customer is still in service (e.g., performing a transaction at an automated device). The interface 500 may display a second counter 510, which may indicate the number of customers in session on the automated devices that have been flagged as opportunities.

Figure 38:
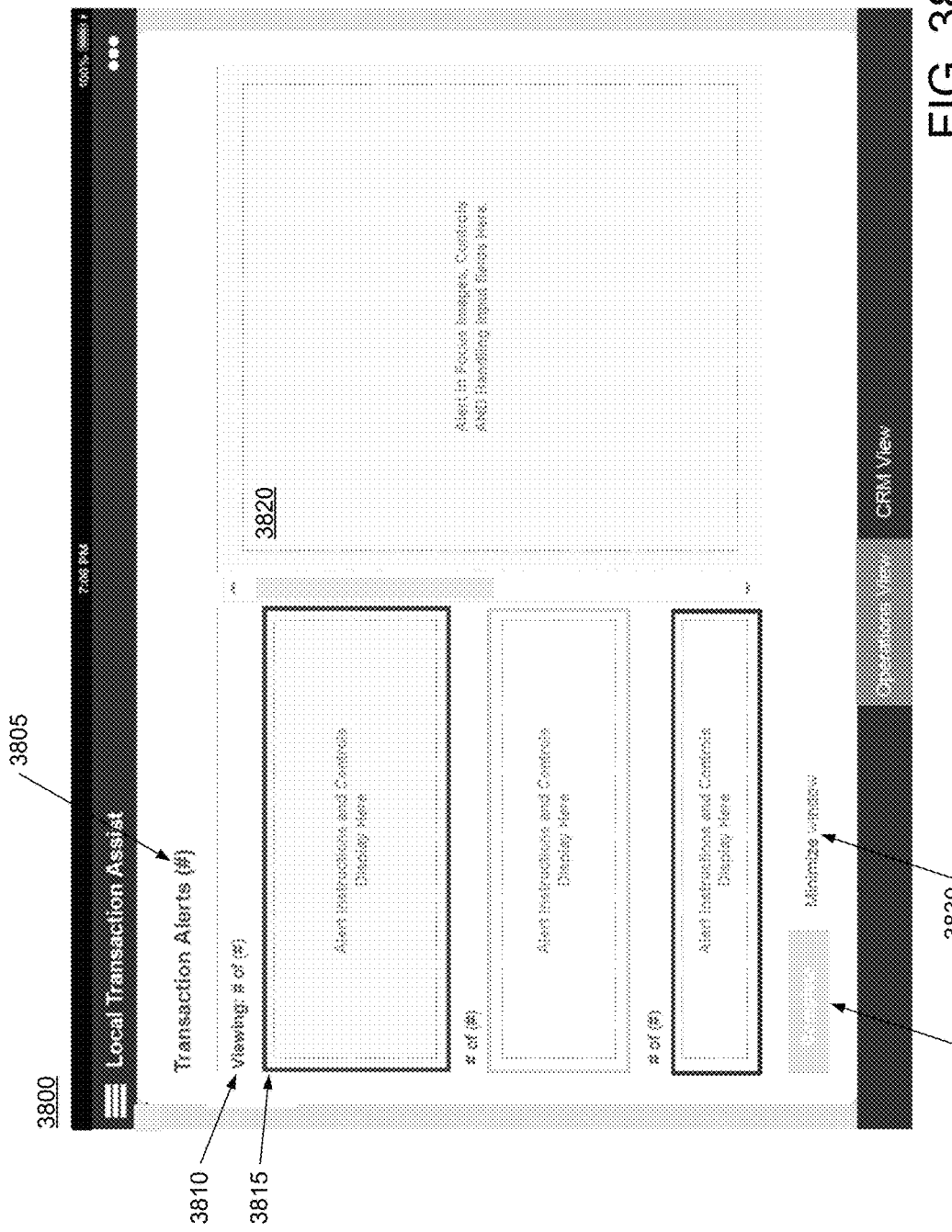
FIG. 38 illustrates an example user interface for transaction alerts in which various aspects of the disclosure may be implemented.

FIG. 38 illustrates an example user interface 3800 for transaction alerts in which various aspects of the disclosure may be implemented. The interface 3800 may be displayed in response to an agent's selection of the review alert(s) option 3017 illustrated in FIG. 30. The interface 3800 may identify 3805 the number of transaction alerts for the customer being assisted by the LTA device. Each alert may be viewed in the viewing pane 3810. For example, a first alert may be displayed in the first alert viewing pane 3815. Instructions to the agent for handling the alert may also be displayed in each alert viewing pane. Alert handling controls and/or input fields may also be displayed in each alert viewing pane.

The alerts listed in the viewing pane 3810 may be ordered based on priority. A high priority alert may comprise an alert that might prevent a user from completing a transaction, such as authenticating the user, a check jam, and the like. High priority alerts may be listed at the top of the viewing pane 3810. In some aspects, three priority levels may exist. In a top priority alert (e.g., indicated by the color red), an alert for deception may be confirmed. In a second priority alert (e.g., indicated by the color yellow), an alert for deception may be suspected or the transaction may comprise a high risk transaction. In a low priority alert (e.g., indicated by the color blue), a check handling or host message may indicate an account status message.

The interface 3800 may comprise an alert handling panel 3820, which may display additional details for each alert selected by the agent. For example, if a user is authenticating using a driver's license, the alert handling panel 3820 may display the scanned image of the user's driver's license. If a user is depositing a check, and an alert for an agent to verify the check amount occurs, the alert handling panel 3820 may display the scanned image of the check. Any other information may be displayed in the alert handling panel 3820, based on the alerts or exceptions described herein.

The interface 3800 may comprise a complete button 3825. The complete button 3825 may be disabled until the agent addresses one or more alerts. For example, the button 3825 may be disabled until the agent addresses all high priority alerts. As another example, the button 3825 may be disabled until the agent addresses all alerts, including high and low priority alerts. Once the alerts have been addressed, the agent may select the complete button 3825, and the interface 3800 may be closed. The interface 3800 may comprise a minimize window button 3830. Selection of the minimize window button 3830 may cause the interface 3800 to be minimized (e.g., pushed to the background). The agent may return to the interface 3800 by selecting the review alerts option, as previously described. The agent's prior actions (e.g., addressing one or more alerts) may be stored, and the interface 3800's prior state may be restored when the agent returns to the interface 3800.

Figure 39:
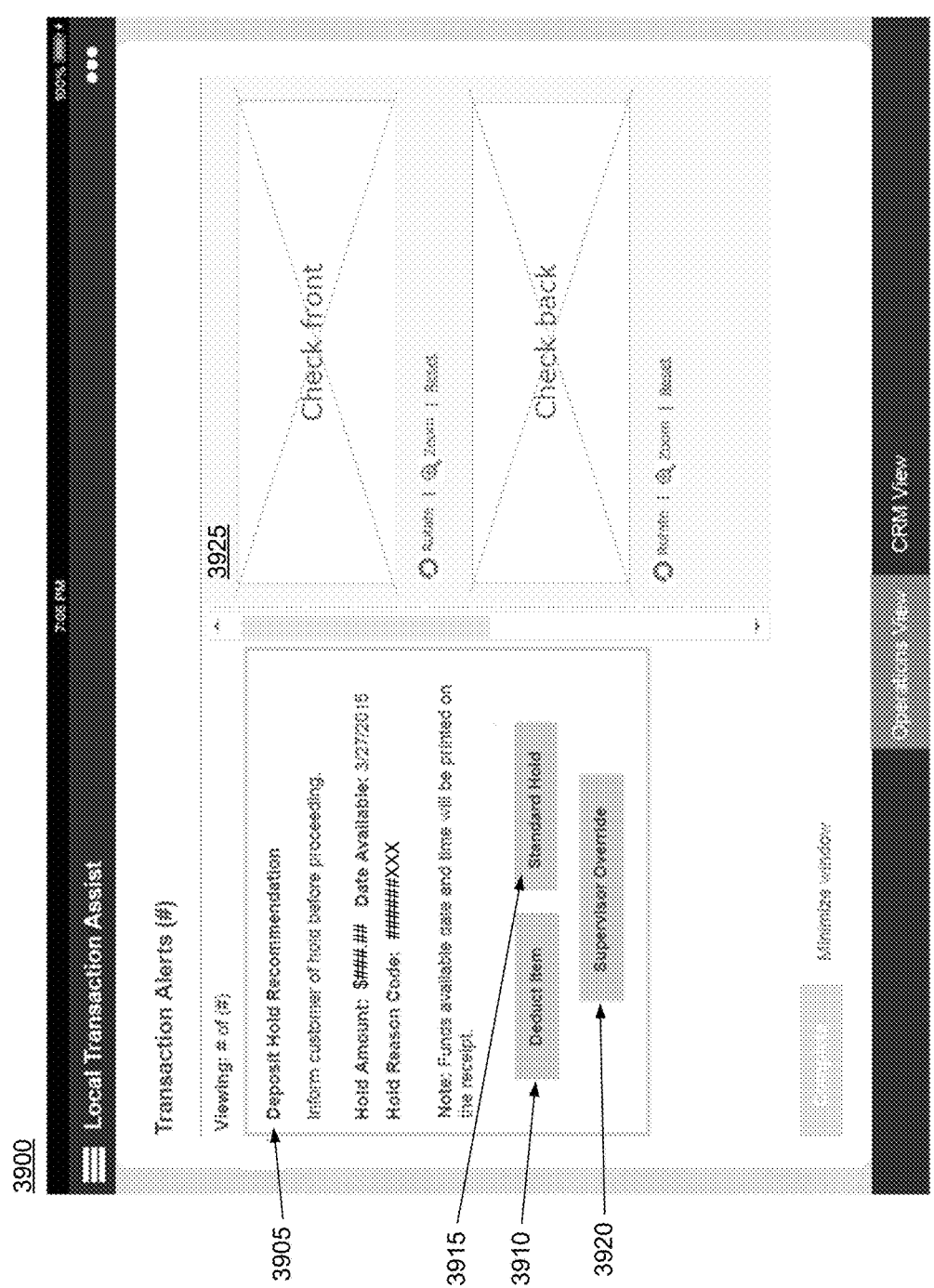
FIG. 39 illustrates an example user interface for transaction alerts in which various aspects of the disclosure may be implemented.

FIG. 39 illustrates an example user interface 3900 for transaction alerts, such as a check review, in which various aspects of the disclosure may be implemented. The interface 3900 may comprise an alert viewing pane 3905, which may include instructions for the agent, such as "Inform customer of hold before proceeding." The pane 3905 may also identify the hold amount ($###.##), the date that the held funds will be available (Mar. 27, 2015), and the hold reason code (######XXX). The pane 3905 may also comprise one or more actions that the agent can instruct the LTA device to take. If the agent selects the deduct item button 3910, the LTA device may instruct the automated device (or other computing device) to deduct the check from the transaction, adjust the deposit amount by removing the amount of the check, and/or returning the check to the customer, such as at the end of the transaction. If the agent selects the standard hold button 3915, the LTA device may initiate a standard hold for the check (e.g., a 3 day hold). The LTA device may also instruct the automated device (or other computing device) to adjust the deposit amount and display a hold notification to the user. If the agent selects the supervisor override button 3920, the LTA device may display a supervisor override window, such as a popup window. The agent may override the hold by, for example, inputting the agent's credentials. The system may allow the check deposit without the standard hold. The interface 3900 may also display 3925 the front of the check and/or the back of the check. The interface 3900 may provide options to rotate, zoom, and/or reset the image of the check.

Figure 40:
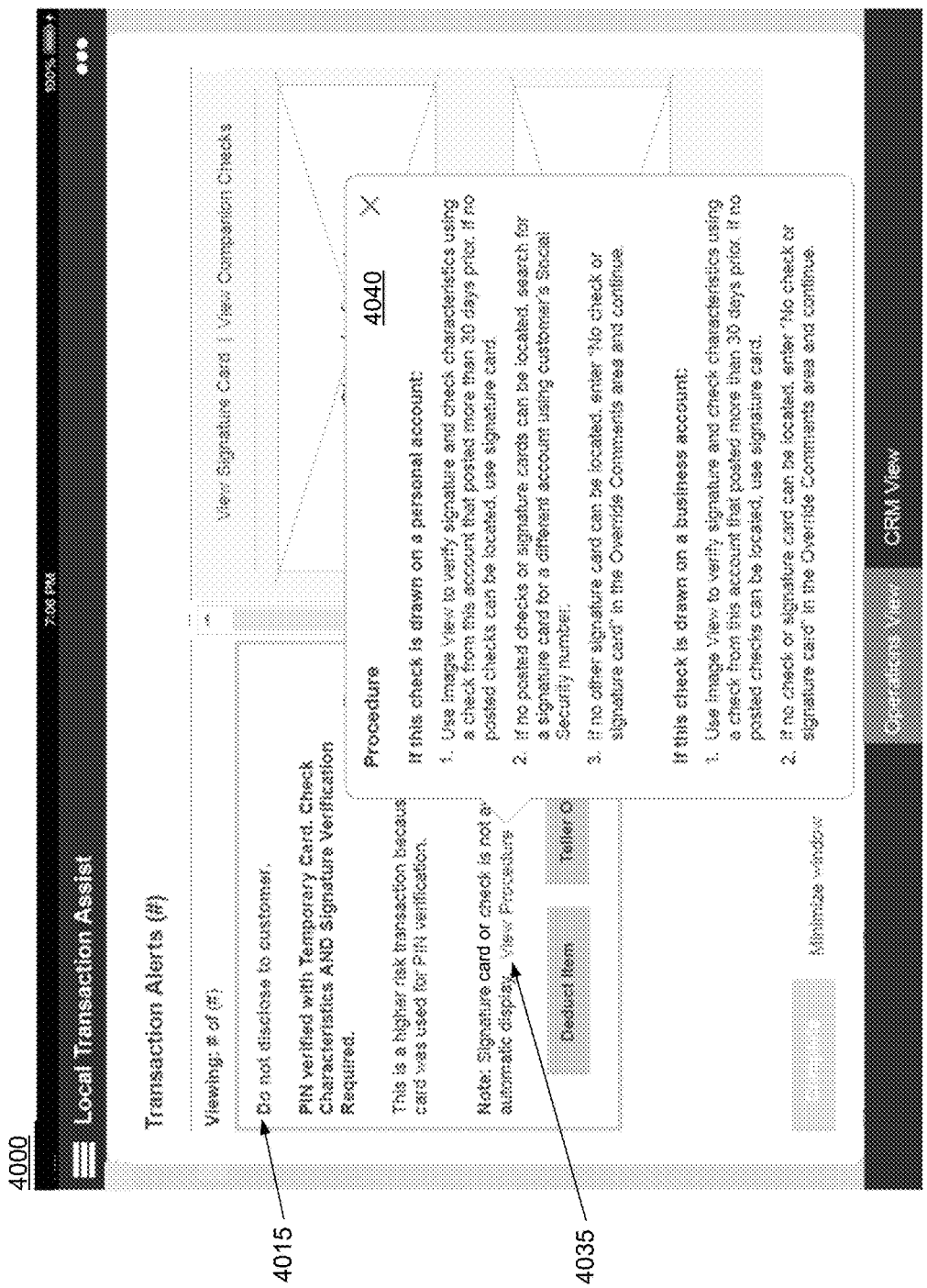
FIG. 40 illustrates an example user interface for transaction alerts in which various aspects of the disclosure may be implemented.

FIG. 40 illustrates an example user interface 4000 for transaction alerts, such as a check review, in which various aspects of the disclosure may be implemented. The interface 4000 may comprise an alert viewing pane 4015, which may include instructions for the agent. The alert viewing pane 4015 may comprise a link 4035 for the agent to view the procedure for verifying a check. In response to a selection of the link 4035 by the agent, the LTA device may display a procedure window 4040 providing the agent with additional details for addressing the alert.

Figure 41:
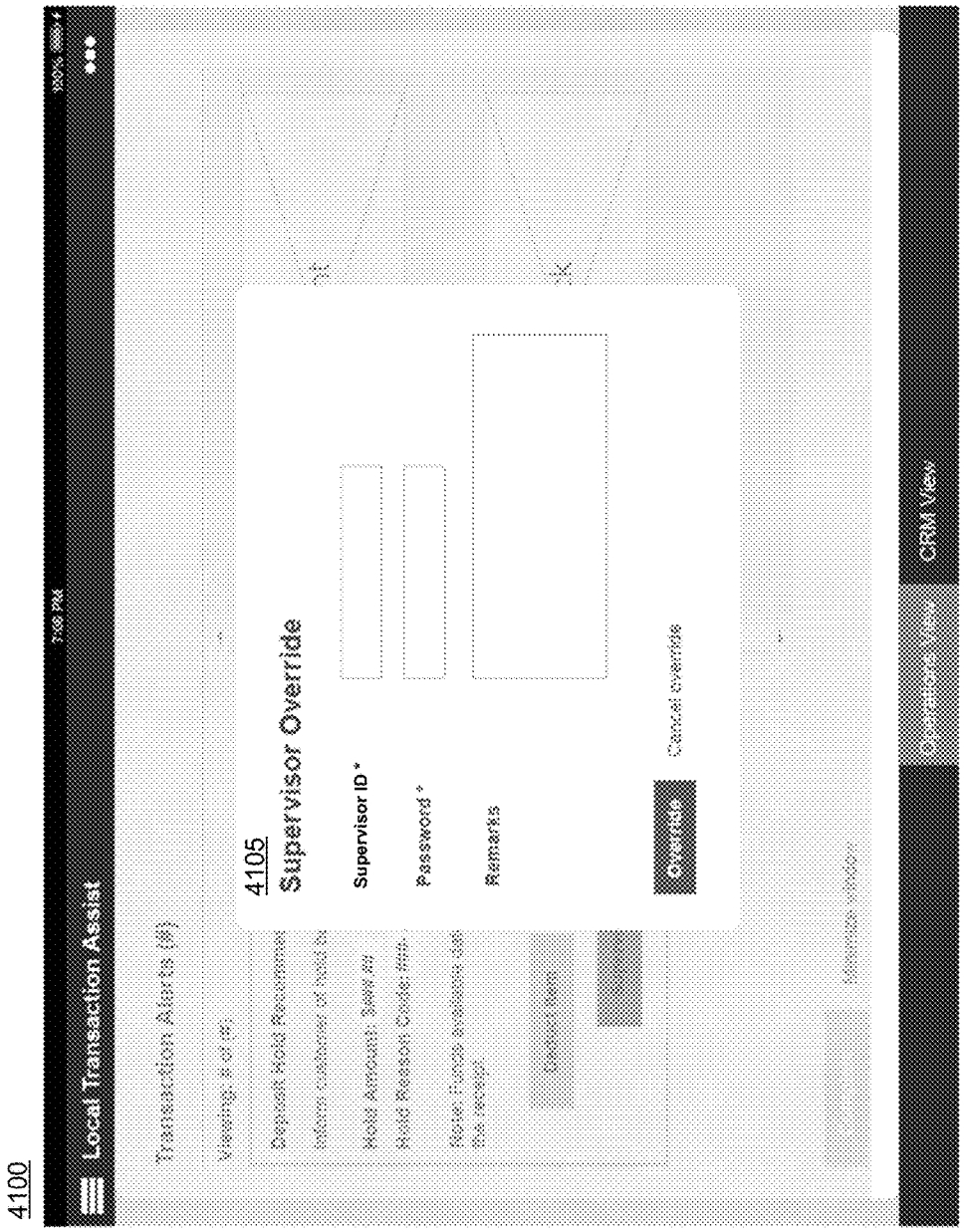
FIG. 41 illustrates an example user interface for a supervisor override in which various aspects of the disclosure may be implemented.

FIG. 41 illustrates an example user interface 4100 for a supervisor override in which various aspects of the disclosure may be implemented. The interface 4100 may comprise a window 4105, such as a popup window, providing input fields for the agent. The agent may input his or her ID, password, and/or remarks for overriding, for example, a check hold, as previously described with reference to FIG. 39. The check hold may be overridden in response to the agent's selection of the override button displayed in the window 4105.

Figure 42:
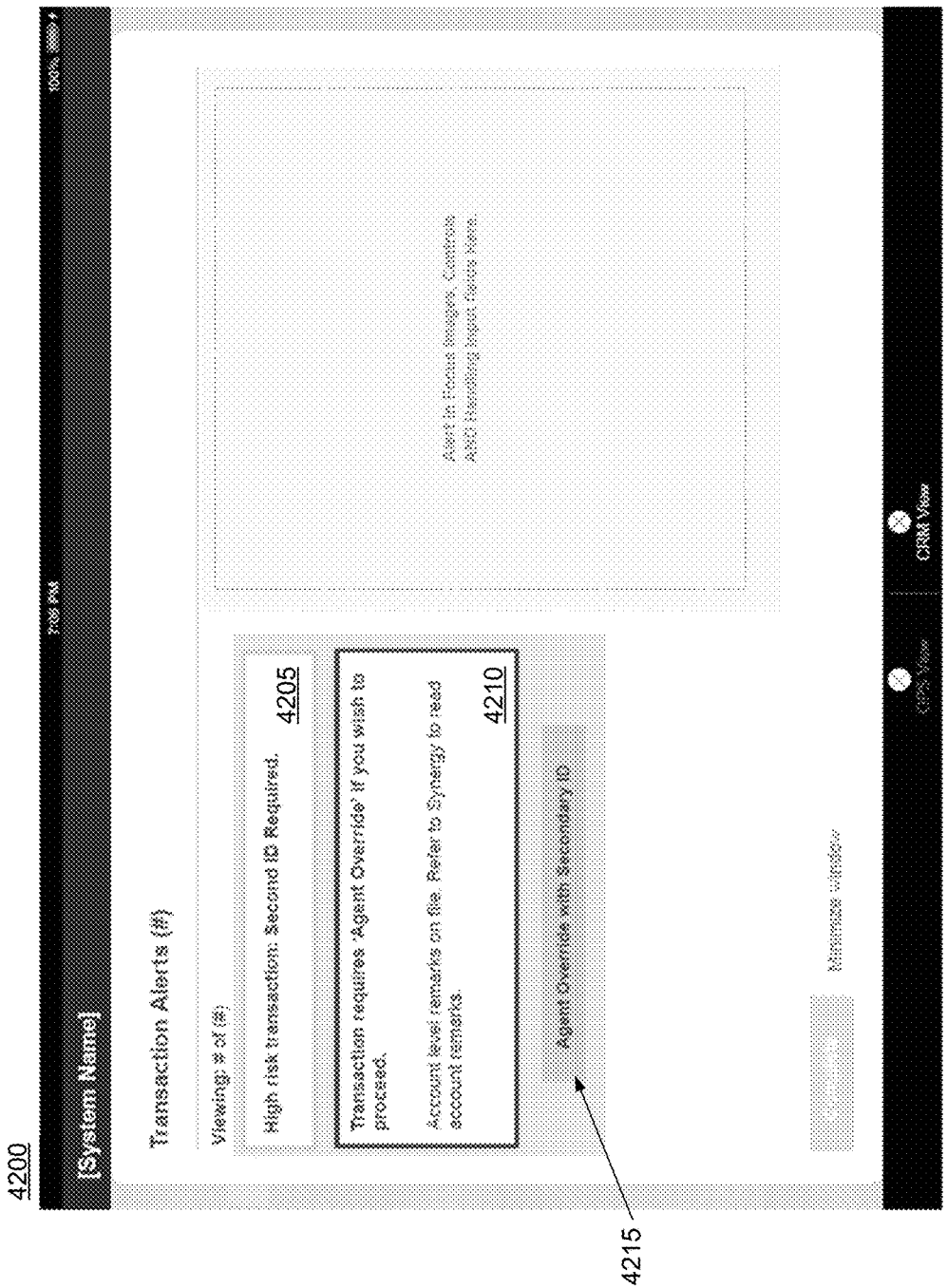
FIG. 42 illustrates an example user interface for a supervisor override in which various aspects of the disclosure may be implemented.

FIG. 42 illustrates an example user interface 4200 for a supervisor override in which various aspects of the disclosure may be implemented. For example, the interface 4200 may be displayed if the system determines that the user is performing a high risk transaction. The interface 4200 may display a message 4205 indicating that the transaction is a high risk transaction and that a second user ID is required to complete the transaction. The interface 4200 may display a message 4210 indicating to the agent that an agent override is needed to proceed. The interface 4200 may comprise an agent override with secondary ID option 4215. In response to a selection of the option 4215 by the agent, a secondary ID and agent override option may be displayed on the LTA device.

Figure 43:
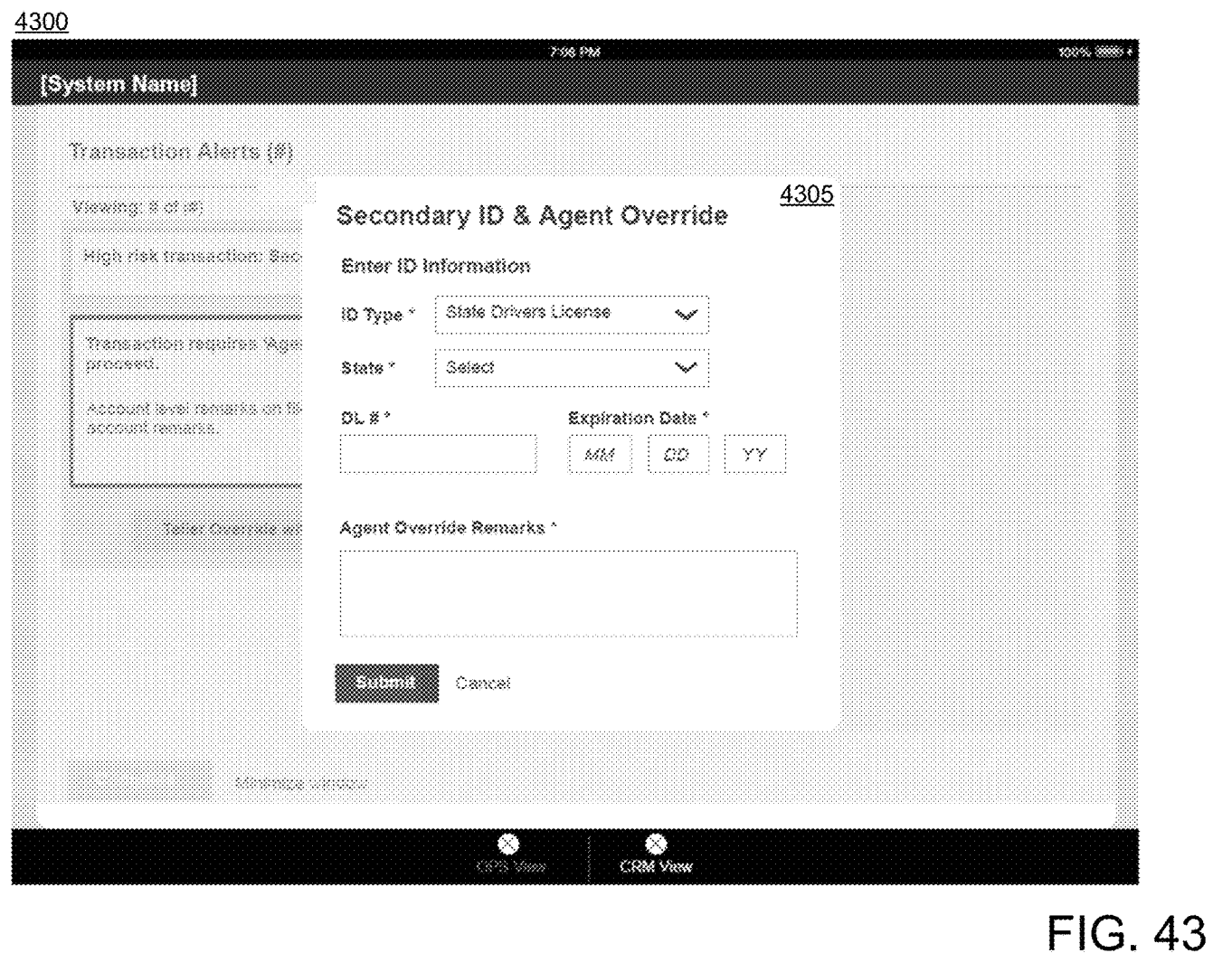

FIG. 43 illustrates an example user interface 4300 for a supervisor override in which various aspects of the disclosure may be implemented. For example, the interface 4300 may be displayed in response to the agent's selection of the override option 4215 illustrated in FIG. 42. The interface 4300 may display a window 4305, which may comprise a popup window. The window 4305 may include an ID Type input for the agent to select the second user ID, such as a state driver's license. The window 4305 may include an option for the agent to select the state issuing the user's ID. The window 4305 may include an input field to enter the driver's license number and/or the expiration date of the driver's license. The window 4305 may also include a remarks section for the agent to provide reasons for overriding the alert or other remarks. In response to a selection of the submit button by the agent, the LTA device may send a message to the automated device or other computing device indicating that the alert has been overridden.

The interfaces 4200 and 4300 illustrated in FIGS. 42 and 43, respectively, may be used for dual mode authentication of the customer. In other words, the customer or the transaction may be authenticated using multiple, separate devices. An exemplary dual mode authentication process will now be described. As previously explained with reference to FIGS. 6A-B, a customer may authenticate using a card, such as a bank card, a debit card, and the like. During authentication, the customer may also enter a PIN associated with the card. After authentication, the customer may proceed to performing a transaction.

During the transaction, the automated device may flag the transaction as a high risk transaction and send an alert or exception to the LTA device or other computing device. A corresponding alert or exception may be displayed for the customer in an operation view on LTA devices, such as the interface 2600 illustrated in FIG. 26. An agent may assist the customer by selecting, for example, a review alert(s) option 2652. In response to a selection of the review alert(s) option 2652, the agent's LTA device may display the interface 4200 illustrated in FIG. 42. As previously described, the LTA device may indicate to the agent that a second user ID for authentication is required to complete the transaction. The agent may select the override option 4215, and the override window 4305 may be displayed responsive to the selection.

At this point, the agent may use a second method of authentication for the user, such as the user's driver's license. In some aspects, the user may have previously scanned his or her driver's license at the automated device. The LTA device may retrieve the scanned image and display the scanned image to the agent. The LTA device may optionally extract information from the driver's license image and prepopulate the input fields in the override window 4305 (e.g., the ID type, the state, the license number, and/or the expiration date). Alternatively, the agent may manually input the driver's license number information by reviewing the scanned image of the license.

Instead of using a scanned image of the driver's license, the agent may physically approach the customer to request the customer's driver's license. The agent may input the driver's license information into the various fields in the override window 4305. The agent may select the submit button, and the LTA device may send a message to the automated device (or another computing device, such as the computing device 310) indicating that the customer has been authenticated using a second ID and for the automated device to permit the customer to continue with the transaction.

While an example of dual mode authentication using a card (and a PIN) and a driver's license was previously described, dual mode authentication may comprise any combination of two forms of authentication. For example, a user may be authenticated using a card and driver's license (as previously described), a card and the customer's SSN, a driver's license and an SSN, or any other combination of authentication methods. In these examples, the customer may be authenticated at the beginning of the transaction using one method and authenticated during the transaction or at the end of the transaction using a different method.

In some aspects, a customer may be wholly or partially authenticated prior to approaching and interacting with an automated device. For example and with reference to FIG. 4, a customer 404 may approach an agent at a location 402 and ask the agent to authenticate the user. For example, the customer 404 may provide the agent with an ID, such as a driver's license or a card (e.g., a debit card). The agent may authenticate the customer based on the ID or card, such as by looking up, on the LTA device, the customer's information in a database based on information on the ID or card. The agent may select an option to authenticate the user via the LTA device, and the LTA device may display a code confirming the authentication. For example, the code may comprise a numeric code, an alphanumeric code, a QR code, or any other code that identifies the authentication. The code may identify a temporary authentication session for the user and may be time limited, such as 5 minutes, 10 minutes, or 15 minutes.

The code may be printed and physically given to the customer. Alternatively, a digital code may be sent to the customer's device, such as a mobile phone or tablet. The customer may approach one of the automated devices at the location 402 and provide the code to the automated device, such as by scanning a QR code, inputting a numeric code, and the like. The automated device may look up the code in a database to identify the customer that was authenticated. Once the authentication session is determined, the automated device may automatically sign the customer into the device, and the customer may perform one or more transactions at the automated device, as previously described.

In some aspects, the customer may be wholly or partially authenticated prior to visiting the location 402, such as via the customer's mobile device (e.g., a smartphone, a tablet, and the like). The customer may open an application on the mobile device used to authenticate the customer for a transaction at an automated device. Authentication via the mobile device may be temporary and based on the customer's location. For example, authentication may be valid for 15 minutes. In other words, if the user authenticates via the user's mobile device, the user would have to access an automated device within 15 minutes of authenticating for the authentication session to remain valid. The mobile device (and application running on the device) may determine the location of the user and estimate the amount of time that it would take the user to walk to the location 402. If the mobile device is outside of a threshold distance, such as a distance that can be walked in 15 minutes, the application might prevent the customer from authenticating. The application may instead instruct the customer to walk closer to the location of the automated device.

If the user is close enough to the location, such as at a distance that can be walked in 15 minutes, the application may permit the user to authenticate via the mobile device. The user may, for example, input a username or account number and a password. Once the user is authenticated, the mobile device may generate a code, such as an alphanumeric code, a numeric code, a QR code, and the like. As described above, the code may be time limited, such as to 5 minutes, 10 minutes, or 15 minutes. Once the user arrives at the location 402, the user may approach an automated device and provide the code to the automated device. If the user is within the time limit for the code, the automated device may automatically authenticate the customer, and the customer may perform a transaction at the device.

In some aspects, the customer may also input the type of transaction (e.g., a check deposit, a cash withdrawal, and the like) via the mobile application. This information may be stored with the authentication session, and the automated device may skip one or more display screens (e.g., selection of the type of transaction) once the customer accesses the device. One or more agents at the location 402 may also be notified of the customer's expected arrival. For example, the LTA devices at the location 402 may display a notification to the agents. Agents may prepare for the customer's arrival and/or direct the customer to the appropriate automated device (e.g., based on the selected transaction).

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
 receiving, by a portable computing device and from a server managing an activity assistance portal, status information for each of a plurality of automated devices, wherein the status information for an automated device of the plurality of automated devices indicates whether the automated device is available, is functioning in a self-service mode, is being assisted by the portable computing device, is being assisted by another portable computing device, or has requested to be assisted;
 generating, by the portable computing device and for display on a display of the portable computing device, a display screen indicating the status information for each of the plurality of automated devices, including first status information for a first automated device of the plurality of automated devices, wherein the status information for each of the plurality of automated devices on the display screen are each displayed on a different portion of the display screen, and wherein the first status information for the first automated device of the plurality of automated devices is displayed on a first portion of the display screen and indicates that a user at the first automated device has requested assistance for an activity being performed by the user at the first automated device;

based on a determination that a user at the first automated device has authenticated via the first automated device and that an agent of the portable computing device has completed assistance for the activity being performed by the user at the first automated device, generating, by the portable computing device, for display on the display screen of the portable computing device a toggle option to switch the display from displaying the first status information for the first automated device to displaying a product or service available to the user at the first automated device, wherein the product or service available to the user comprises an opportunity flagged for the user during a prior interaction between the user and one of the plurality of automated devices and the toggle option comprises a sliding toggle option; and responsive to the portable computing device receiving a selection of the sliding toggle option to switch the display, generating, by the portable computing device and for display on the display of the portable computing device, a modified display screen indicating the product or service available to the user at the first automated device simultaneously with display of the status information for one or more other automated devices of the plurality of automated devices, wherein the product or service available to the user at the first automated device is displayed on the first portion of the display screen to replace the first status information for the first automated device previously displayed on the first portion of the display screen, and wherein another selection of the toggle option is configured to switch the display from displaying the product or service available to the user to displaying the first status information for the first automated device.

2. The method of claim 1, wherein:

the first status information comprises an activity being performed by the user at the first automated device, and a selectable option for the portable computing device to assist the user to perform the activity, and the product or service available to the user comprises an opportunity flagged by the portable computing device or another portable computing device during the prior interaction between the user and one of the plurality of automated devices.

3. The method of claim 1, further comprising:

generating, by the portable computing device, for display on the modified display screen of the portable computing device a second toggle option to switch the display from displaying second status information for a second automated device of the one or more other automated devices to displaying a product or service available to a second user at the second automated device; and responsive to receiving a selection of the second toggle option to switch the display, generating, by the portable computing device, for display on the modified display screen of the portable computing device the product or service available to the second user at the second automated device.

4. The method of claim 1, further comprising:

storing, in a database and in association with a profile of the user, the opportunity flagged for the user during the prior interaction.

5. The method of claim 1, wherein the first status information for the first automated device indicates that the first automated device is being assisted by the portable computing device or is being assisted by another portable computing device, and wherein the display of the product or service available to the user is read-only until the first status information for the first automated device indicates that assistance of the first automated device is completed.

6. The method of claim 1, further comprising:

receiving a selection of the product or service by the user at the first automated device;

accessing a database comprising a profile for the user; and pre-populating an application for the product or service using information from the profile for the user.

7. The method of claim 1, wherein the modified display screen indicating the product or service available to the user comprises a selectable option to display one or more appointment for the user and a selectable option to display information from a profile for the user.

8. The method of claim 1, further comprising:

responsive to the portable computing device receiving another selection of the toggle option, generating, by the portable computing device, for display on the display of the portable computing device the first status information for the first automated device simultaneously with display of the status information for the one or more other automated devices of the plurality of automated devices.

9. The method of claim 1, wherein:

the product or service available to the user at the first automated device comprises a new product or service available to the user, the modified display screen displays, on the first portion of the display screen, an indication of the new product or service available to the user, and the modified display screen displays one or more additional toggle options, wherein each additional toggle option of the one or more additional toggle options corresponds to an automated device of the one or more other automated devices, and wherein each additional toggle option of the one or more additional toggle options is displayed on the modified display screen in a display area associated with the status information for the automated device corresponding to an additional toggle option, and wherein a selection of the additional toggle option for the automated device is configured to switch the modified display screen from displaying the status information for the automated device to displaying a new product or service available to a user at the automated device.

10. An portable apparatus, comprising:

a processor; and memory storing computer-executable instructions that, when executed by the processor, cause the portable apparatus to:

receive, from a server managing an activity assistance portal, status information for each of a plurality of automated devices, wherein the status information for an automated device of the plurality of automated devices indicates whether the automated device is available, is functioning in a self-service mode, is being assisted by the portable apparatus, is being assisted by another portable apparatus, or has requested to be assisted;

generate, for display on a display of the portable apparatus, a display screen indicating the status information for each of the plurality of automated devices, including first status information for a first automated device of the plurality of automated devices, wherein the status information for each of the plurality of automated devices on the display screen are each displayed on a different portion of the display screen, and wherein the first status information for the first automated device of the plurality of automated devices is displayed on a first portion of the display screen and indicates that a user at the first automated device has requested assistance for an activity being performed by the user at the first automated device;

based on a determination that a user at the first automated device has authenticated via the first automated device and that an agent of a portable computing device has completed assistance for the activity being performed by the user at the first automated device, generate for display on the display screen of the portable apparatus a toggle option to switch the display from displaying the first status information for the first automated device to displaying a product or service available to the user at the first automated device, wherein the product or service available to the user comprises an opportunity flagged for the user during a prior interaction between the user and one of the plurality of automated devices and the toggle option comprises a sliding toggle option; and responsive to the portable apparatus receiving a selection of the toggle option to switch the display, generate, for display on the display of the portable apparatus, a modified display screen indicating the product or service available to the user at the first automated device simultaneously with display of the status information for one or more other automated devices of the plurality of automated devices, wherein the product or service available to the user at the first automated device is displayed on the first portion of the display screen to replace the first status information for the first automated device previously displayed on the first portion of the display screen, and wherein another selection of the toggle option is configured to switch the display from displaying the product or service available to the user to displaying the first status information for the first automated device.

11. The portable apparatus of claim 10, wherein:
the first status information comprises an activity being performed by the user at the first automated device, and a selectable option for the portable apparatus to assist the user to perform the activity, and
the product or service available to the user comprises an opportunity flagged by the portable apparatus or another portable apparatus during the prior interaction between the user and one of the plurality of automated devices.

12. The portable apparatus of claim 10, wherein the memory stores additional computer-executable instructions that, when executed by the processor, cause the portable apparatus to:
generate for display on the modified display screen of the portable apparatus a second toggle option to switch the display from displaying second status information for a second automated device of the one or more other automated devices to displaying a product or service available to a second user at the second automated device; and responsive to receiving a selection of the second toggle option to switch the display, generate for display on the modified display screen of the portable apparatus the product or service available to the second user at the second automated device.

13. The portable apparatus of claim 10, wherein the memory stores additional computer-executable instructions that, when executed by the processor, cause the portable apparatus to:
store, in a database and in association with a profile of the user, the opportunity flagged for the user during the prior interaction.

14. The portable apparatus of claim 10, wherein the first status information for the first automated device indicates that the first automated device is being assisted by the portable apparatus or is being assisted by another portable apparatus, and wherein the display of the product or service available to the user is read-only until the first status information for the first automated device indicates that assistance of the first automated device is completed.

15. The portable apparatus of claim 10, wherein the memory stores additional computer-executable instructions that, when executed by the processor, cause the portable apparatus to:
receive a selection of the product or service by the user at the first automated device;
access a database comprising a profile for the user; and
pre-populate an application for the product or service using information from the profile for the user.

16. The portable apparatus of claim 10, wherein the modified display screen indicating the product or service available to the user comprises a selectable option to display one or more appointment for the user and a selectable option to display information from a profile for the user.

17. A non-transitory computer-readable medium having instructions stored thereon that, when executed, cause a portable computing device to:
receive, from a server managing an activity assistance portal, status information for each of a plurality of automated devices, wherein the status information for an automated device of the plurality of automated devices indicates whether the automated device is available, is functioning in a self-service mode, is being assisted by the portable computing device, is being assisted by another portable computing device, or has requested to be assisted;

generate, for display on a display of the portable computing device, a display screen indicating the status information for each of the plurality of automated devices, including first status information for a first automated device of the plurality of automated devices, wherein the status information for each of the plurality of automated devices on the display screen are each displayed on a different portion of the display screen, and wherein the first status information for the first automated device of the plurality of automated devices is displayed on a first portion of the display screen and indicates that a user at the first automated device has requested assistance for an activity being performed by the user at the first automated device;

based on a determination that a user at the first automated device has authenticated via the first automated device and that an agent of the portable computing device has completed assistance for the activity being performed by the user at the first automated device, generate for display on the display screen of the portable computing device a toggle option to switch the display from displaying the first status information for the first automated device to displaying a product or service available to the user at the first automated device, wherein the product or service available to the user comprises an opportunity flagged for the user during a prior interaction between the user and one of the plurality of automated devices and the toggle option comprises a sliding toggle option; and responsive to the portable computing device receiving a selection of the toggle option to switch the display, generate, for display on the display of the portable computing device, a modified display screen indicating the product or service available to the user at the first automated device simultaneously with display of the status information for one or more other automated devices of the plurality of automated devices, wherein the product or service available to the user at the first automated device is displayed on the first portion of the display screen to replace the first status information for the first automated device previously displayed on the first portion of the display screen, and wherein another selection of the toggle option is configured to switch the display from displaying the product or service available to the user to displaying the first status information for the first automated device.

18. The non-transitory computer-readable medium of claim 17, wherein:
the first status information comprises an activity being performed by the user at the first automated device, and a selectable option for the portable computing device to assist the user to perform the activity, and the product or service available to the user comprises an opportunity flagged by the portable computing device or another portable computing device during the prior interaction between the user and one of the plurality of automated devices.

19. The non-transitory computer-readable medium of claim 17, wherein the non-transitory computer-readable medium has additional computer-readable instructions stored thereon that, when executed, cause the portable computing device to:
store, in a database and in association with a profile of the user, the opportunity flagged for the user during the prior interaction.

* * * * *

UNITED STATES PATENT AND TRADEMARK OFFICE
CERTIFICATE OF CORRECTION

PATENT NO. : 10,365,805 B2
APPLICATION NO. : 14/788065
DATED : July 30, 2019
INVENTOR(S) : Christian Mande et al.

Page 1 of 1

It is certified that error appears in the above-identified patent and that said Letters Patent is hereby corrected as shown below:

In the Claims

Column 61, Claim 10, Line 30:
Before "toggle", insert --sliding--

Column 64, Claim 18, Line 8:
After "and", insert --¶--

Signed and Sealed this
Thirtieth Day of June, 2020

Andrei Iancu
*Director of the United States Patent and Trademark Office*